(12) United States Patent
Rajasingham

(10) Patent No.: US 9,358,908 B2
(45) Date of Patent: Jun. 7, 2016

(54) VEHICLE OCCUPANT SUPPORT

(76) Inventor: Arjuna Indraeswaran Rajasingham, Bethesda, MD (US)

( * ) Notice: Subject to any disclaimer, the term of this patent is extended or adjusted under 35 U.S.C. 154(b) by 138 days.

(21) Appl. No.: 13/820,510

(22) PCT Filed: Sep. 6, 2011

(86) PCT No.: PCT/US2011/001547
§ 371 (c)(1),
(2), (4) Date: Mar. 2, 2013

(87) PCT Pub. No.: WO2012/030401
PCT Pub. Date: Mar. 8, 2012

(65) Prior Publication Data
US 2013/0193726 A1    Aug. 1, 2013

Related U.S. Application Data

(60) Provisional application No. 61/458,997, filed on Dec. 3, 2010, provisional application No. 61/404,335, filed on Oct. 1, 2010, provisional application No. 61/402,751, filed on Sep. 3, 2010, provisional application No. 61/459,698, filed on Dec. 16, 2010, provisional application No. 61/460,266, filed on Dec. 29, 2010, provisional application No. 61/465,160, filed on Mar. 15, 2011.

(51) Int. Cl.
*B60N 2/427* (2006.01)
*B60N 2/005* (2006.01)
*B60N 2/01* (2006.01)
*B60N 2/26* (2006.01)
*B60N 2/28* (2006.01)
*B64D 11/06* (2006.01)
*B60N 2/42* (2006.01)

(52) U.S. Cl.
CPC .............. *B60N 2/427* (2013.01); *B60N 2/005* (2013.01); *B60N 2/01* (2013.01); *B60N 2/265* (2013.01); *B60N 2/2806* (2013.01); *B60N 2/2812* (2013.01); *B60N 2/2884* (2013.01); *B60N 2/42* (2013.01); *B64D 11/06* (2013.01); *B64D 11/0601* (2014.12); *B64D 11/062* (2014.12)

(58) Field of Classification Search
CPC ... B60N 2/2812; B60N 2/2821; B60N 2/2884
USPC .............. 297/216.11, 256.13, 256.16, 256.1, 297/314, 487, 488, 466, 464, 344.24
See application file for complete search history.

(56) References Cited

U.S. PATENT DOCUMENTS

| | | | |
|---|---|---|---|
| 5,294,183 A * | 3/1994 | Wetter et al. | 297/472 |
| 5,884,967 A * | 3/1999 | Gasper | 297/216.11 |
| 6,394,241 B1 * | 5/2002 | Desjardins et al. | 188/376 |
| 7,607,697 B2 * | 10/2009 | Esler et al. | 280/801.1 |
| 7,658,444 B2 * | 2/2010 | Murphy et al. | 297/216.11 |
| 8,226,162 B2 * | 7/2012 | Campbell et al. | 297/216.11 |
| 8,328,275 B2 * | 12/2012 | Vogt et al. | 297/216.11 |
| 2009/0102253 A1 * | 4/2009 | Forbes et al. | 297/216.11 |

* cited by examiner

*Primary Examiner* — Sarah McPartlin

(57) ABSTRACT

Arrangements for safety and comfort in vehicles.

6 Claims, 44 Drawing Sheets

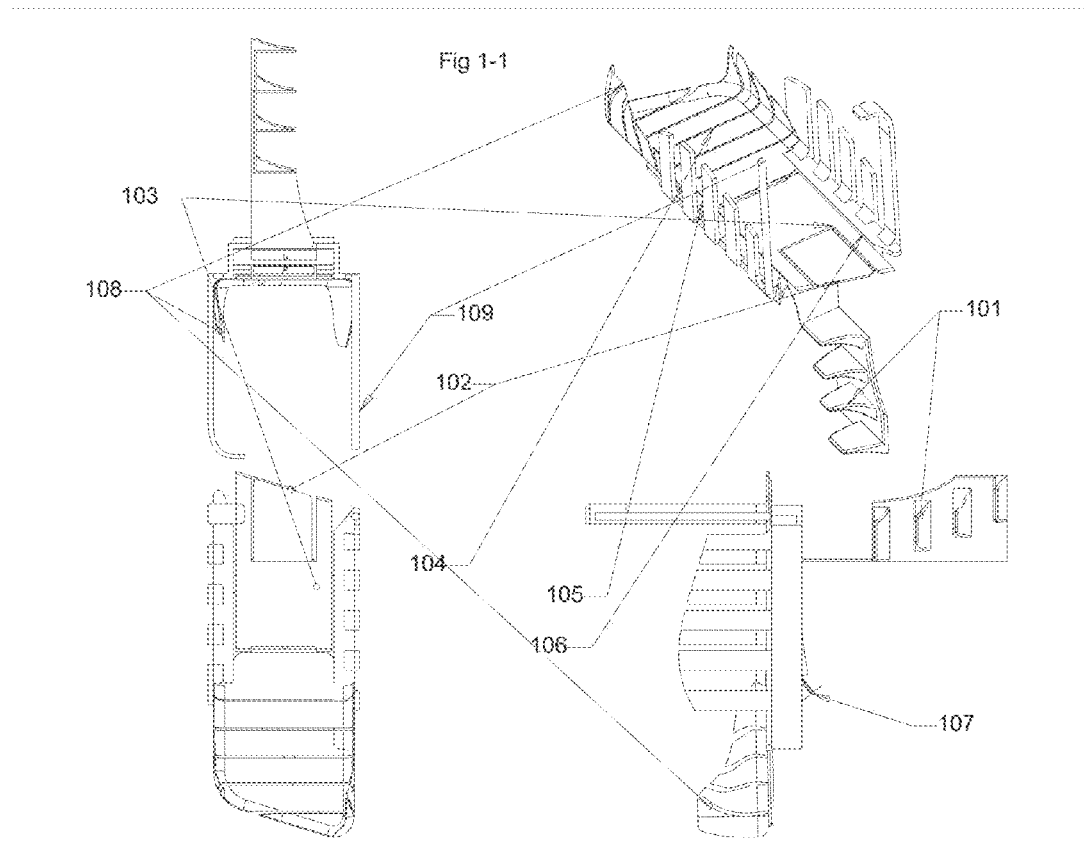
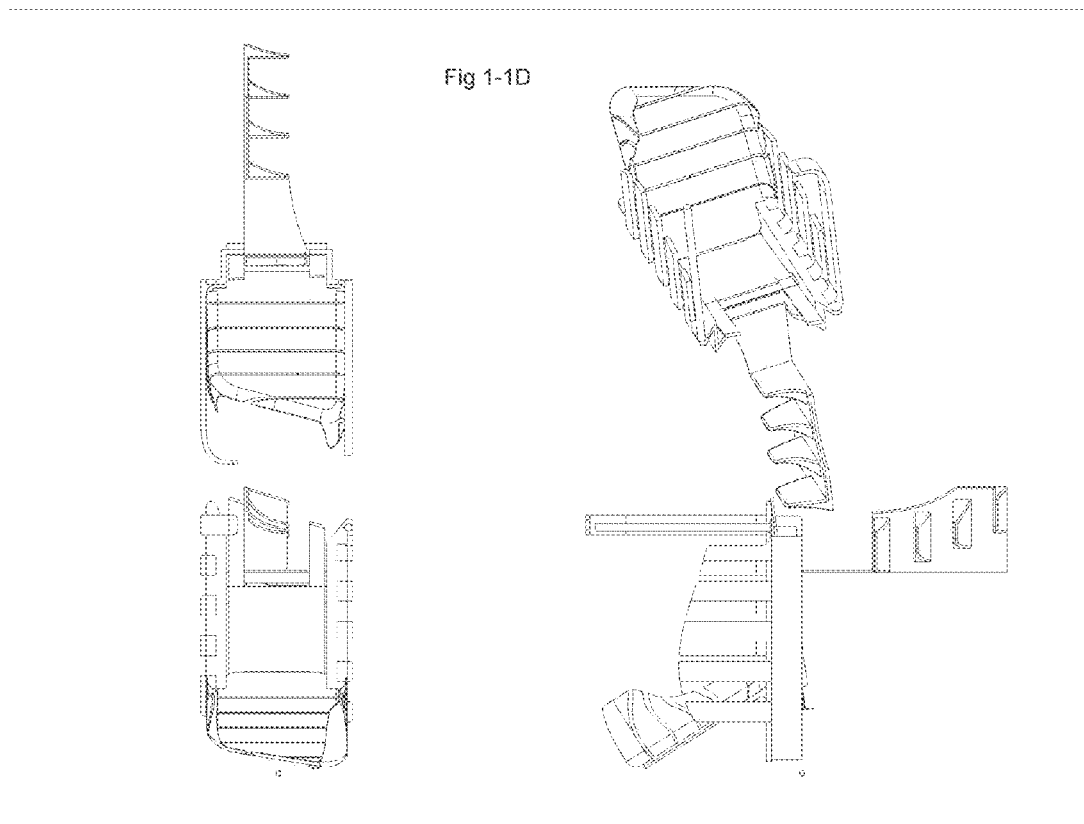

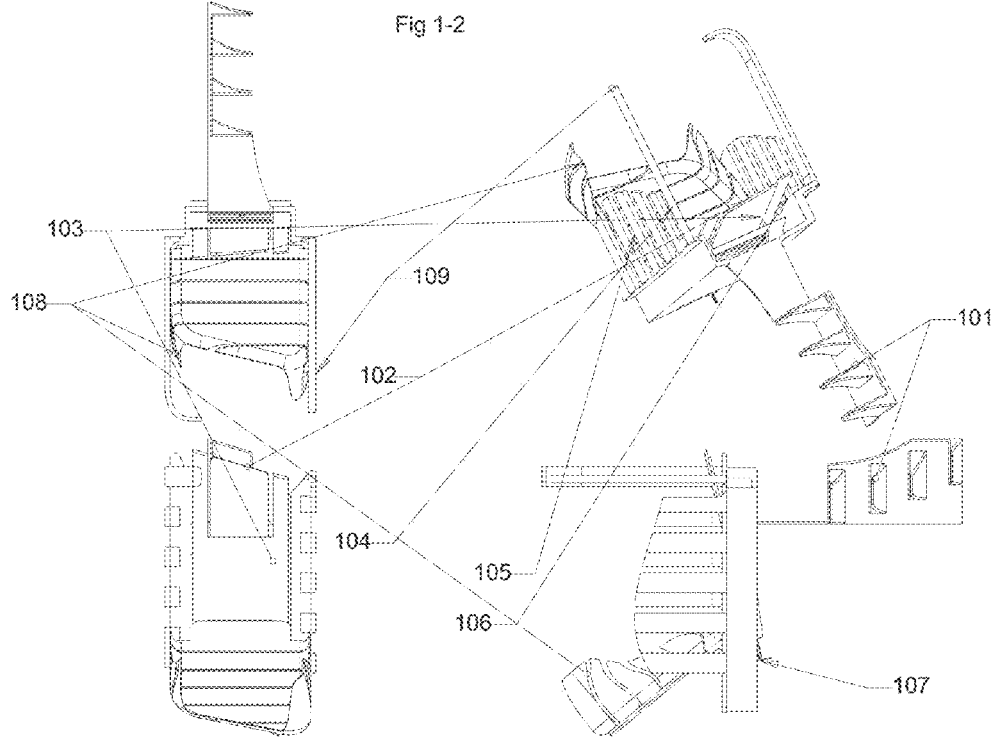
Fig 1-2
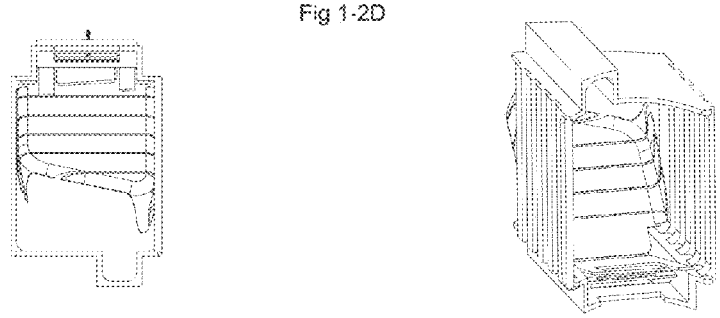
Fig 1-2D
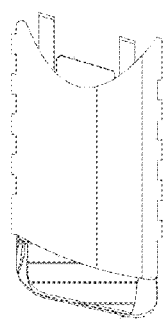
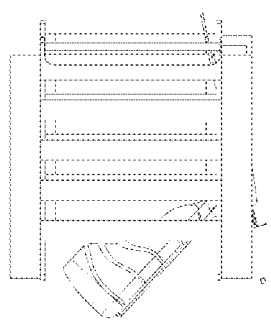

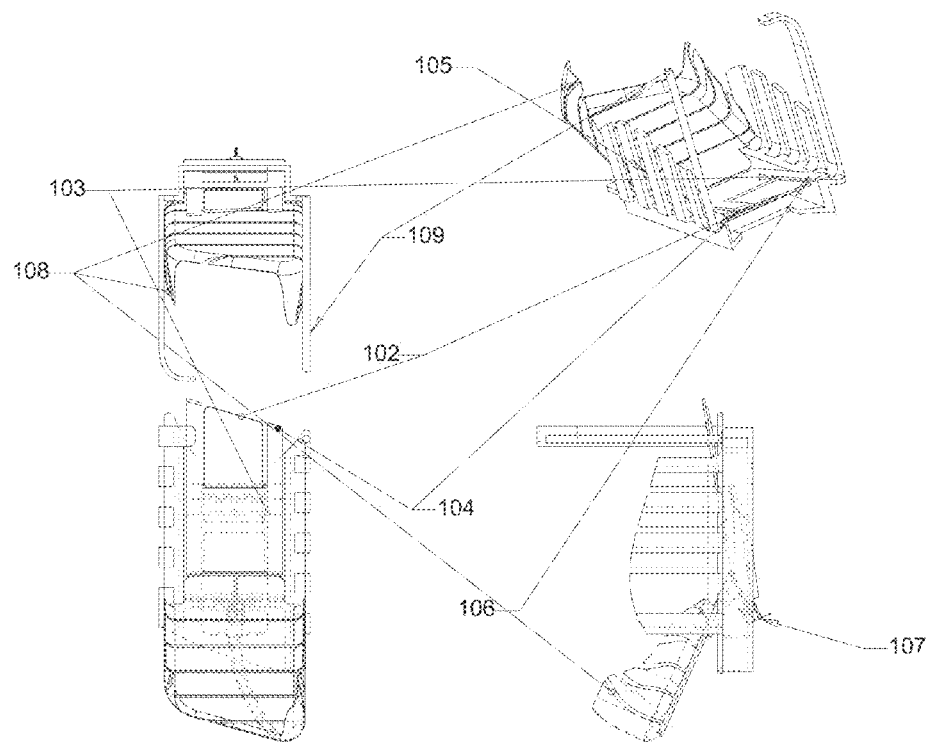
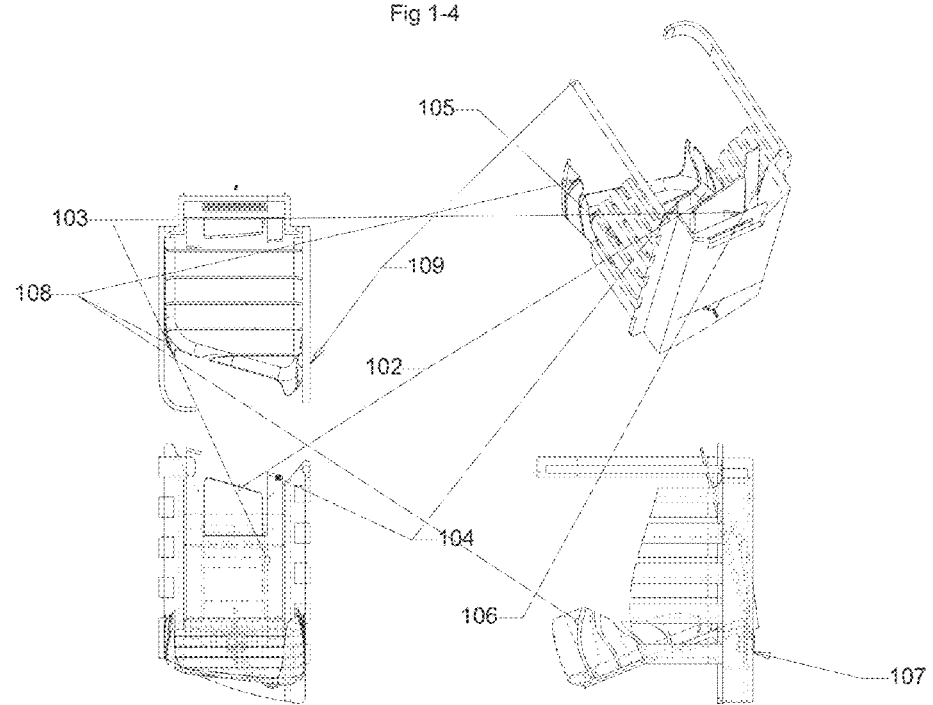

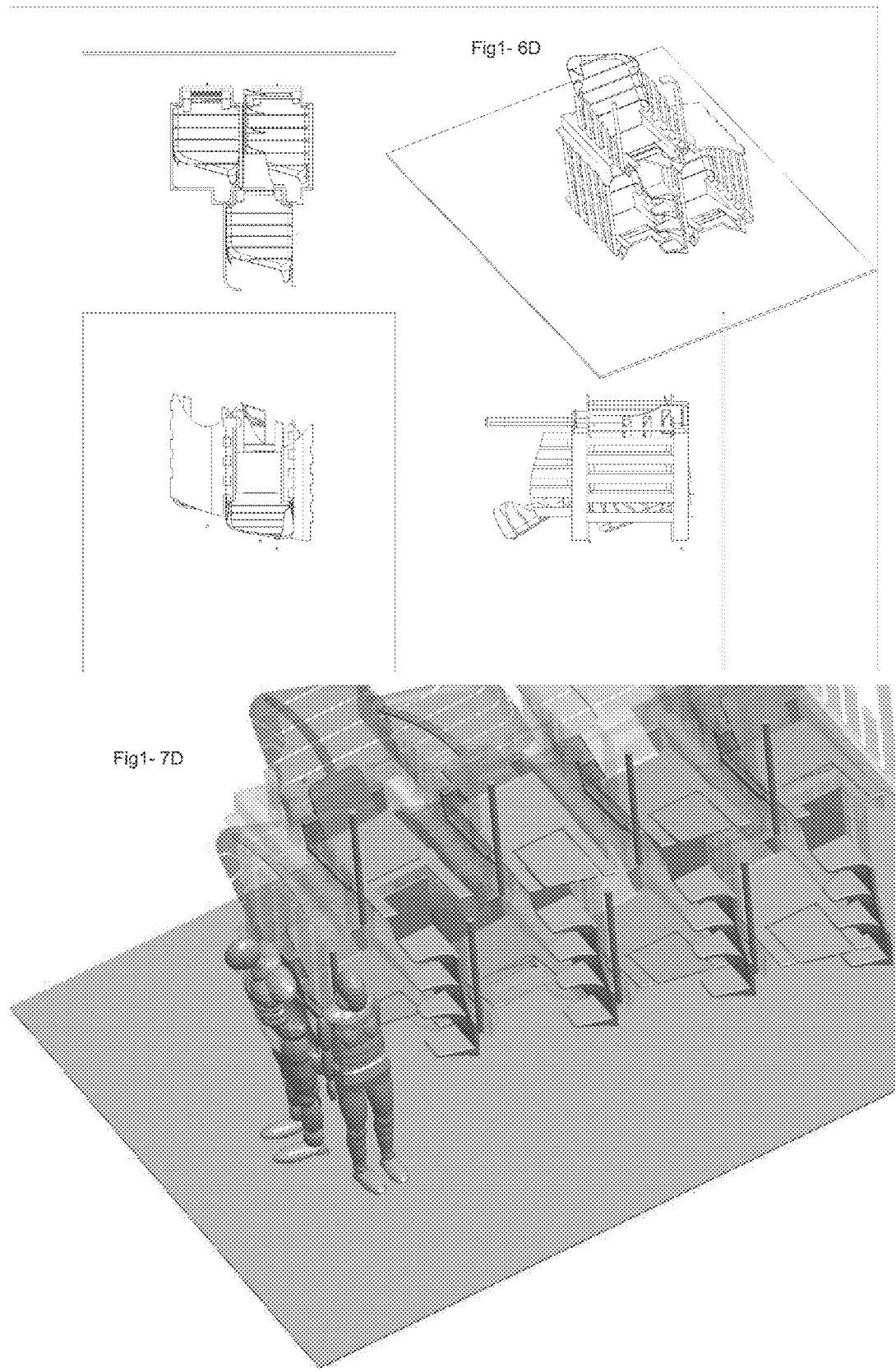

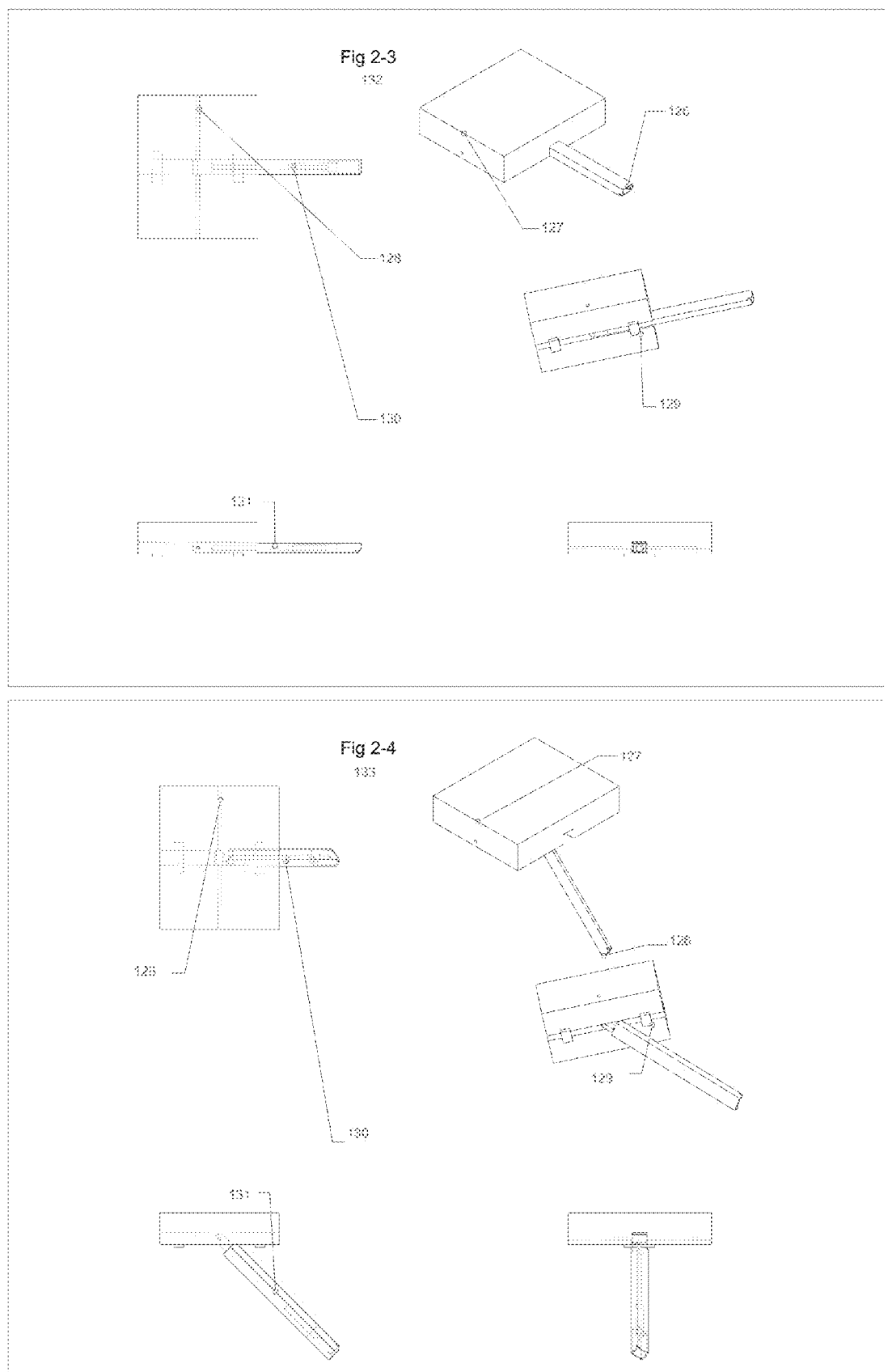

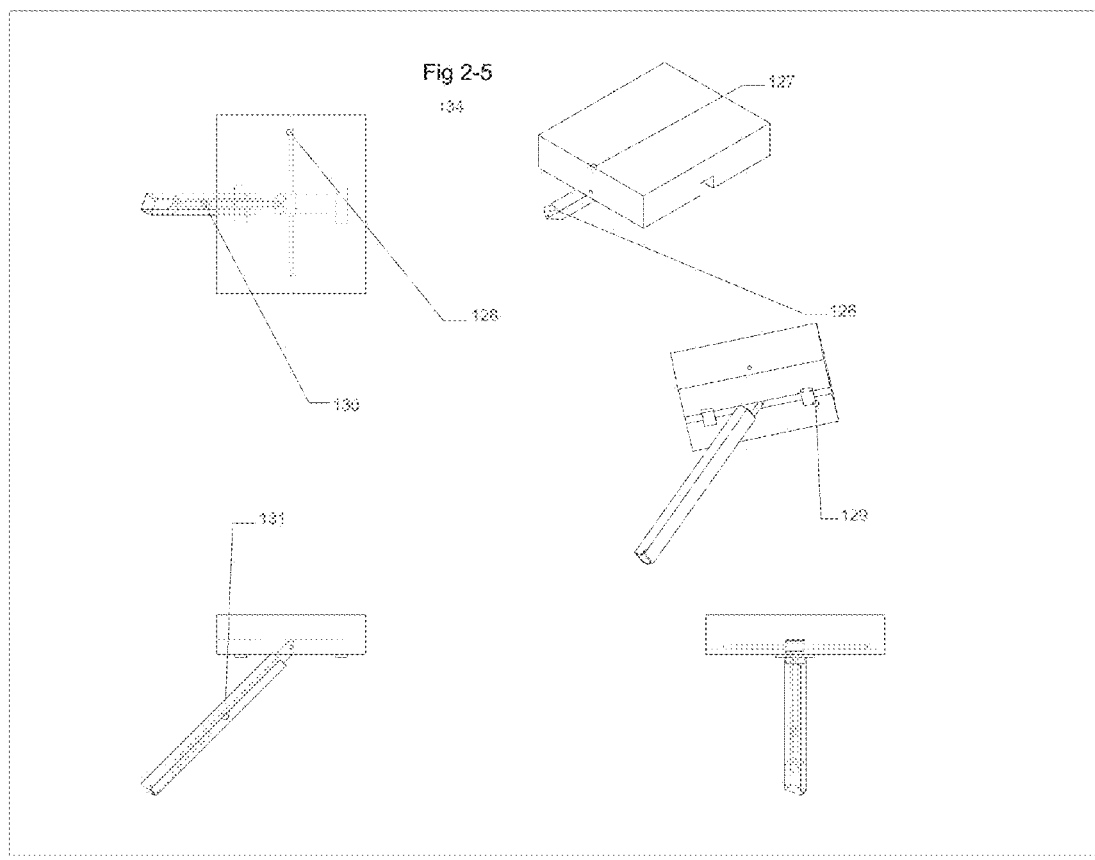
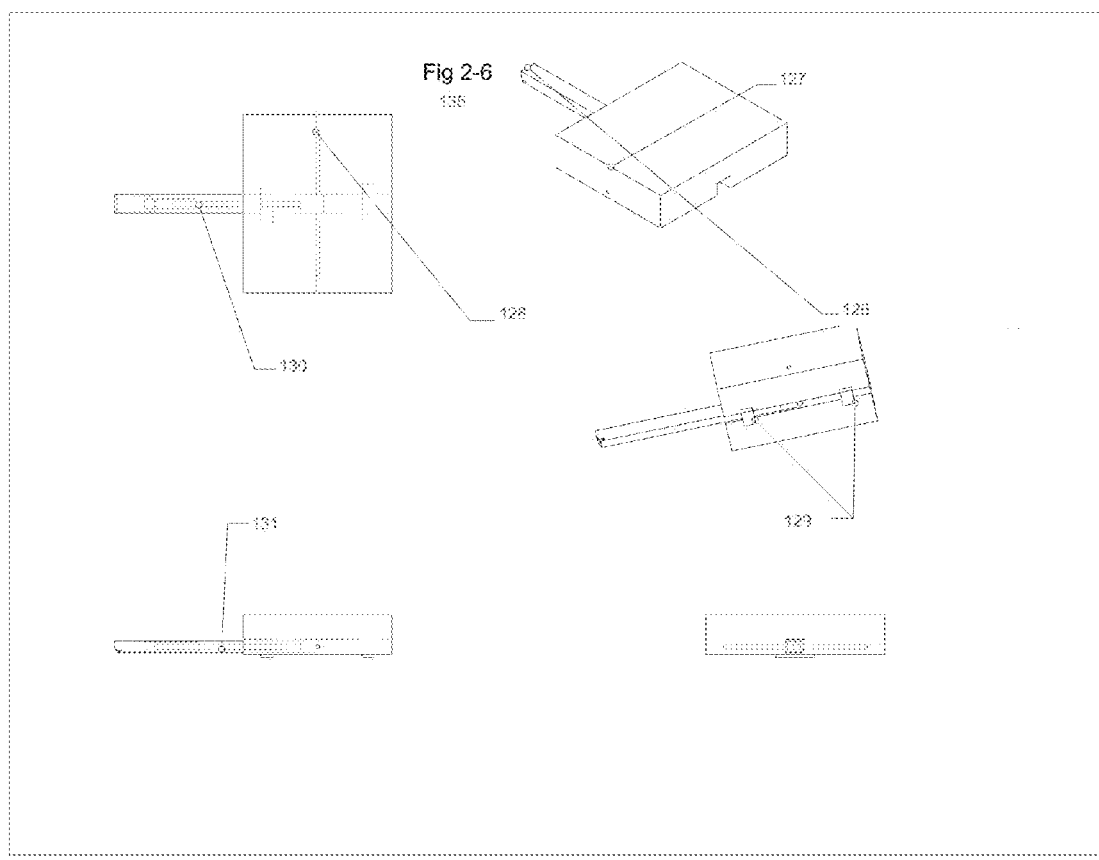

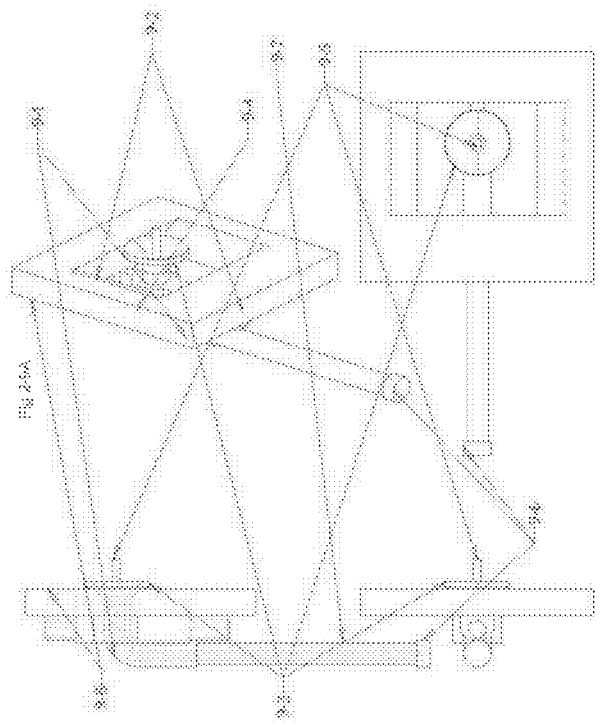
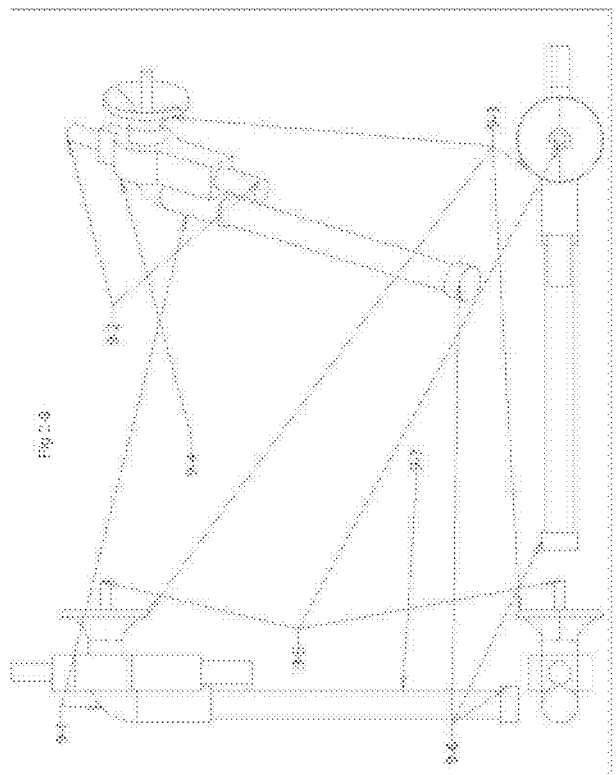

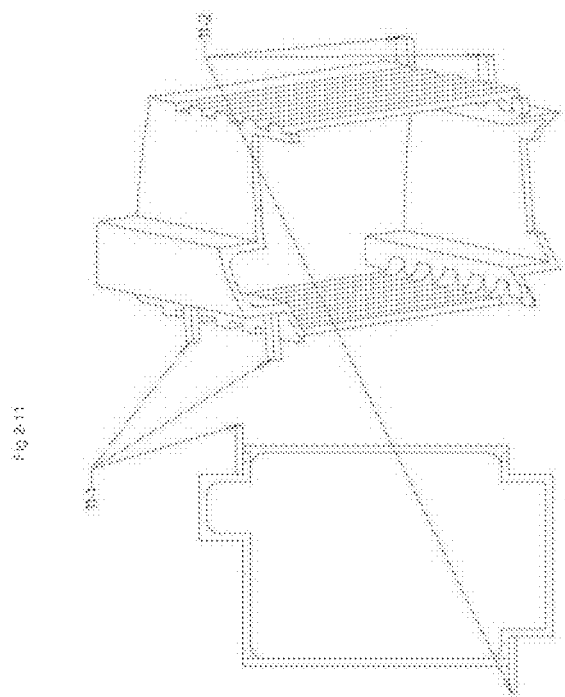
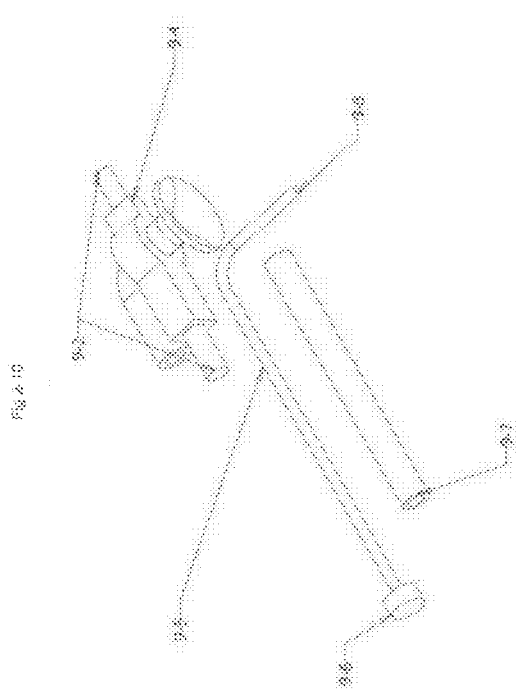

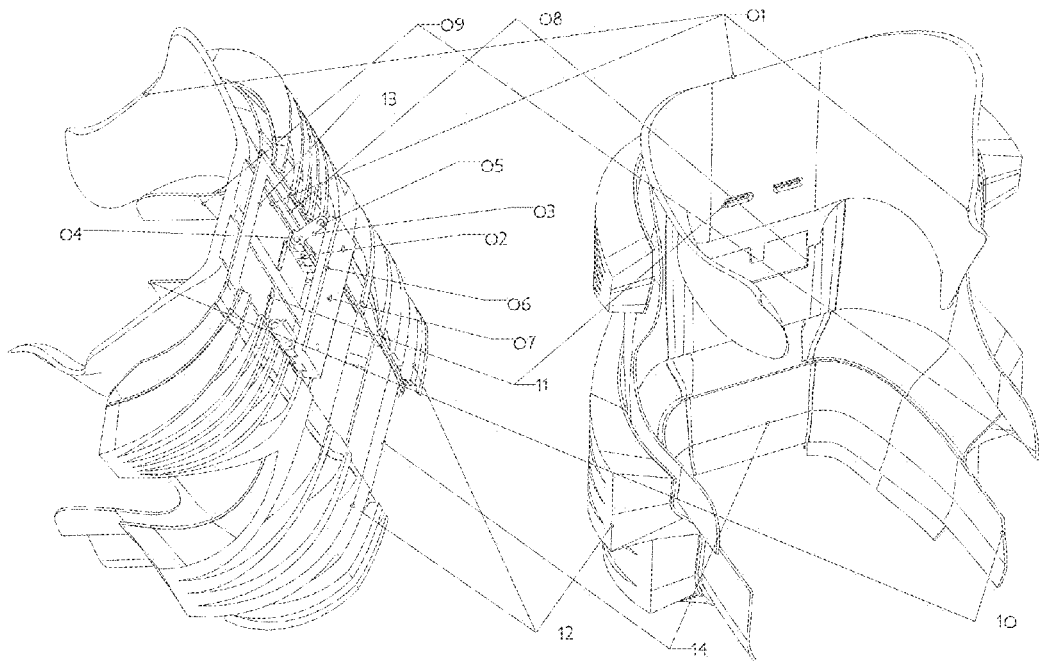
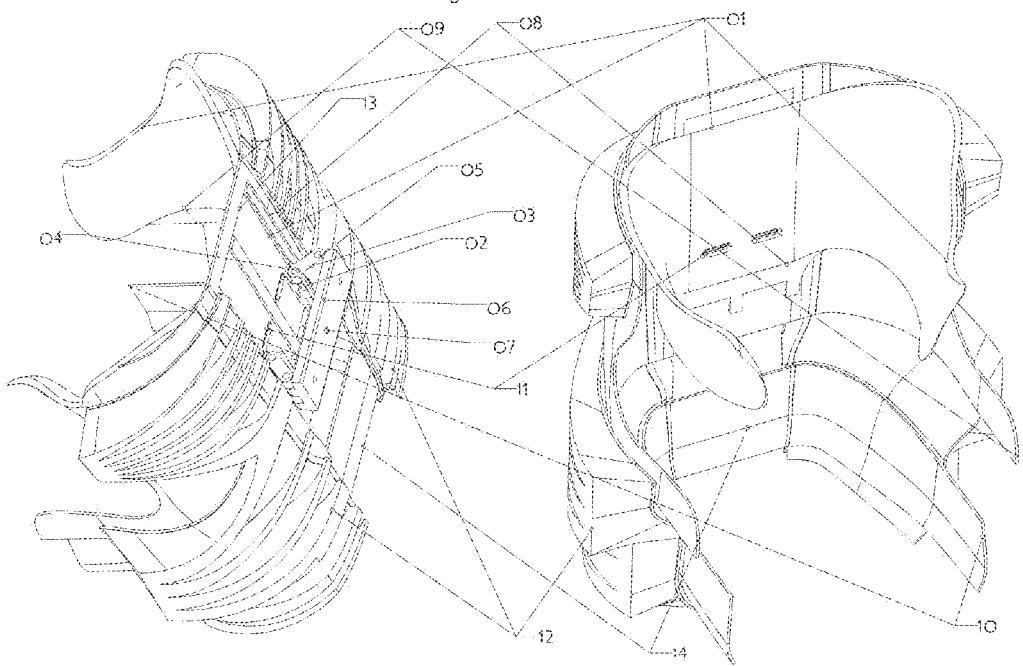

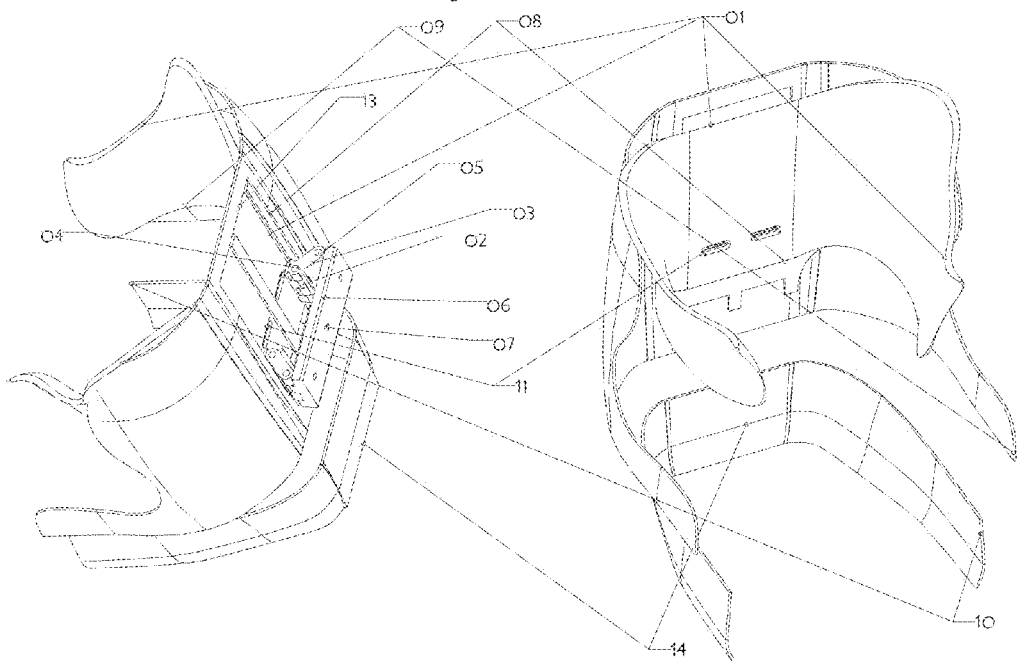
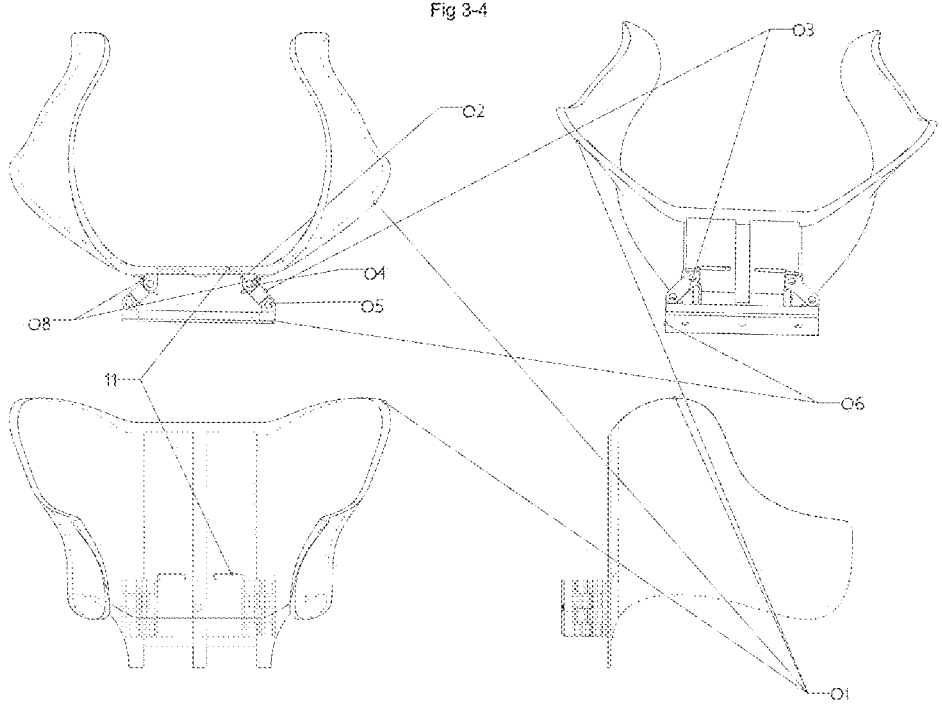

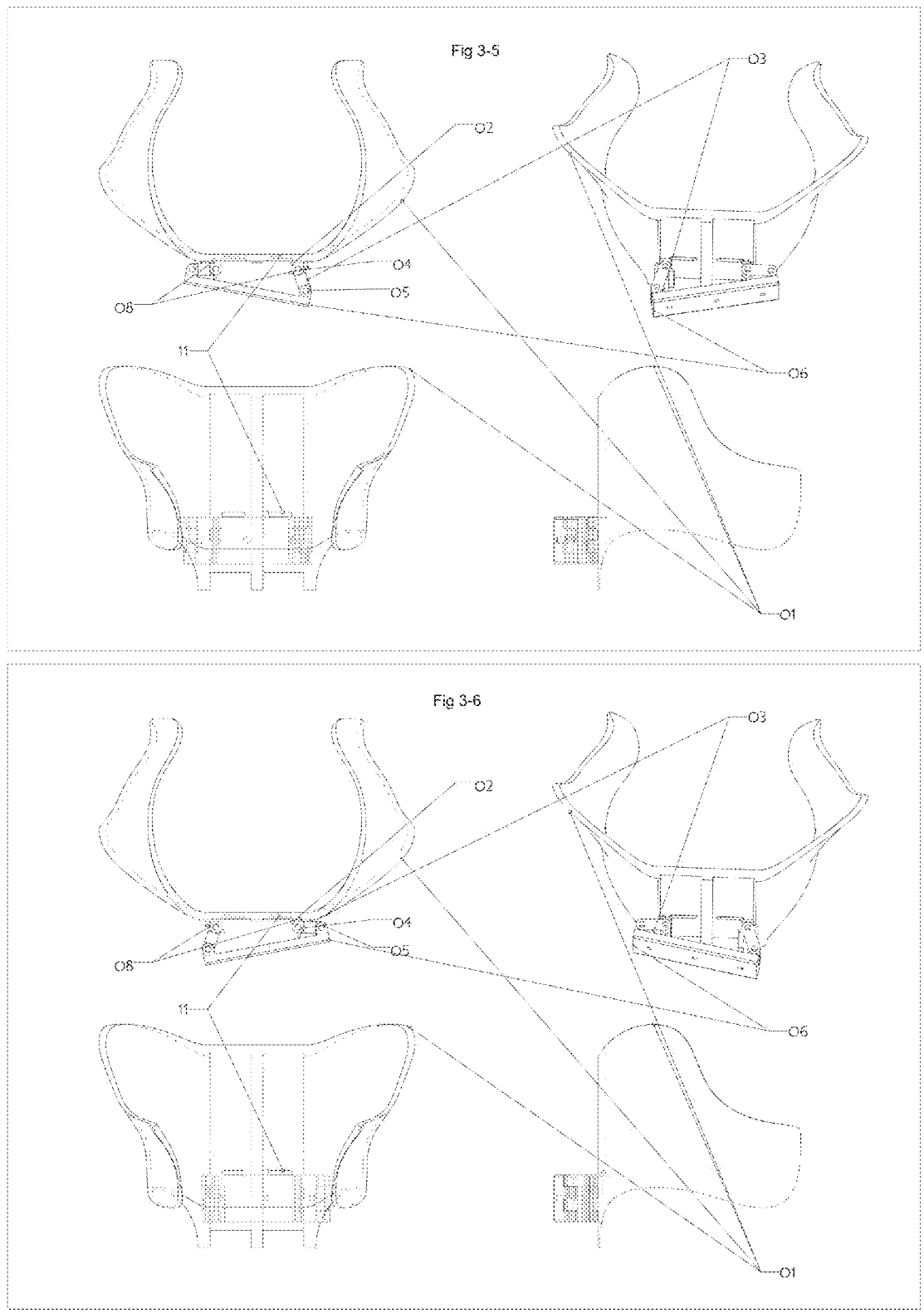

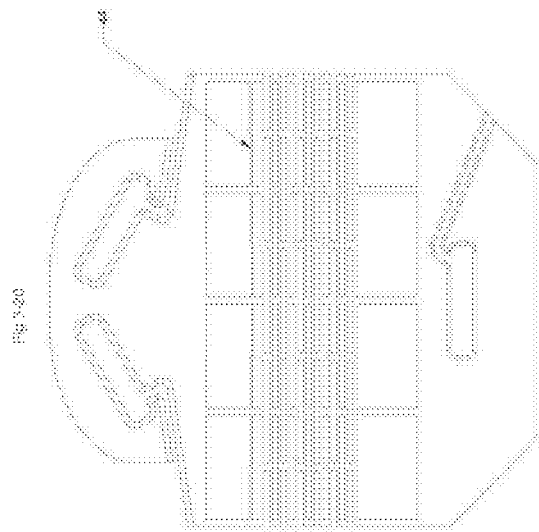
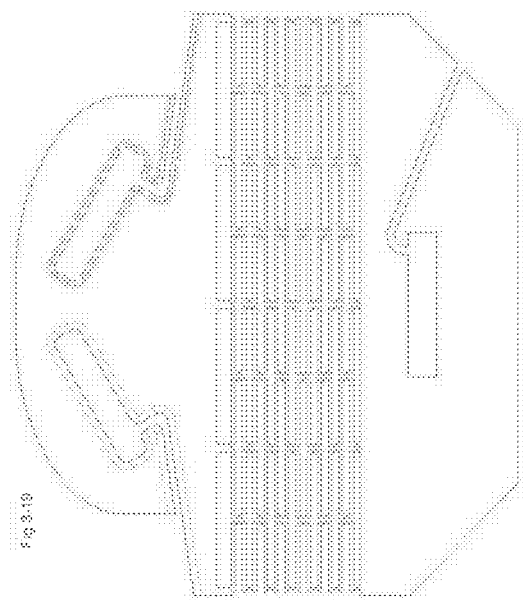

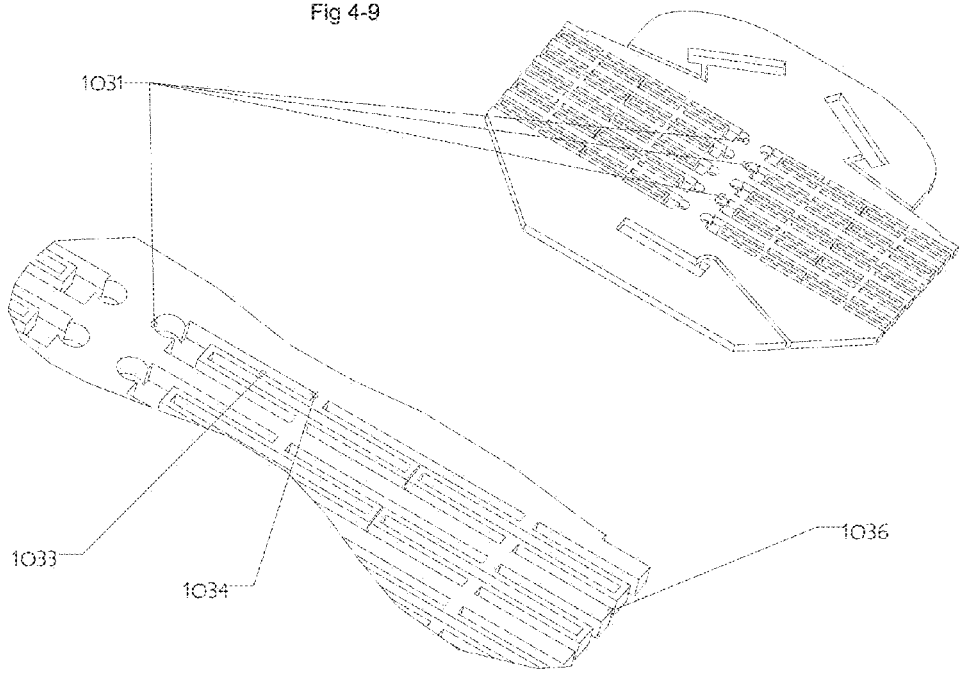
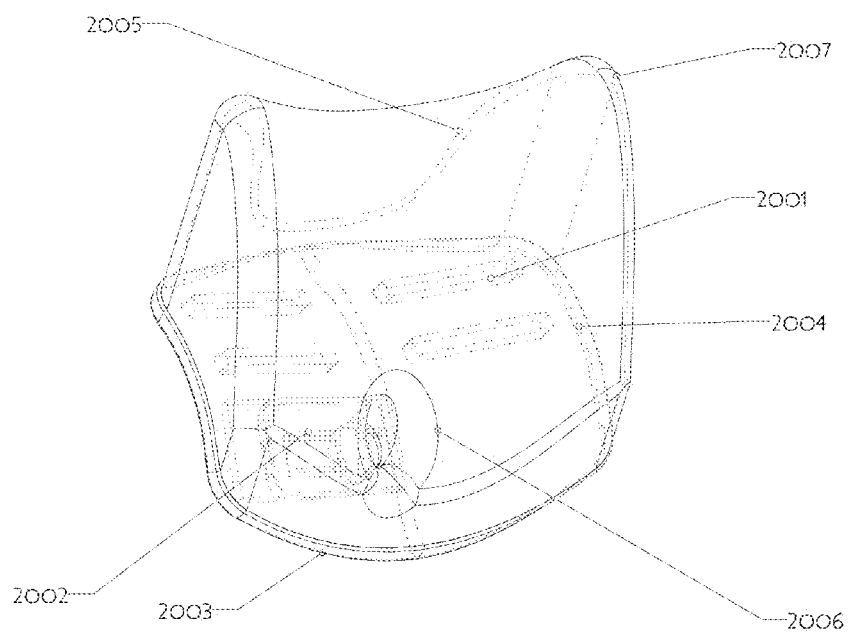

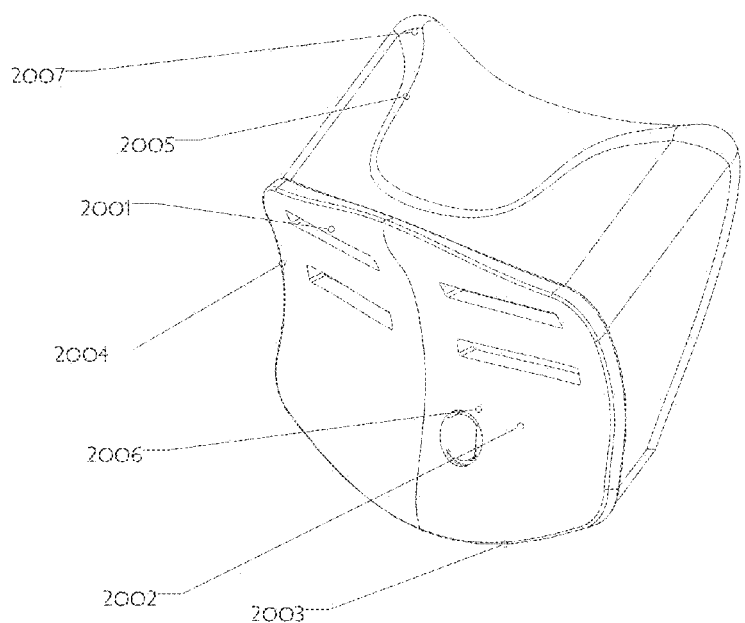
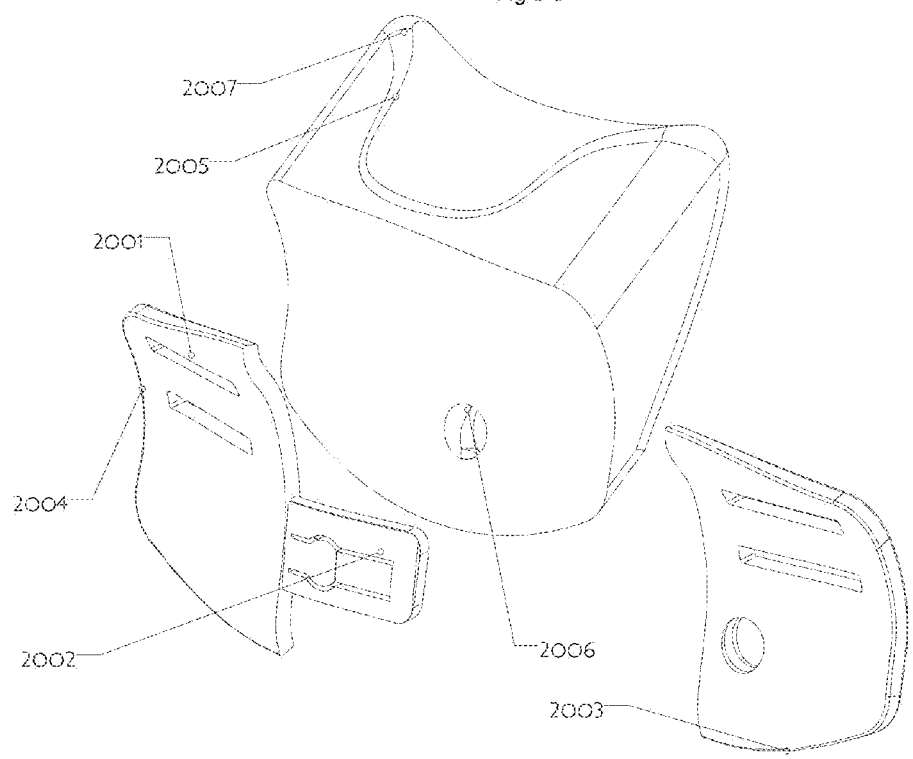

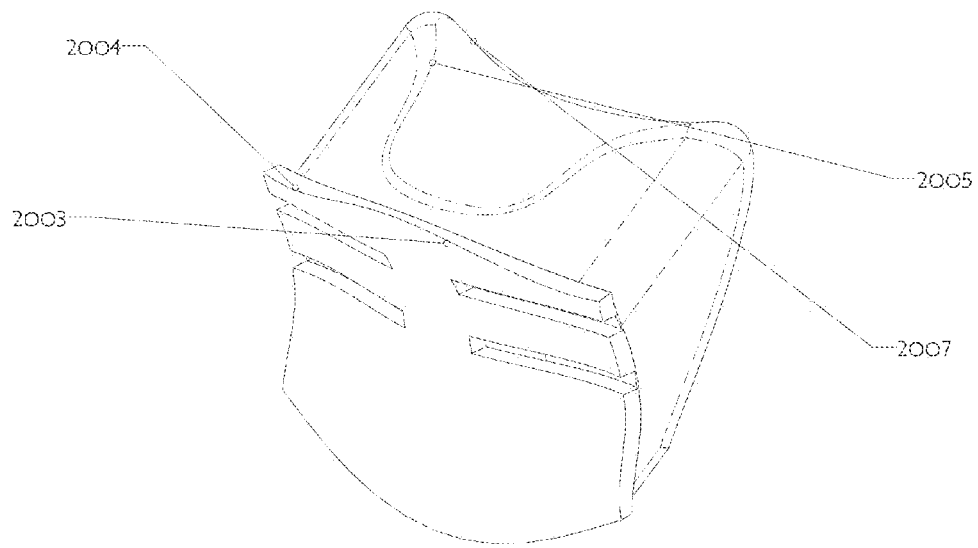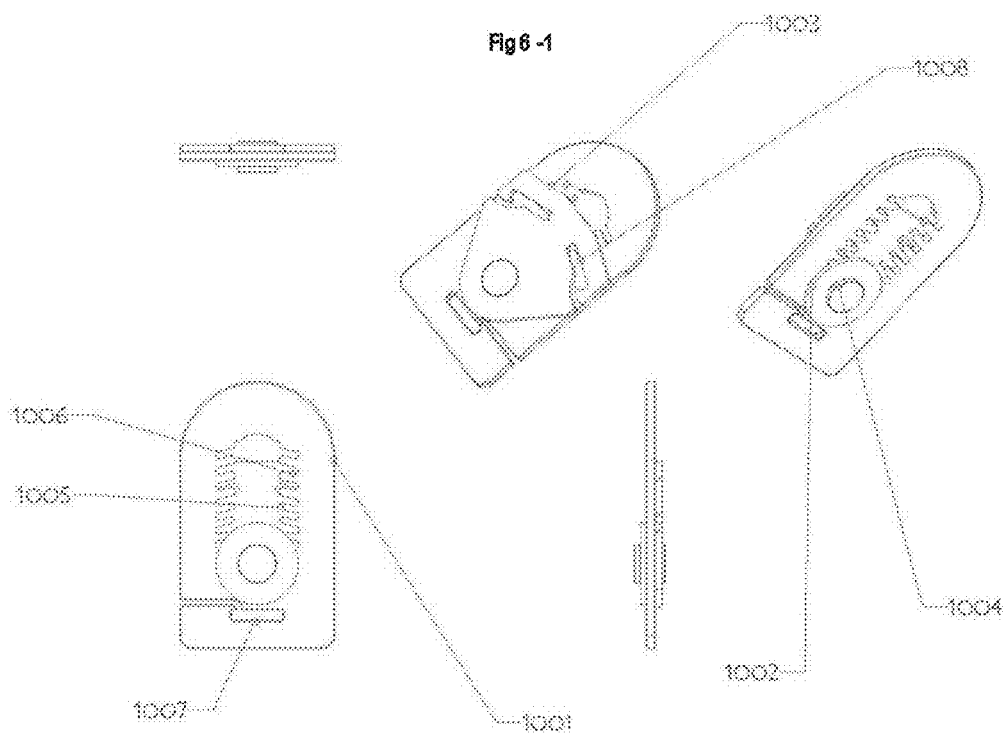

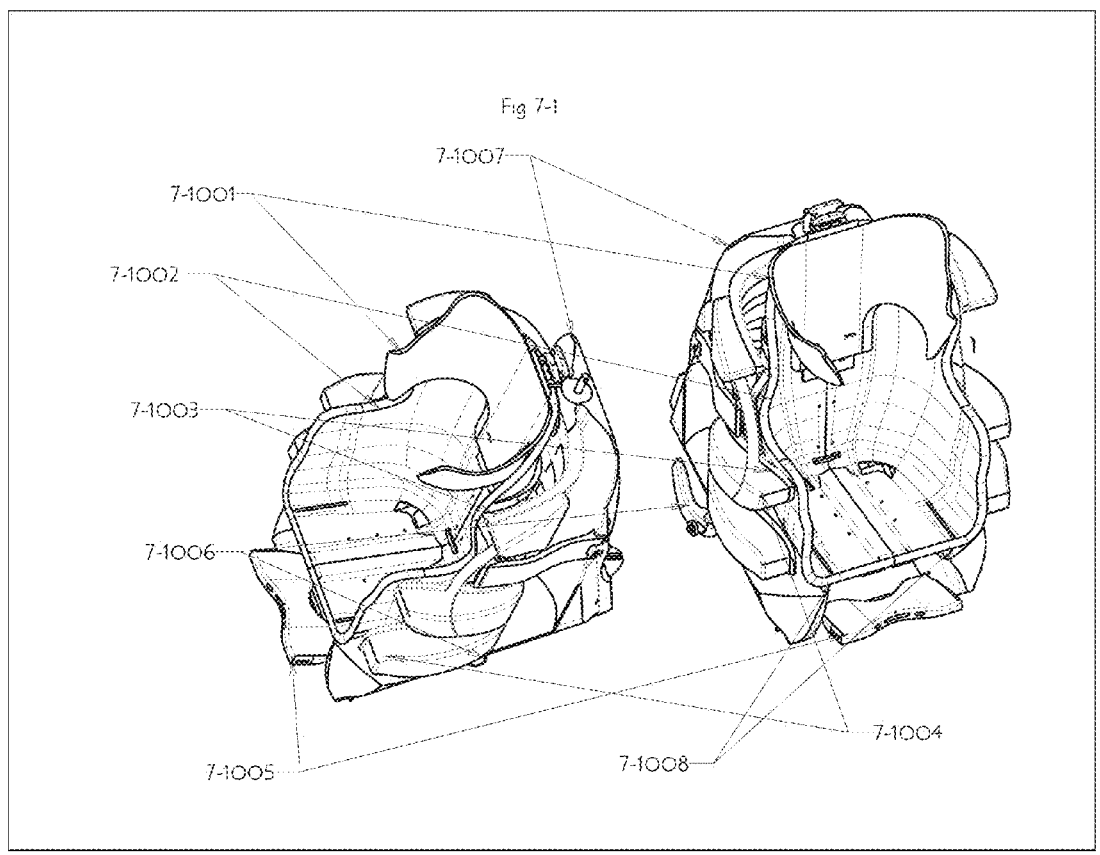
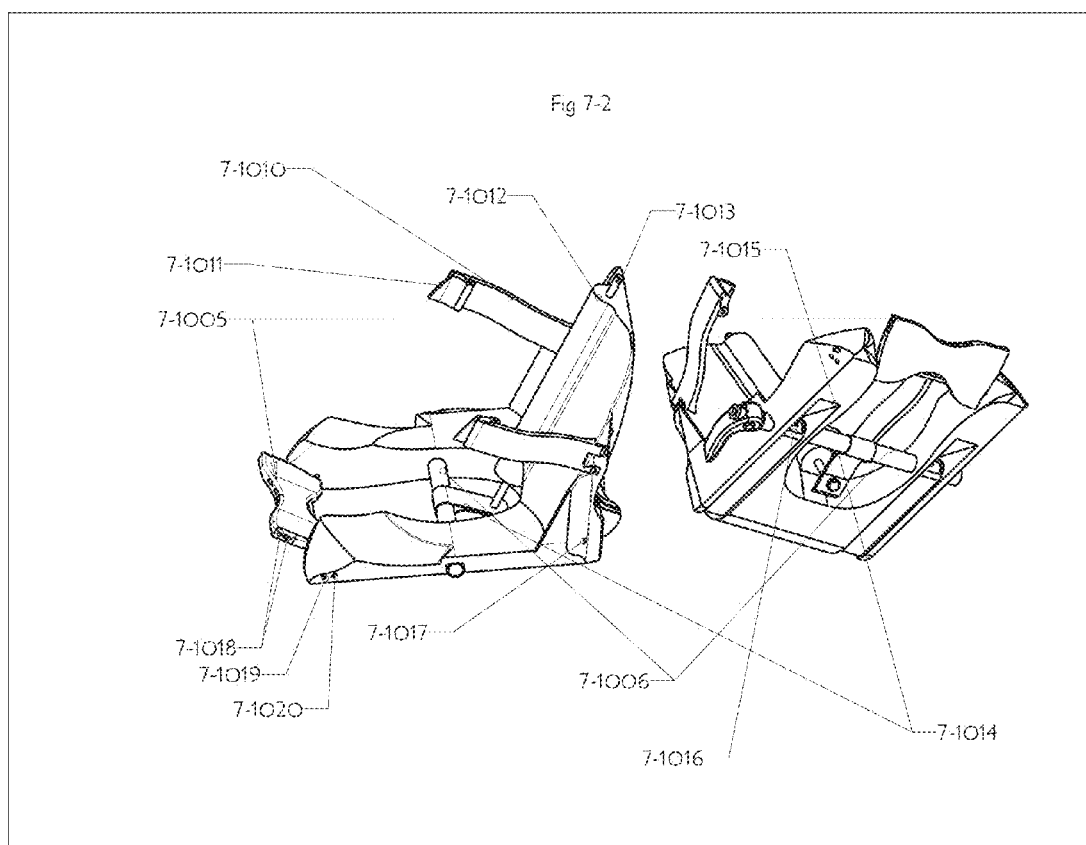

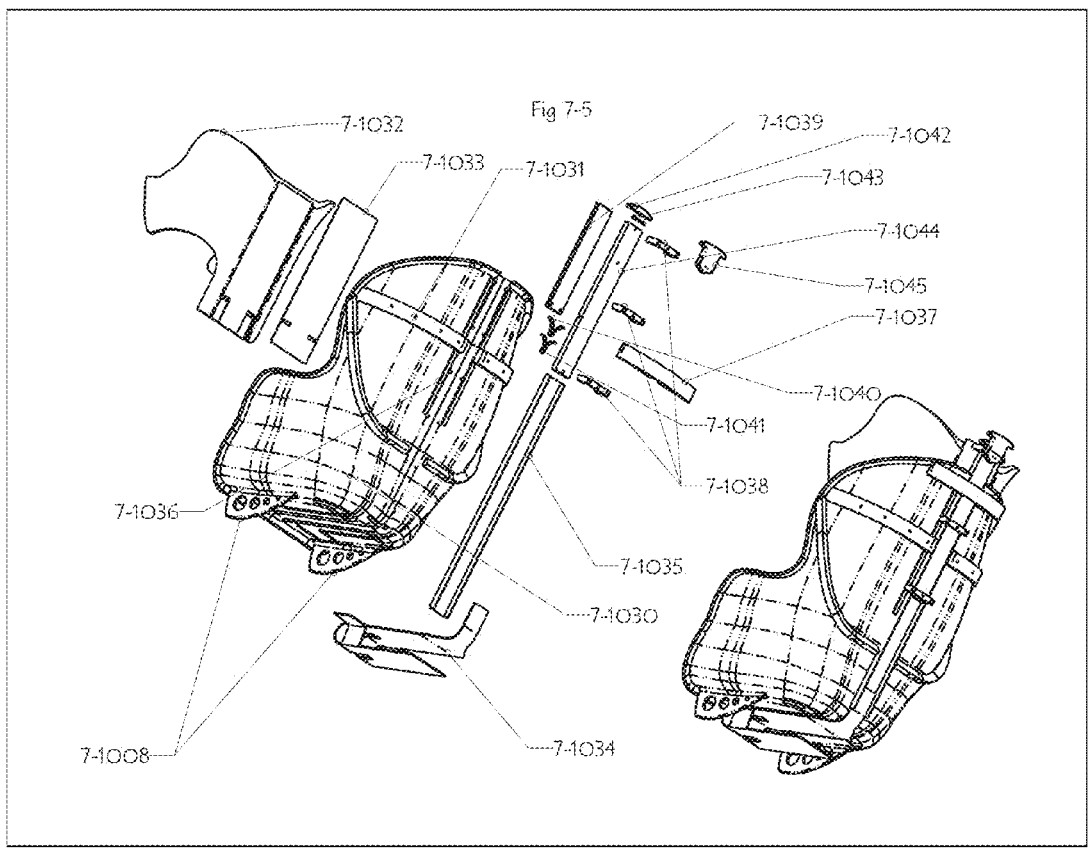
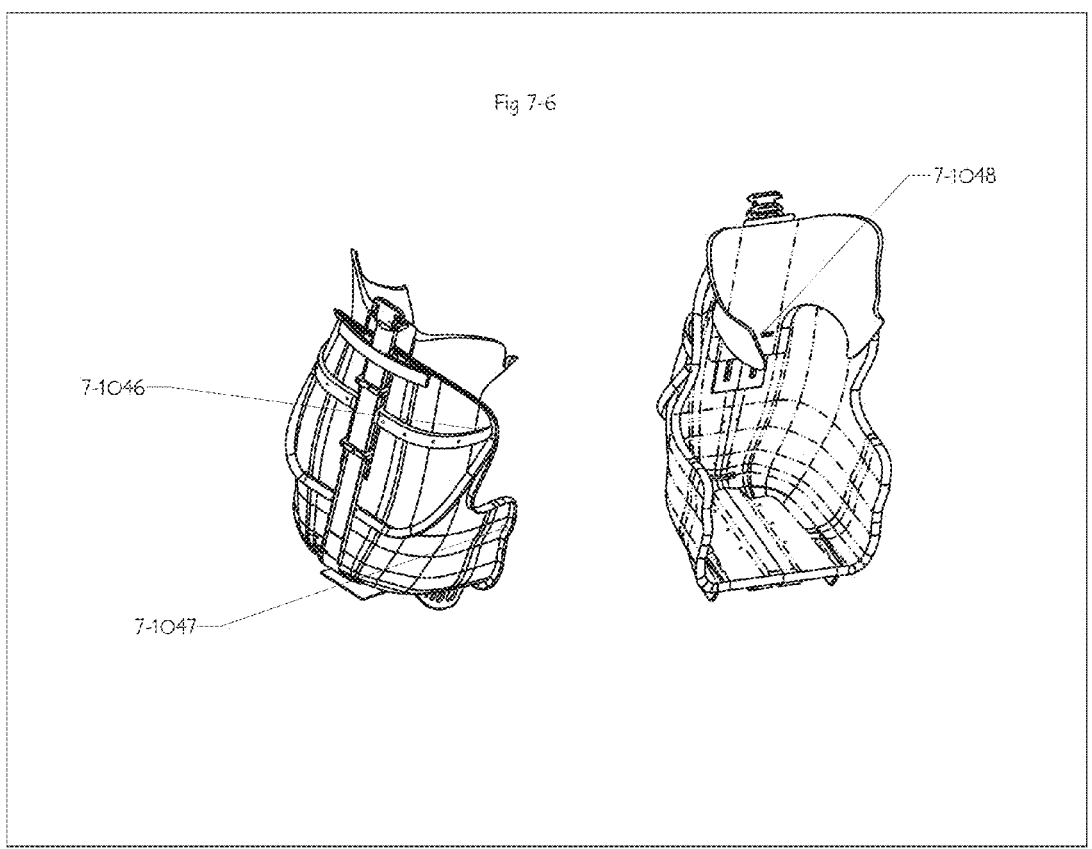

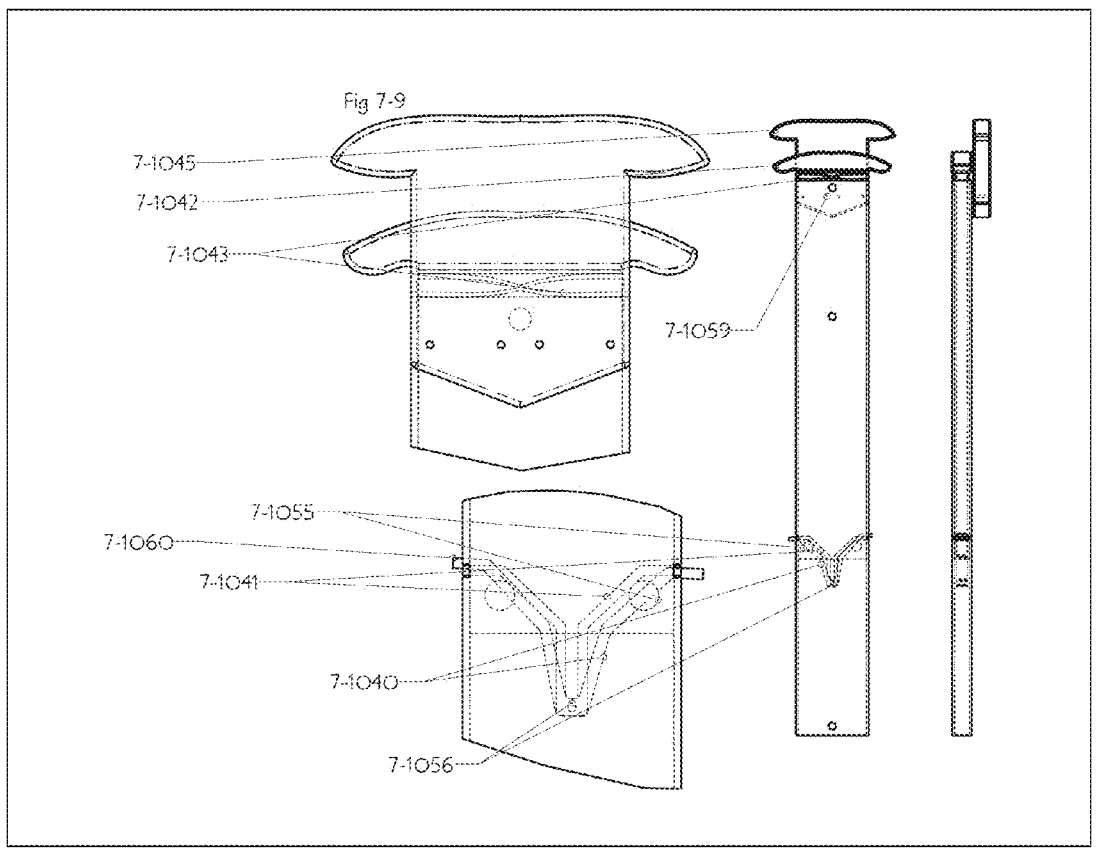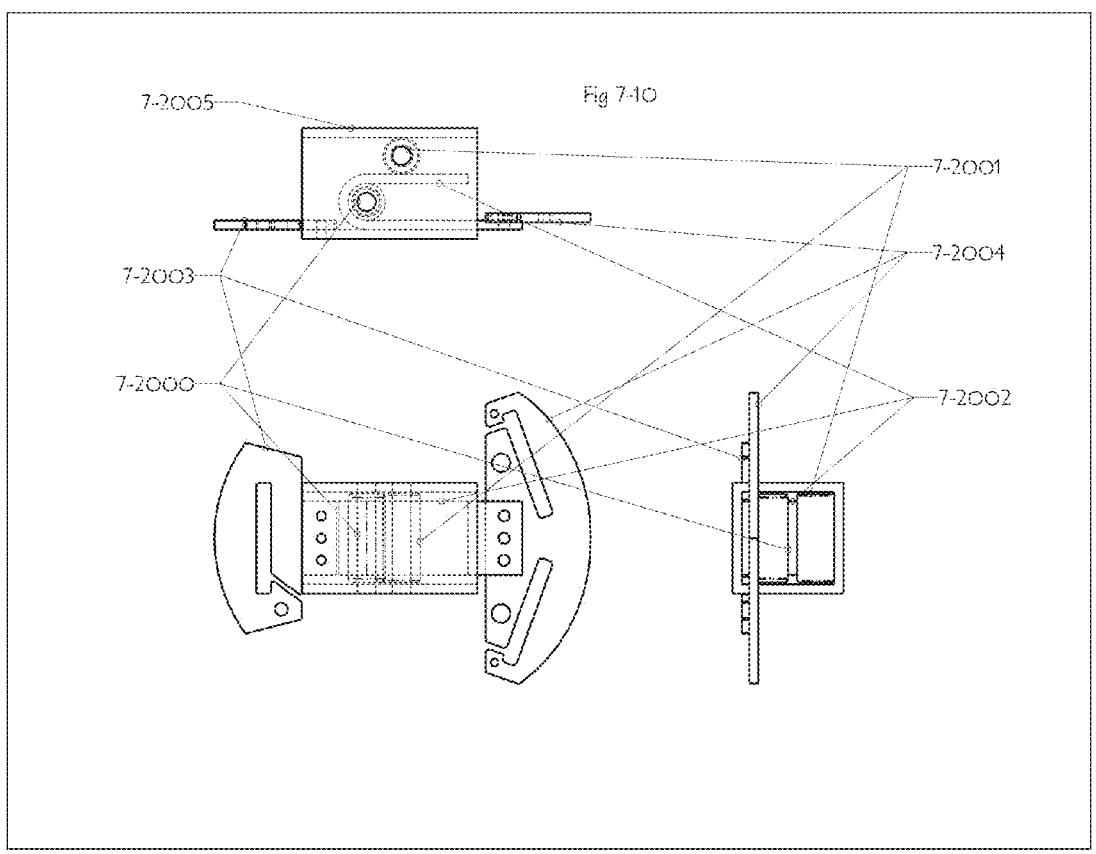

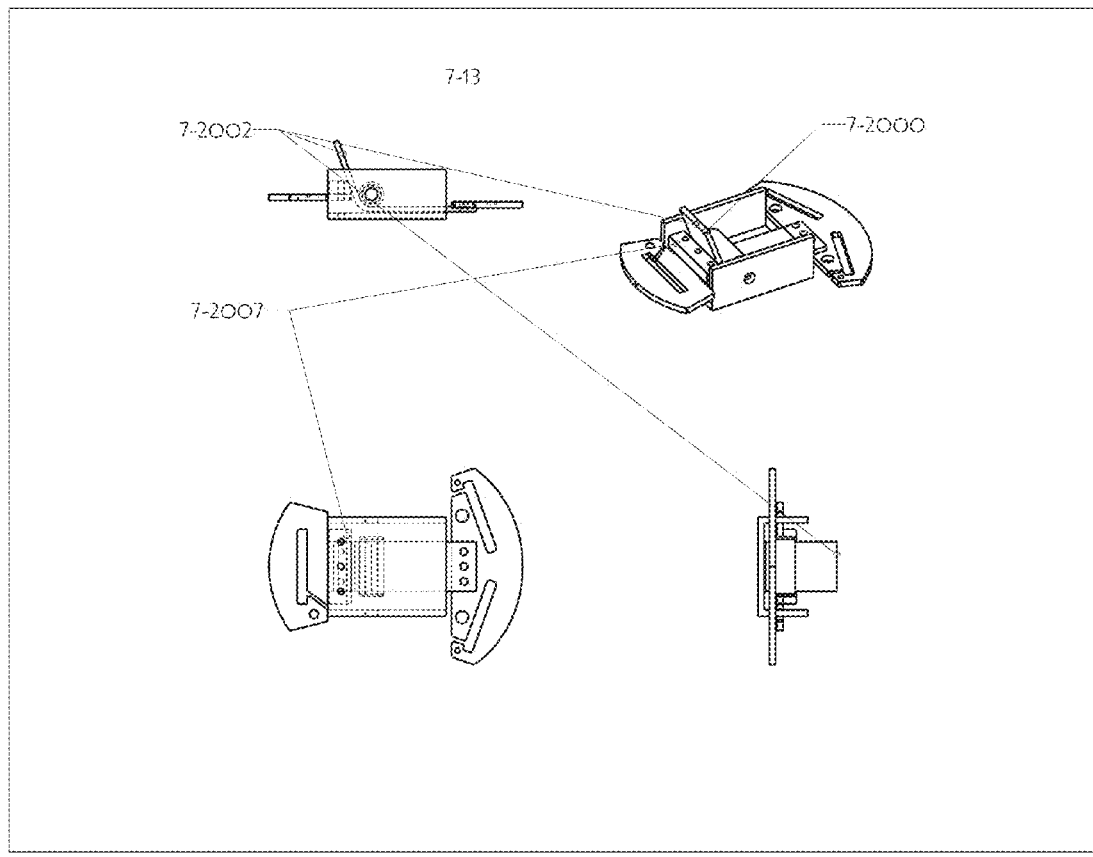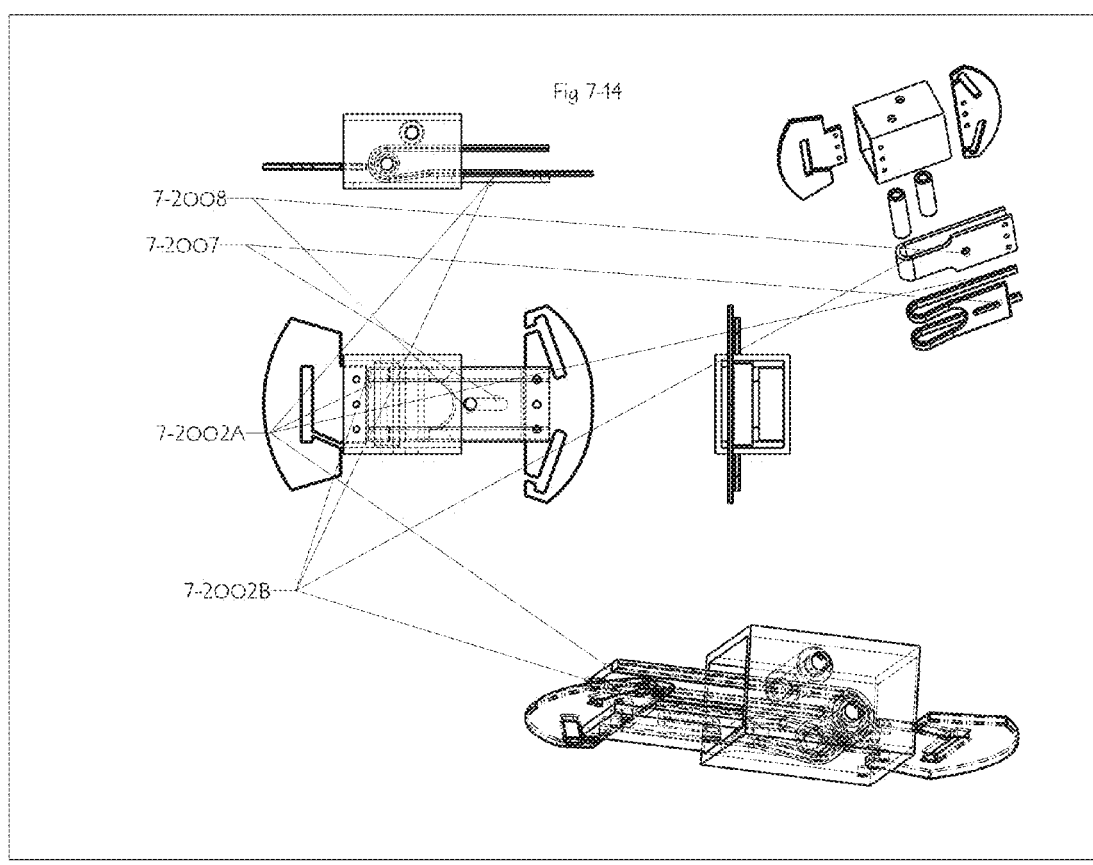

VEHICLE OCCUPANT SUPPORT

This application claims priority from Provisional applications: Ser. No. 61/402,751 filed Sep. 3, 2010; Ser. No. 61/404,335 filed Oct. 1, 2010; Ser. No. 61/458,997 filed Dec. 3, 2010; Ser. No. 61/459,689 filed Dec. 16, 2010; Ser. No. 61/460,266 filed Dec. 29, 2010; Ser. No. 61/465,160 filed Mar. 15, 2011.

SUMMARY

The present invention provides a new structure and passenger transport paradigm for accommodating passengers in a vehicle with particular attention paid to safety, utility and provides new features for utility.

FIELD OF INVENTION

The present inventions provide a new structure and passenger transport paradigm for accommodating passengers in a vehicle with particular attention paid to safety, utility and comfort.

DRAWINGS SUMMARY

The Drawings illustrate embodiments of the inventions. These features and more are described below. The invention relates to the referenced filed applications.

BRIEF DESCRIPTION OF DRAWINGS

101 - Stairs
102 - Leg Rest - retractable or pivoted.
103 - Seat Bottom
104 - Seat back
105 - Support Structure
106 - Arm Rests
107 - Actuator for seatback and bottom actuation.
108 - Lateral support for head under crash loadings
109 - handle for egress and ingress
110 - Staggered Upper tier accomodates egress ingress of lower tier.
111 - Front edge inclined to the Sleeper direction for the Aisle direction
112 - Actuator Shaft
113 - Seat Back Pivot
114 - Fixed support for seatback pivot
115 - Pivotal support tor actuator
116 - Seat Back to Seat Bottom pivotal connection
117 - Slider slot for Seat bottom front slide (may be a non-linear profile)
118 - Sliding pin, roller or slide attached to seat bottom guided by slot
119 - Seat Bottom
120 - Leg Rest - retractable in this embodiment (may also be pivotally supported to pivot down)
121 - Seat back support
9-1 - tube
9-2 - pivots
9-3 - flare
9-4 - support housing
9-5 - cable
9-6 - "piston" surface that can compress shock absorber (9-7)
9-7 - Shock absorbing crushable/compressible element
9-8 - body of CRS
01 - Headrest
02 - Headrest pivot support
03 - Headrest pivot support link
04 - Headrest Pivot support - forward pivot
05 - Headrest Pivot support - rear pivot
06 - Headrest support (attached to vertical movement mechanism or fixed to seat)
07 - Attachment means to vertical movement mechanism or fixed seat.
08 - Edge of shoulder plate - (engages notch on headrest Pivot support link)
09 side of shoulder plate
10 - Hip Plate side section

BRIEF DESCRIPTION OF DRAWINGS

Figures 1, 2, 3, 4, 5:
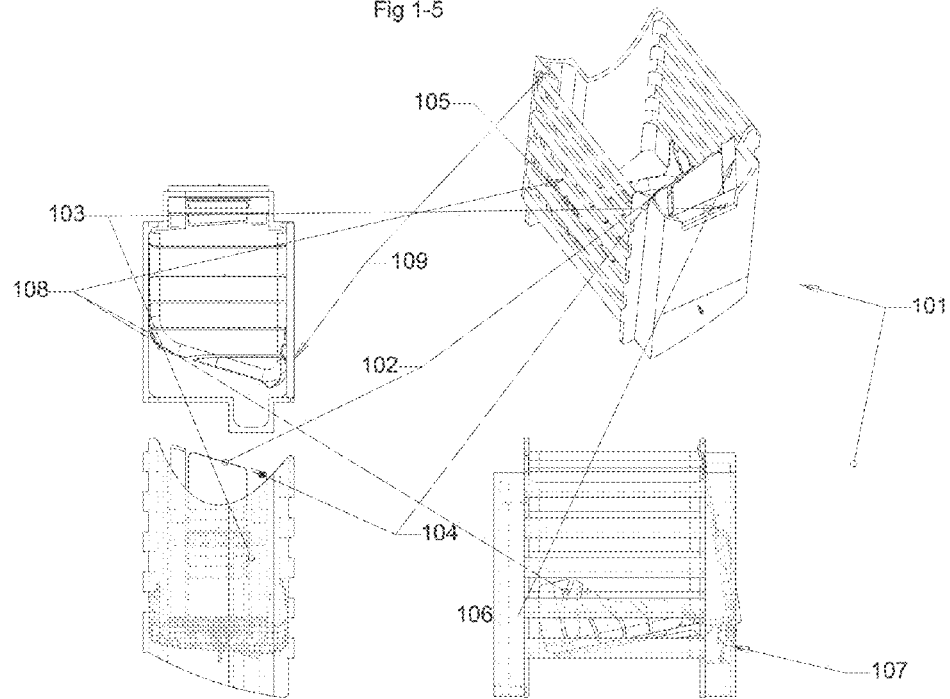

11 - Harness Pass though slot
12 - Shock Pad - Compressible and deformable support material (eg foam)
13 - Connection section between left and right parts of the shoulder plate
14 - Hip plate back section
15 - Support shell of the child seat
16 - Cross section varies to provide differential resistance to occupant. If rotation is desired rear sections will have a narrower cross section
17 - The inner face of the shock pad may be contiguous by increasing the cross sections to meet at the surface.
20 - Connection between extending or deforming sections
21 - Extending or deforming section
22 - Attachment slot for harness tensioning section of webbing
23 - Attachment slot for each of the two harness sections for the child.
24 - Rivet (only 2 shown)
25 - fracture element 1
26 - Fracture element 2
27 - Fracture element 3
28 - Rivet Hole for Fracture element 1
29 - Rivet slot for Fracture element 2 (shorter than for Fracture element 3)\
30 - Rivet slot for Fracture element 3 (longer than for Fracture element 2)
31 - Support holes for Rivets
32 - Friction elements secured by rivets under tension.
33 - crush system housing cylinder
34 - Crush system
35 - cable with end stops
36 - Support flange of r crush system housing cylinder
37 - harness strap upper plate
38 - support flange for cable support
39 - harness strap lower plate
40 - Piston
41 - Section 1 of structure
42 - section 2 of structure
43 - connector with pins
44 - Buckling element
1001 - Latch tension lever
1002 - Latch carrier
1003 - Latch carrier brace
1004 - Top Brace
1005 - Front Brace
1006 - Support Shell/Outershell
1007 - attachment screw
1008 - Attachment screw holes
1009 - Aperture for rotating latch (to face up from rear facing to front facing and vise versa)
1010 - Plugs to engage sockets on Latch carrier brace
1011 - Aperture for Latch body end for attachment
1012 - Engaging Sockets for plugs on Top Brace and Front Brace
1013 - Plugs to engage sockets on Latch carrier Brace
1014 - Latch tension assembly
1015 - Pivot for Latch carrier Brace
1016 - Latch Pivot Tension tube
1017 - Cable Nipple (cable not shown but attached to both latches and threaded through nipple and over the pulley.
1018 - Pulley Access Slot
1019 - Cam Pin
1020 - Cam Thumb Nut
1021 - Cam assembly pulley
1022 - Cam Tension Bar Threaded for Cam Thumb Nut
1023 - Access hole for cable
1024 - Access slot for Pulley (alternate attachment of Latch cam assembly on this end of Tube
1025 - Pin
1030 - Harness loop hooks
1031 - Fracture neck
1032 - Tension webbing hook
1033 - Deforming sections
1034 - Link Sections
1035 - Separated sections to allow lateral movement while stretching
1036 - Section Supports
2001 - Harness slots
2002 - Release catch
2003 Right half - Chest plate
2004 - Left half - Chestplate
2005 - chin support surface
2006 - access aperture of r catch on chest plate

BRIEF DESCRIPTION OF DRAWINGS

2007 - Chin rest
6001 - Resistance plate
6002 - Washers
6003 - "T" Bar
6004 - Rivet
6005 - deforming fingers under load - section 1
6006 - deforming fingers under load - section 2
6007 - Harness Tightening webbing hook (similar arrangement can be used for the Tether as well)
6008 - Left and Right Harness webbing hooks (may be a single hook or loop in some embodiments for harness, tether and either of these or a bolt hole for a car seat belt support)
6009 - aperture to adjust initial deformation on loading
6010 - recess for matching washer that deforms the resistance plate
6011 - deforming sections between slots - Section 1 spacing and size
6012 - - deforming sections between slots - Section 2 spacing and size
6013 - Bolt hole or support hook for auto seat belt
6014 - Bolt holes for attaching to vehicle
7-1001 - Head Rest Assembly
7-1002 - Inner Shell
7-1003 - Outer Shell/frame
7-1004 - Outside aircushions
7-1005 - Foot rest/Front Brace (5-1005)
7-1006 - Latch assembly
7-1007 - Frame assembly
7-1008 - Support legs for inner shell on frame
7-1010 - Brace arm
7-1011 - Brace - lock
7-1012 - Central pivot support (hinge sections not shown)
7-1013 - Central Pivot rod/Tether support
7-1014 - Brace: Latch assembly to central pivot rod (tensile support brace shown. Can also be a compression enabled brace)
7-1015 - Recess for Latch tension assembly on frame body
7-1016 - Pivotted latch housing (front facing and rear facing positions possible)
7-1017 - hole on frame body for latch housing in front facing mode.
7-1018 - holes on foot rest/front brace for attaching latch housing for rear facing seat mode.
7-1019 - holes on frame for attaching latch housing for rear facing seat mode
7-1020 - Multiple adjustment positions for foot rest in forward facing mode.
7-1021 - rod for securing foot rest/front brace.
7-1022 - Aperture on latch carrier for securing in front facing position (rod for securing not shown)
7-1023 - Aperture on frame body for securing in front facing position (rod for securing not shown)
7-1024 - Tether support aperture.
7-1025 - Torsion brace tube - for support of main shock strip (rear aperture engages pivot rod 7-1013)
7-1026 - Cavity for Torsion brace tube
7-1027 - Aperture for rod engaging the main shock strip.
7-1028 - Support beam on Outershell/frame for main shock strip support
7-1029 - Brace beam for Brace arm and lock on outer shell/frame.
7-1030 - Inner Shell body
7-1031 - Elevated support for cross support strip (strip not shown) (elevation ensures no contact with headrest adjustment assembly)
7-1032 - Headrest
7-1033 - Brace plate for headrest with apertures for harness and apertures for supporting staples with fasteners to headrest.
7-1034 - Man shock strip
7-1035 - Brace section (attached to main shock strip)
7-1036 - Slots for staple legs to reach brace plate for headrest.
7-1037 - Bunge sling
7-1038 - Staples attached to adjuster tube and to brace plate through slots in inner shell body
7-1039 - adjuster plates for headrest adjustment mechanism
7-1040 - Latch - normal position (engages slot in brace section at different heights of headrest)
7-1041 - Latch - retracted position (engages slot in brace section at different heights)
7-1042 - Handle attached to adjuster plates
7-1043 - Spring (compression) between adjuster plates and adjuster tube.
7-1044 - adjuster tube
7-1045 - handle attached to adjuster tube
7-1046 - Upper Side shock strips (optional) or outer shell/frame may contact on cross support strip attached to this raised section
7-1047 - Lower Side shock strips (optional) or outer shell/frame may contact this section of inner shell
7-1048 - apertures for harness
7-1049 - Slot for harness below main shock strip
7-1050 - Raised platform and apertures for fasteners for main shock strip. An additional plate may be secured with the same fasteners above the bottom of the inner shell body to hold down the harness under tension.
7-1051 - Slot for harness (Below main shock strip). See gap in assembly drawings.
7-1052 - apertures for securing brace section (7-1035)
7-1053 - Staple legs go through slot in inner shell body (spaced)
7-1054 - Recess for harness. The recess may extend across and deepened to accommodate a strong plate to reinforce harness support for front impact loading.
7-1055 - aperture on adjuster plates for pin. Pin pulls up the adjuster Latch when plates are raised
7-1056 - aperture for pin attaching latch to adjuster tube (slot for pin on adjuster plate not shown)
7-1059 - fastener holes for handle
7-1060 - Latch pins engage slots in tha brace section 7-1035
7-2000 - Main roller (support pin not shown)
7-2001 - secondary roller (support pin not shown)
7-2002 - deformable strip
7-2003 - Lower hook
7-2004 - Upper hook
7-2005 - body
7-2006 - Cut out on deformable strip (lower force for deformation)
7-2007 - Slot on First deformable strip
7-2008 - Pin hole (pin not shown) on Second deformable strip
7-2009 - Wedge
7-2002A - First deformable strip
7-2002B - Second deformable strip FIG. 1-1: shows four views of the AirSleeper for the upper tier in the flat bed position. This embodiment has an open top and a support element for the screen and/or oxygen system. This view shows the flat bed position.

FIG. 1-1D shows the same views as FIG. 1-1 but in a sit-up position.

FIG. 1-2: Shows the upper tier AirSleeper in the recline position

FIG. 1-3 is the same as FIG. 1-2 except that the internal parts are shown. The operation of the actuator is clearly seen in this view.

FIG. 1-4 Shows the same embodiment in the sit up position

FIG. 1-5 shows the lower tier with support at the top for the upper tier.

FIG. 1-6: show the modular interlocking of the lower and upper tier Air Sleepers. It also illustrates the staggering of the upper tier sleepers to enable access for the lower tier sleepers The Step are mounted on the sidewall of the lower sleepers in many embodiments so that obstruction to the egress ingress of the lower tier occupant is minimized. The back wall of the leg space can be used for the video monitor of the lower tier occupant.

FIG. 1-12 shows the mechanism and actuation of the seat in one of the embodiments. A single actuator can both change the posture of the seat from flat bed to sit up and also push out the leg rest when the bed is in the flat position. A latch arrangement many of which are well disclosed in the background art, will allow the pivotal attachment of the actuator shaft to the seat bottom and the seat back to slide along the seat bottom once it is in the flat position and thereby enable the actuator shaft to push out the leg rest. More conventional designs can have separate actuators for the seat back and bottom as shown to the separate actuator (either manual or mechanical) to actuate the sliding leg rest.

The actuation of the pivot between the seat back and bottom makes the seat back pivot on its static pivotal point 113 attached to the structure and moves the bottom of the seat back along an arc, carrying with it the back of the seat bottom. Near the front of the seat bottom there is a slidable attachment to the static structure that moves the front of the seat along a path for the optimal inclination of the seat bottom. The sliding path may be designed to be a curve to optimize the seat bottom inclination. The seat back has a protective side in many embodiments to protect the occupant in a partially or fully side impact condition.

FIG. 1-13 shows the same mechanism as FIG. 1-12 but is in a different inclination.

FIG. 1-14 is the same as FIG. 1-12, 1-13 in the upright position. It may be seen that the actuator pivots about its mount during the actuation process.

FIG. 1-1 D shows the upper tier embodiment and the steps to reach it that would typically be installed on the lower tier sleeper side wall.

FIG. 1-2D shows the lower tier sleeper. The embodiment shown has the modular structure with interlocking elements for strength.

FIG. 1-6D shows the modular elements interlocked. FIG. 1-7F shows an embodiment with upper and lower sleepers FIGS. 1-8D, 1-8Da, 1-9D, 1-9Da, 1-10D, 1-11D and 1-11Da show another view of the embodiment.\

FIG. 2-1: Support structure for a single lower tier Airsleeper that functions as a module that can be interlocked with adjoining AirSleeper modules. Considering the high moments that are experienced during axial deceleration under crash loading conditions, the embodiment shows flanges and support surfaces that will interlock with the adjoining modules to prevent reorientation of the modules by countering the moments.

FIG. 2-2: Shows a the support structure for an AirSleeper module with an embodiment of arrangements to provide resistance to the axial crash loadings. Here the structure used for separating the leg area of the upper tier from the lower tier occupant and the step structure are used to brace the module structure of the lower tier Airsleeper by providing a shear plane. The shear plane may be extended further to the further sided of the AirSleeper module but will in that situation reduce the egress and ingress comfort of the occupant. The actual step structure may also have a rear wall that can provide an additional shear plane.

FIGS. 2-3 to 2-6: shows an embodiments of the latch or ISO-FIX structure in a Child Restraint System. The embodiment is pivoted on the Child Restraint System body structure, and is located in a recessed groove. The structure can also pivot about its own axis. The two axes of rotation allow the latch/ISO-FIX to be reversed for a rear and front facing seat. These figures show the different stages during the transition from a front facing to a rear facing seat position or vise versa.

FIG. 2-7: Shows the exploded view of the same latch/ISO-FIX assembly.

FIG. 2-8: shows an embodiment of a foot frame for the Air Sleeper with arrangements to accommodate the torque or moment during axial loadings of a crash loading. The ledges shown counter the moments between the foot frames and equalize the loading as a result without transferring these forces directly to the tracks. Moreover the figure shows arrangements for equalizing the loads between the latches attached to the tracks. The elongated apertures with flexible and deformable inserts allow some deflection till the forces equalize between the latch points either during crash loadings or flexing of the airframe.

FIGS. 2-9, 2-9A and 2-10: show an embodiment of an assembly for a Child Restraint System that may be used to provide control for the lateral deflection of the rear part of the innershell supporting a child during side impact and/or forward deflection during a front impact. The assembly works as follows, 9-8 represents the body of the Child Restraint System or Child Seat, pivotally attached about a vertical axis to support housing 9-4 with pivots 9-2 which supports tube 9-1 that is flared (in some embodiments) 9-3. A Cable 9-5 is attached at its first end 9-8 to the support shell of the child that has one or more degrees of motion freedom at this support point under crash loading conditions in a plane substantially orthogonal to the axis of 9-2 (substantially horizontal plane). The cable passes through the tube 9-1 and then through a compressible shock absorbing element 9-7 that has spring and/or damper properties between its ends and is rigidly attached at its second end to the an end stop 9-6. 9-6 has a surface that can compress 9-7 upon retraction of the cable 9-5.

Upon tension of the cable in any direction in the plane of rotation of its end 9-8, the cable will compress the shock absorber element 9-7 and thereby extend out of the flared end of the tube at a controlled rate. Such tension on the cable can be due to the rotational motion of the support shell of the child about a near vertical axis towards the front of the seat thereby moving the rear of the seat sideways. With such motion the housing 9-4 will pivot about the axis 9-2, to face in the direction of the tension. In a second type of crash load conditions such as in front impact the cable end 9-8 will be tensioned in a substantially forward direction of the vehicle and with a support shell for the child having a substantially lateral and horizontal axis of rotation near the bottom of Child Restraint System, the seat will rotate and extend the cable thereby compressing the shock absorbing element. The Housing will remain in the forward facing position and the pivots 9-2 will ensure that the flared end points as near as possible with the pivotal motion, towards the direction of tension.

FIG. 2-11: Shows the support module for the AirSleeper. Here the moments created by the axial crash loadings are equalized using latch arrangements that may in some cases be retracted so that it will allow individual Airsleeper modules to be removed without removing adjoining AirSleeper modules for maintenance purposes or for partial repopulating the cabin with new AirSleepers for market or maintenance reasons.

FIGS. 3-1 to 3-8 show embodiments of a mechanism for side impact protection for an occupant in a vehicle particularly for children in child seat.

FIG. 3-1 Shows a mechanism to use the lateral motion induced by the movement of a shoulder plate that engages the shoulder upon lateral impact or acceleration.

FIG. 3-2 Shows the same arrangement as in FIG. 3-1 with the head rest in a low position.

FIG. 3-3 shows arrangement in FIG. 3-2 with Shock Pad removed, showing an embodiment of the shoulder plate and a hip plate.

FIG. 3-4 Shows the mechanism in FIGS. 3-1, 3-2 and 3-3 in the normal position.

FIG. 3-5 Shows the position when the shoulder plate engagement of the notch on the Headrest pivot support link FIG. 3-6 shows the movement for an impact from the left hand side which is exactly analogous to the FIG. 3-5 on the right side.

FIG. 3-7 shows an embodiment of the support shell.

FIG. 3-8 shows an embodiment of the shock pads.

FIGS. 3-9, 3-11 to 3-18 Show several embodiments of a device that may be used to reduce front impact acceleration of the head.

FIG. 3-11 shows a device that can enable front impact protection using the same technologies.

FIG. 3-9 shows an embodiment of the load plate made of a ductile material, with a section that may be extended with a tensile loading FIG. 3-10 shows a similar load plate adapted to attach to a tether support when used for front impact protection in the attachment of the seat to the vehicle.

FIG. 3-11 Shows the Load plate with multiple fracture elements that can withstand specific predetermined loads before breaking.

FIG. 3-12 shows the same as FIG. 3-11 in exploded form.

FIG. 3-13 is a load plate with a single Fracture element.

FIG. 3-14 shows an embodiment with a friction loading between the bars and the plates.

FIGS. 3-15 and 3-16 show yet another embodiment of a load extension device.

Figures 1, 2, 3, 4, 5, 6:
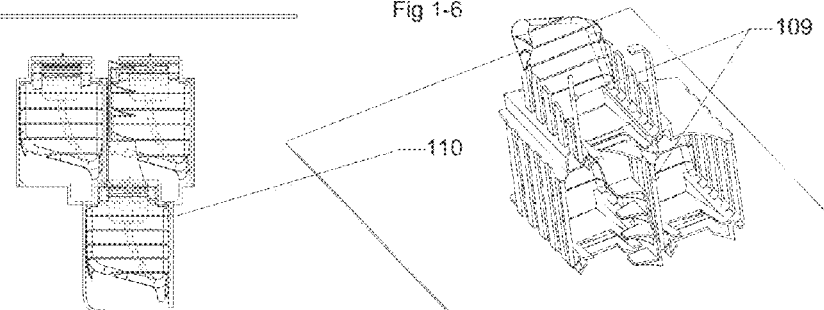
Figures 1, 2, 3, 4, 5, 6, 7, 8, 8D:
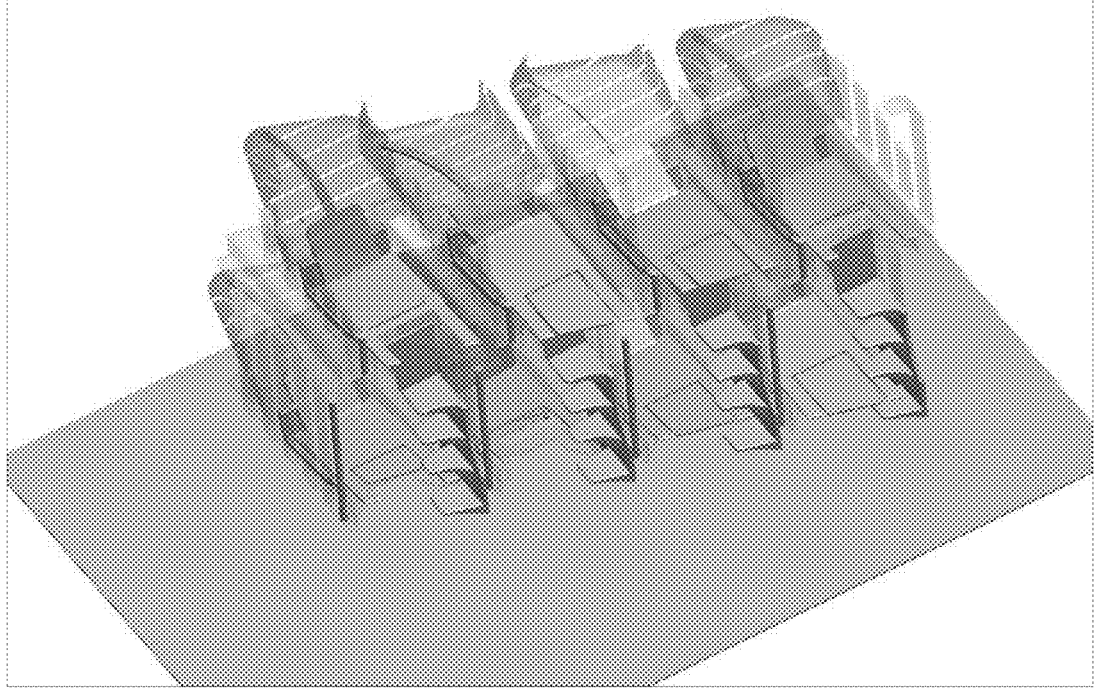
Figures 1, 2, 3, 4, 5, 6, 7, 8, 8D:
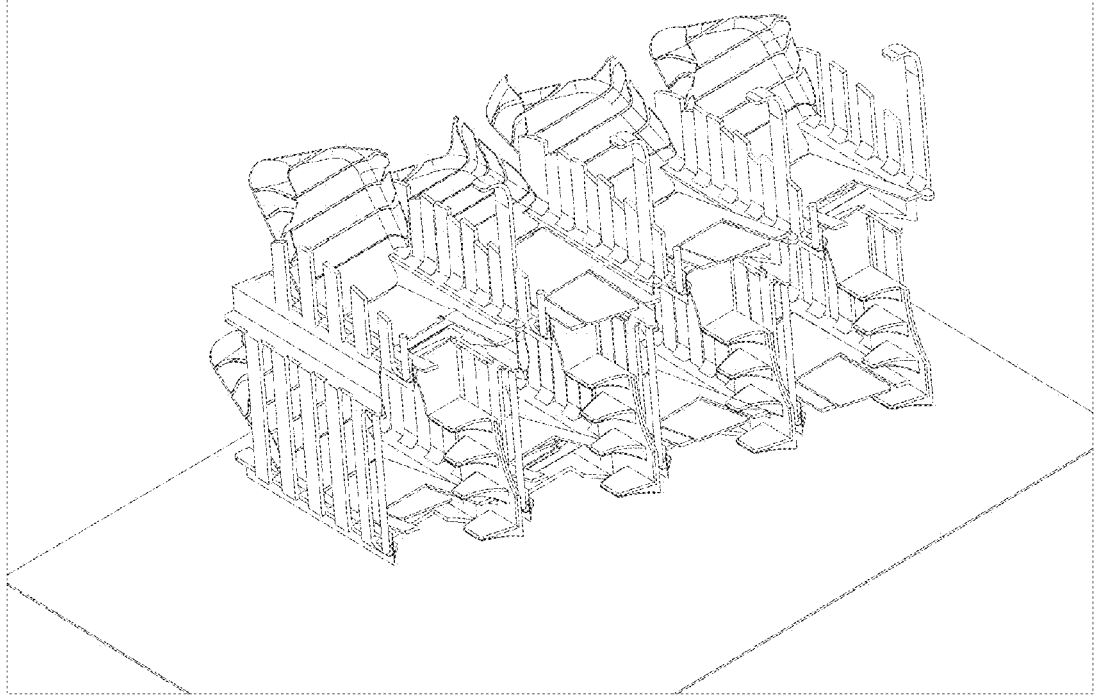
Figures 1, 2, 3, 4, 5, 6, 7, 8, 9, 9D:
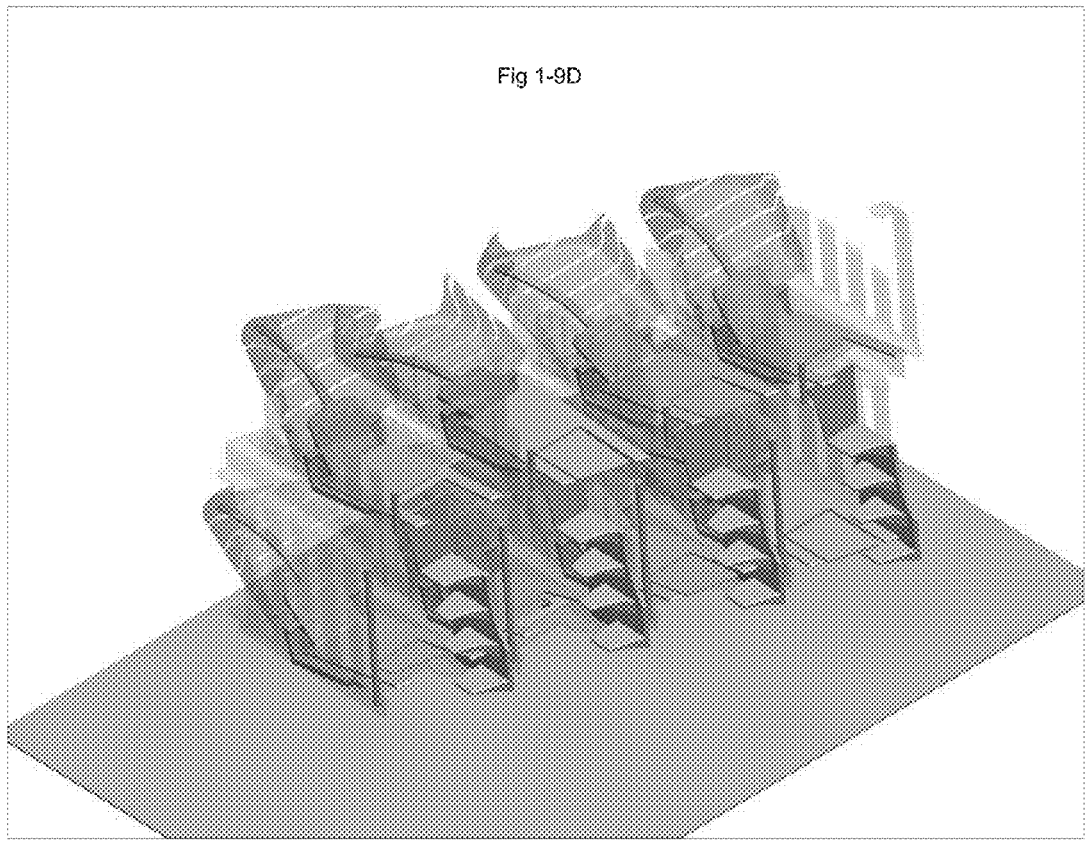
Figures 1, 2, 3, 4, 5, 6, 7, 8, 9, 9D:
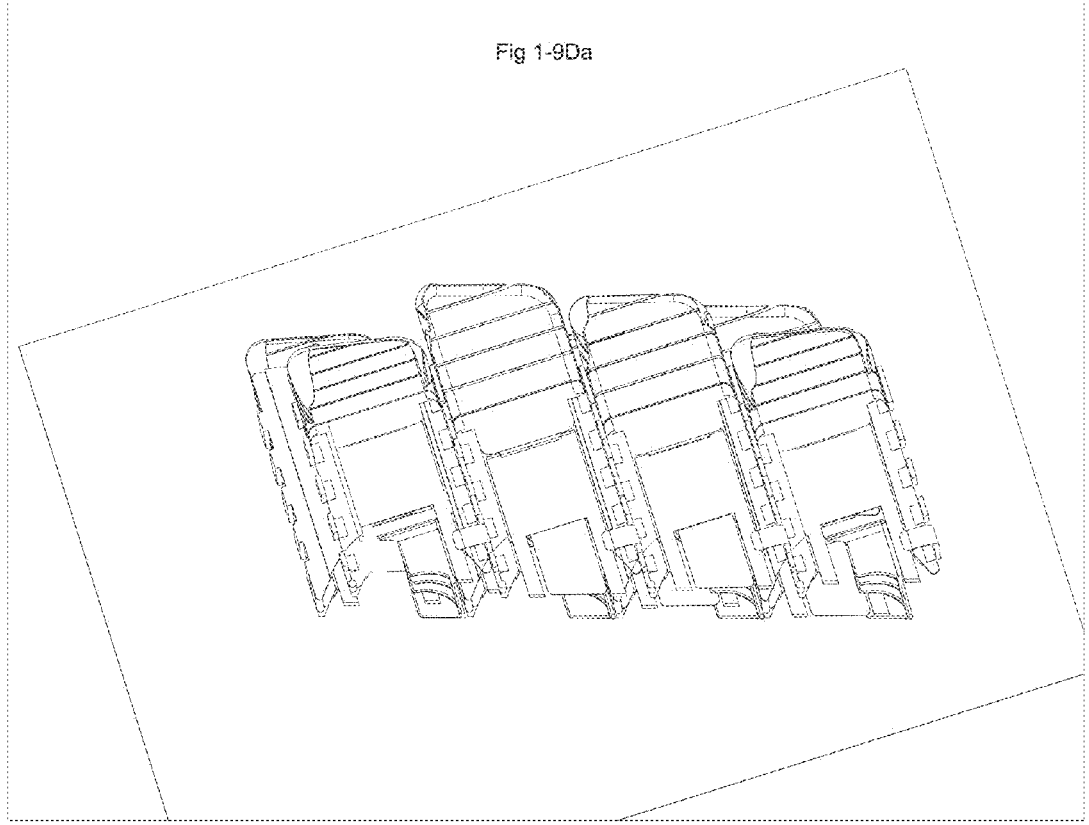
Figures 1, 2, 3, 4, 5, 6, 7, 8, 9, 10, 10D:
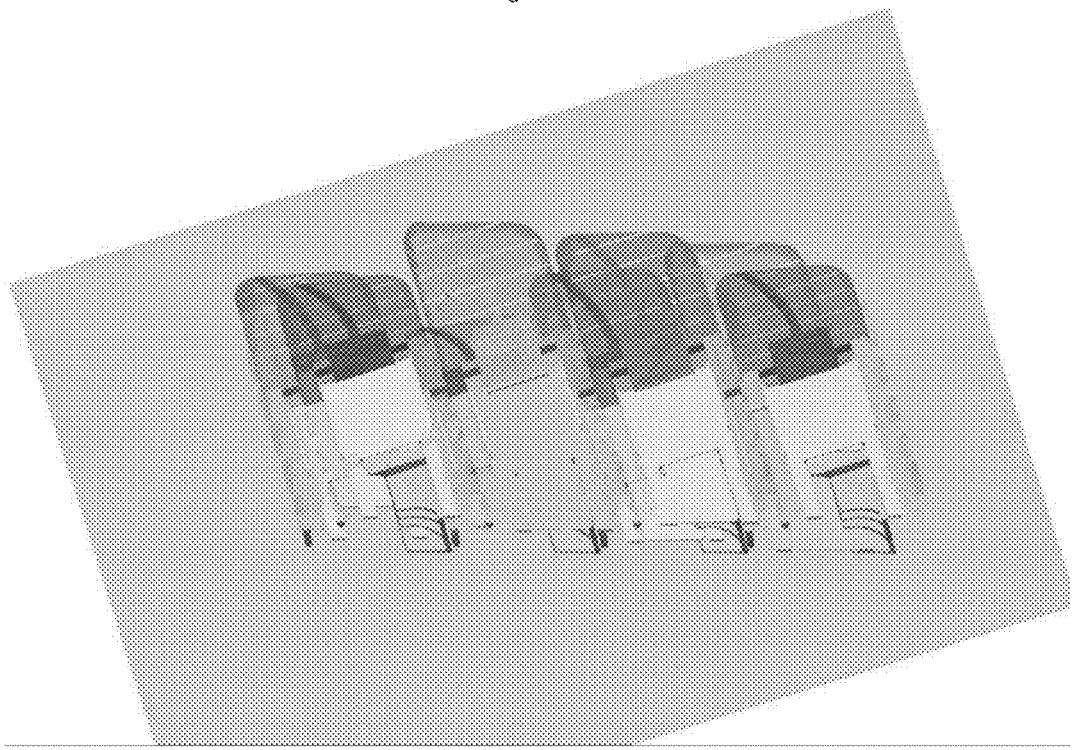
Figures 1, 2, 3, 4, 5, 6, 7, 8, 9, 10, 11, 11D:
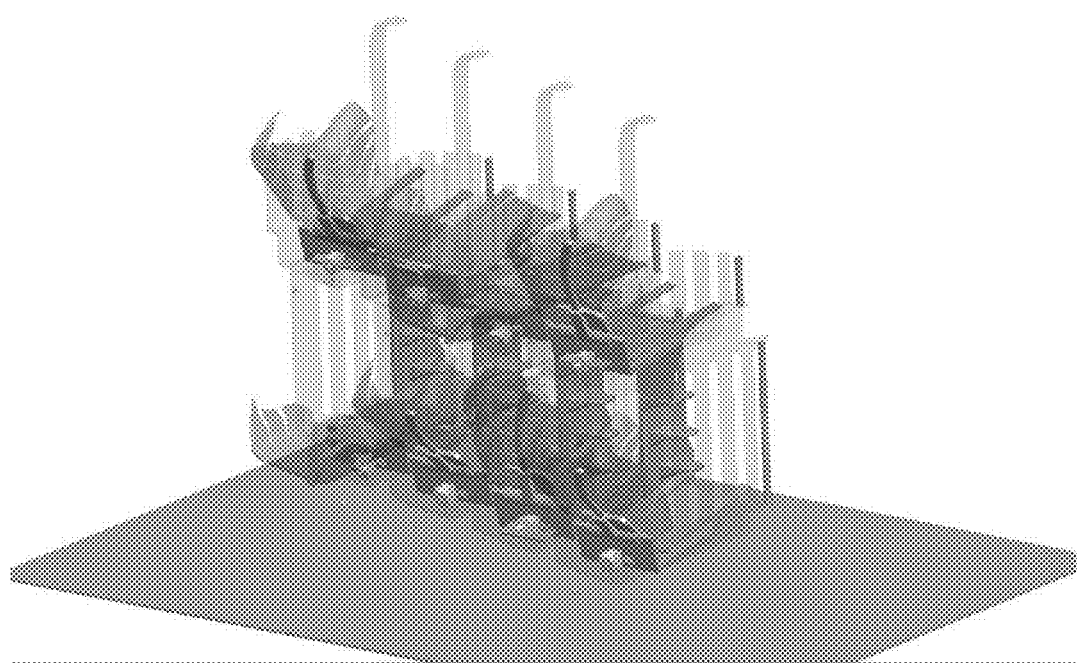
Figures 1, 2, 3, 4, 5, 6, 7, 8, 9, 10, 11, 11D:
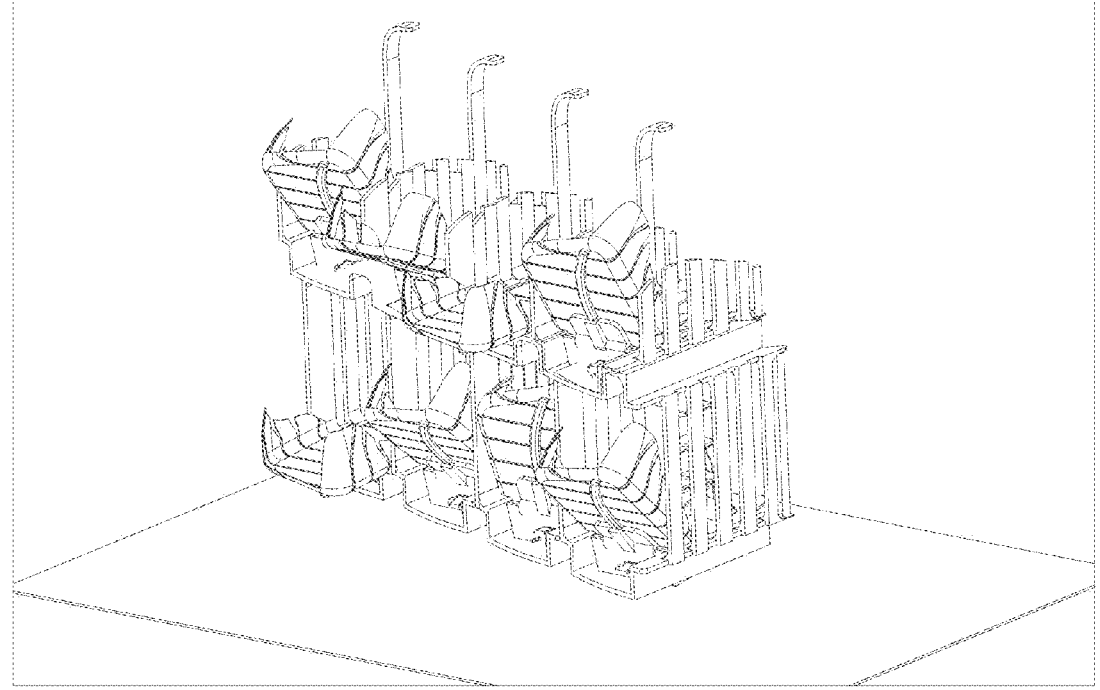
Figures 1, 2, 3, 4, 5, 6, 7, 8, 9, 10, 11, 12:
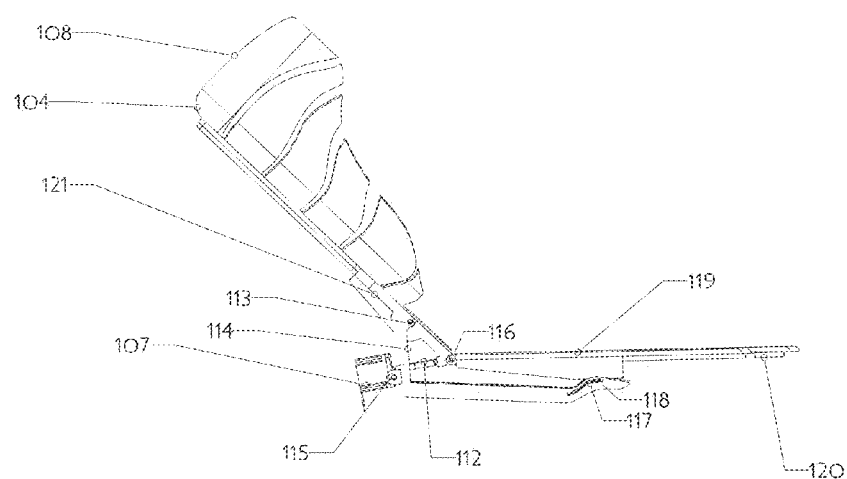
Figures 1, 2, 3, 4, 5, 6, 7, 8, 9, 10, 11, 12, 13:
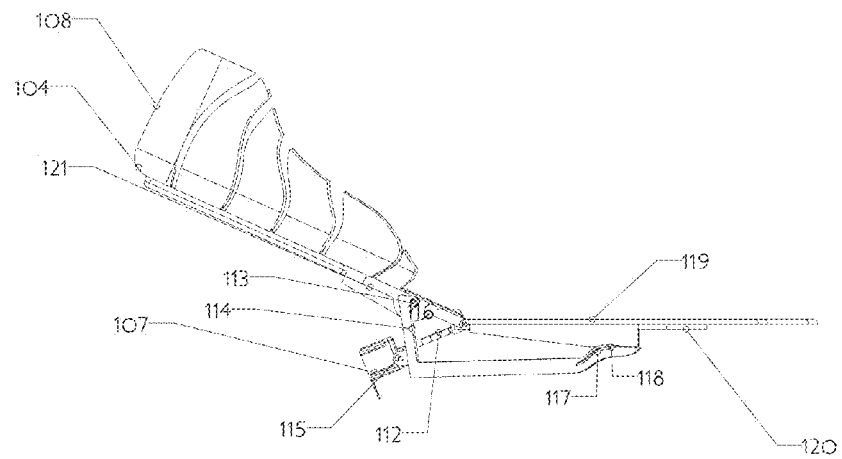
Figures 1, 2, 3, 4, 5, 6, 7, 8, 9, 10, 11, 12, 13, 14:
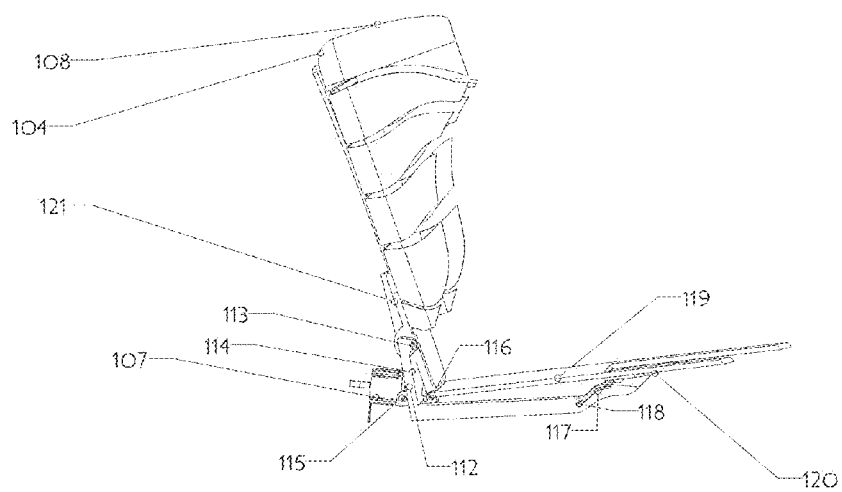
Figures 1, 2:
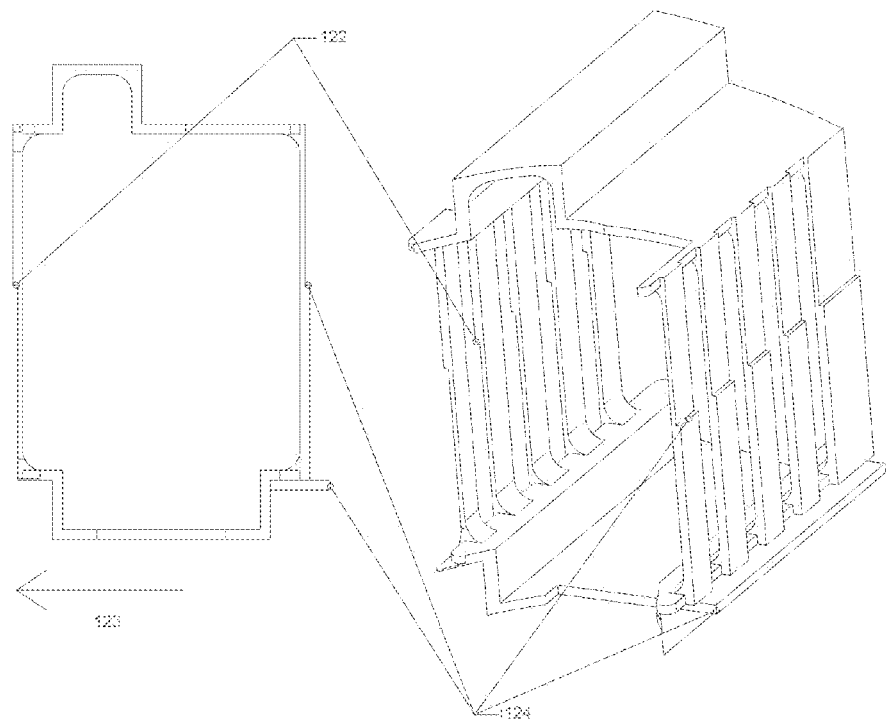
Figure 2:
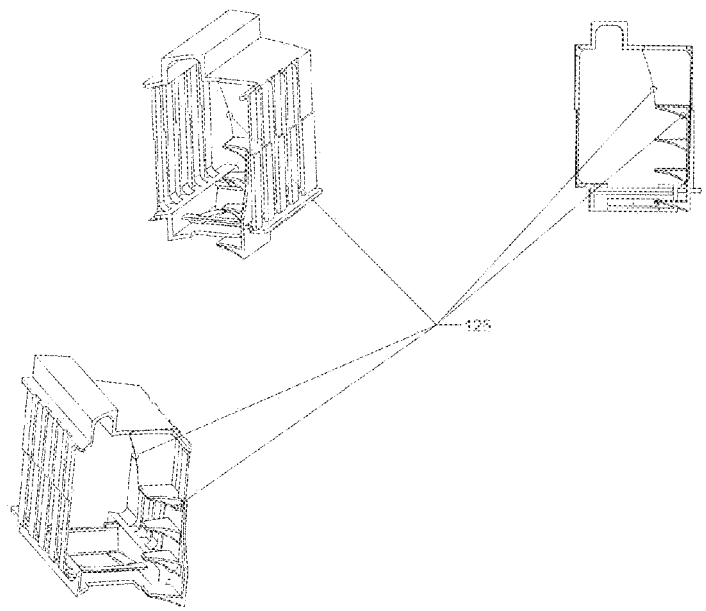
Figures 2, 3, 4, 5, 6, 7:
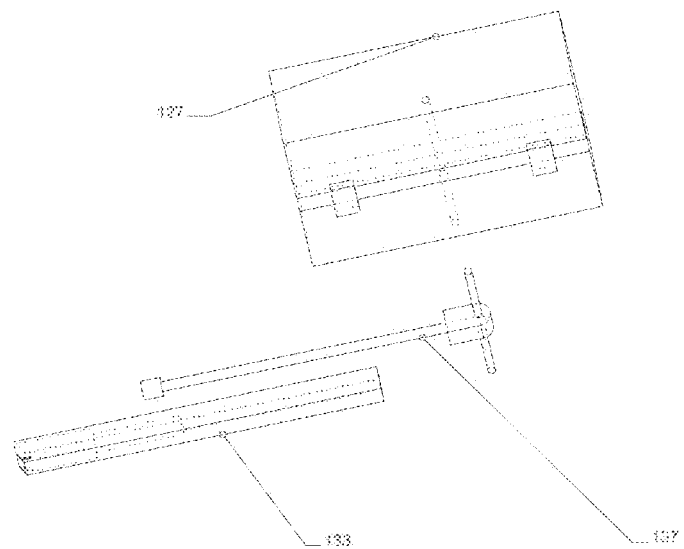
Figures 2, 3, 4, 5, 6, 7, 8:
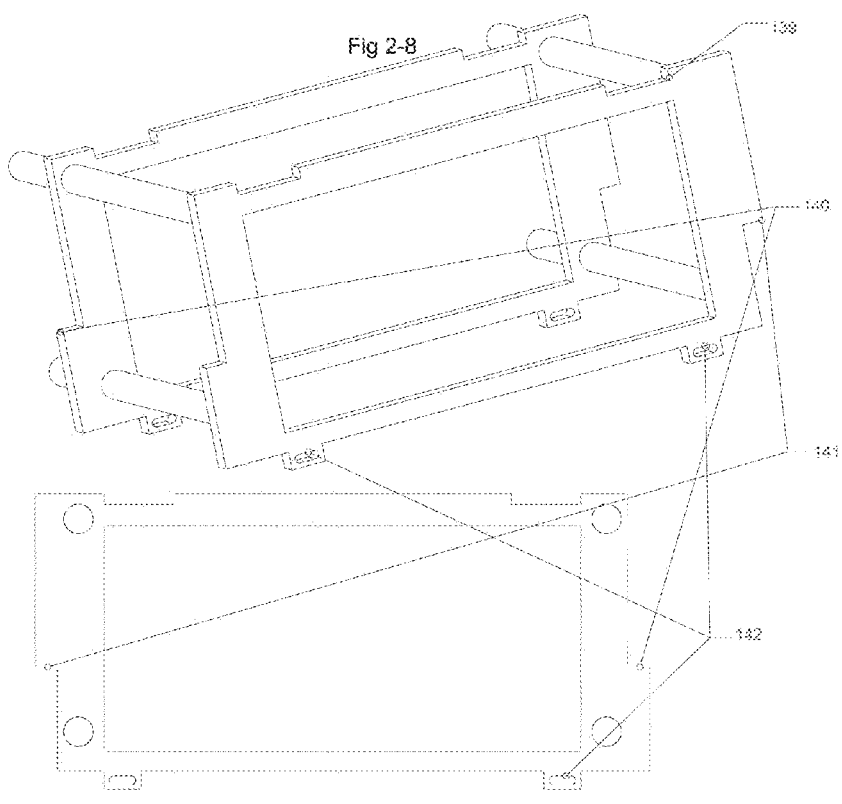
Figures 3, 4, 5, 6, 7:
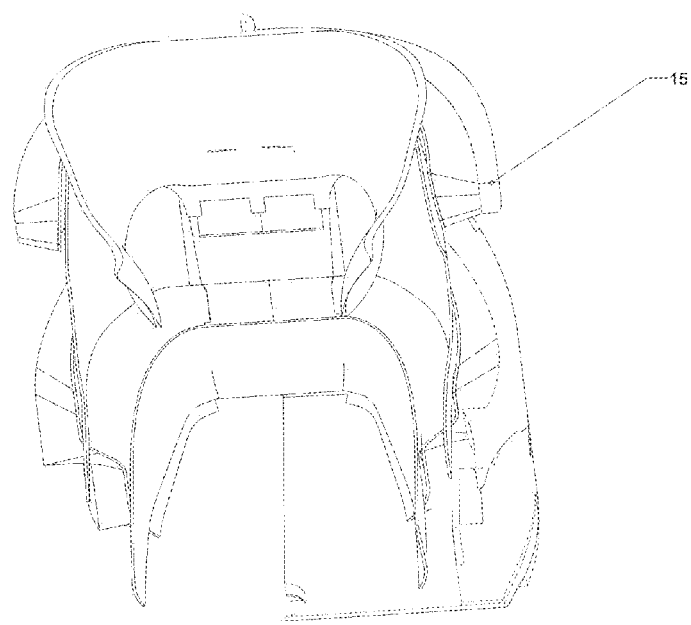
Figures 3, 4, 5, 6, 7, 8:
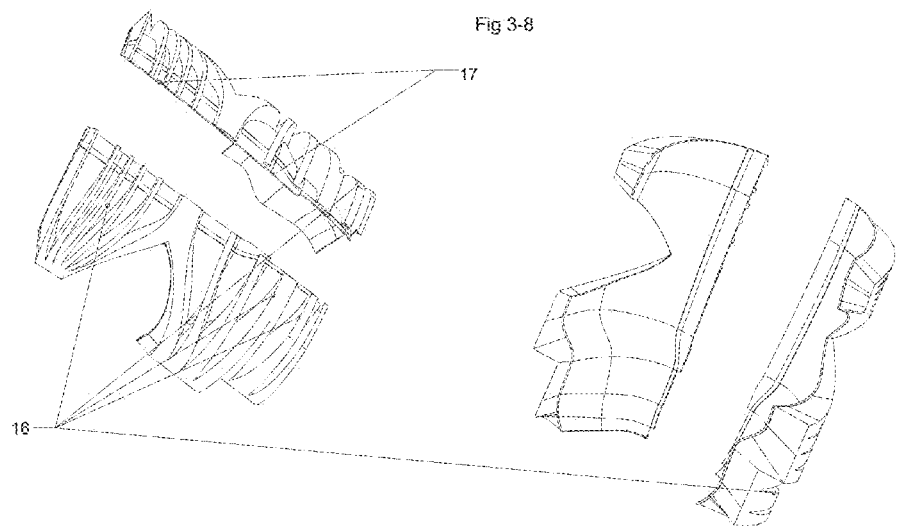
Figures 3, 4, 5, 6, 7, 8, 9:
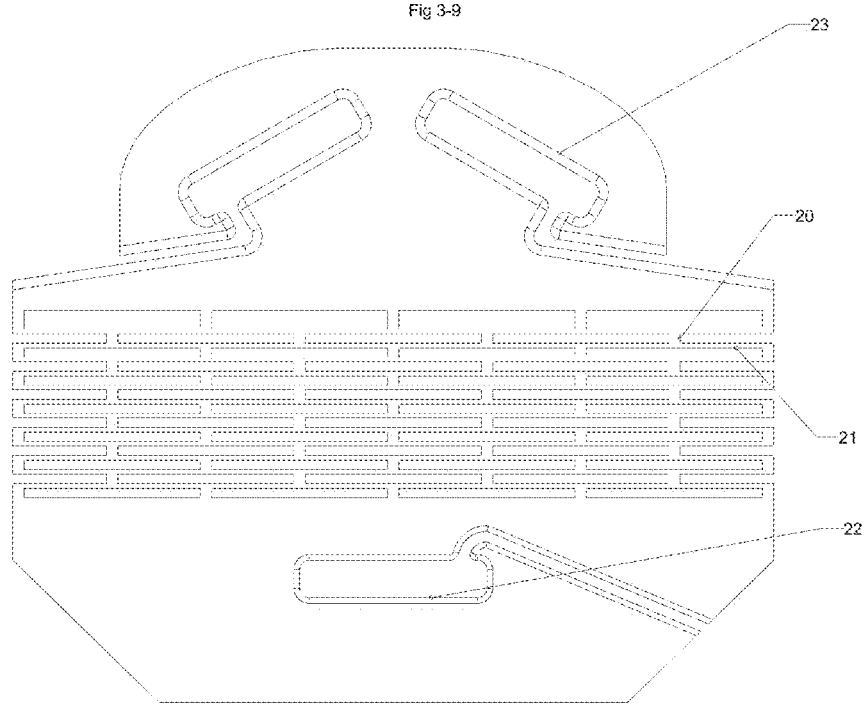
Figures 3, 4, 5, 6, 7, 8, 9, 10:
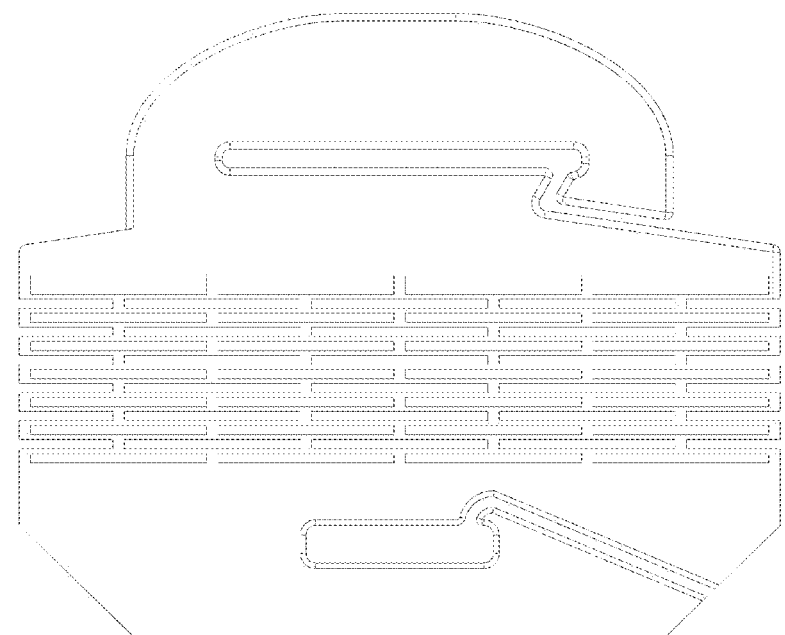
Figures 3, 4, 5, 6, 7, 8, 9, 10, 11:
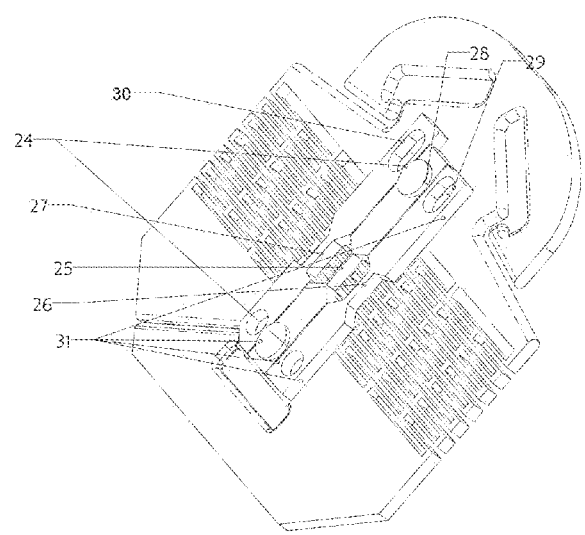
Figures 3, 4, 5, 6, 7, 8, 9, 10, 11, 12:
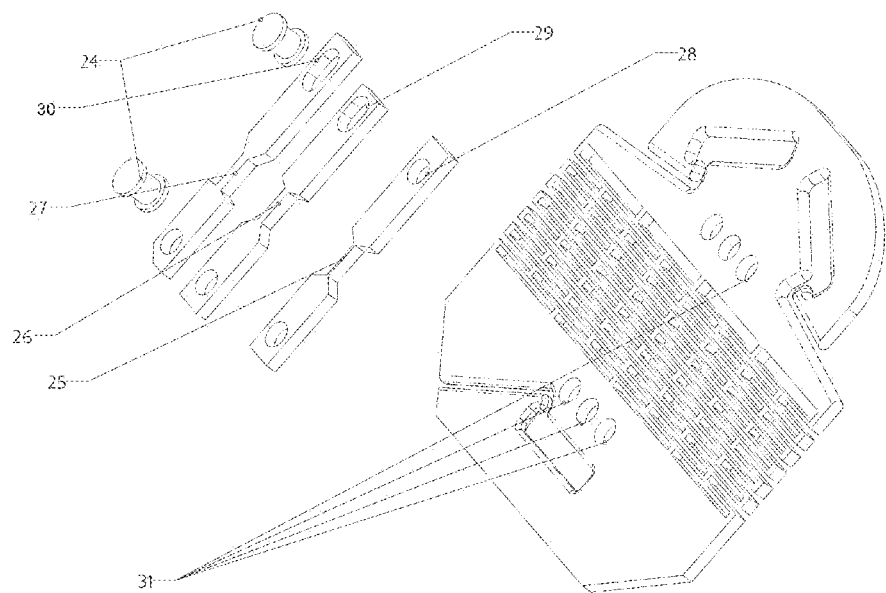
Figures 3, 4, 5, 6, 7, 8, 9, 10, 11, 12, 13:
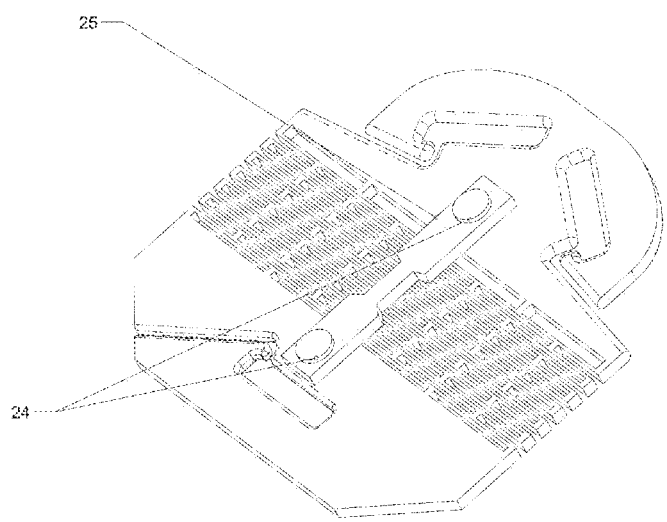
Figures 3, 4, 5, 6, 7, 8, 9, 10, 11, 12, 13, 14:
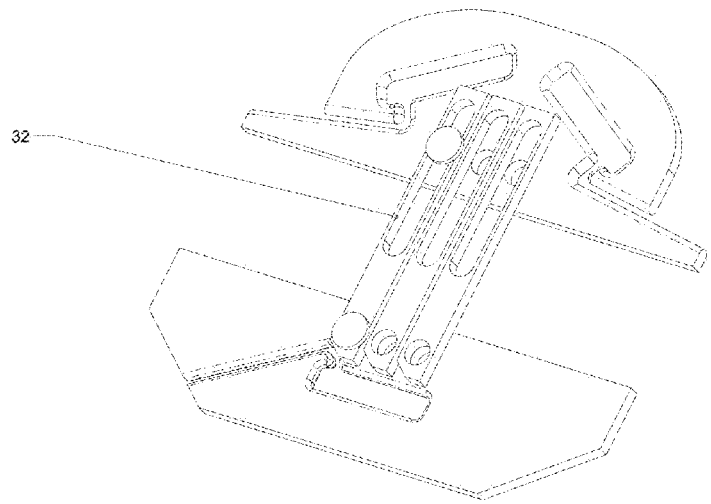
Figures 3, 4, 5, 6, 7, 8, 9, 10, 11, 12, 13, 14, 15:
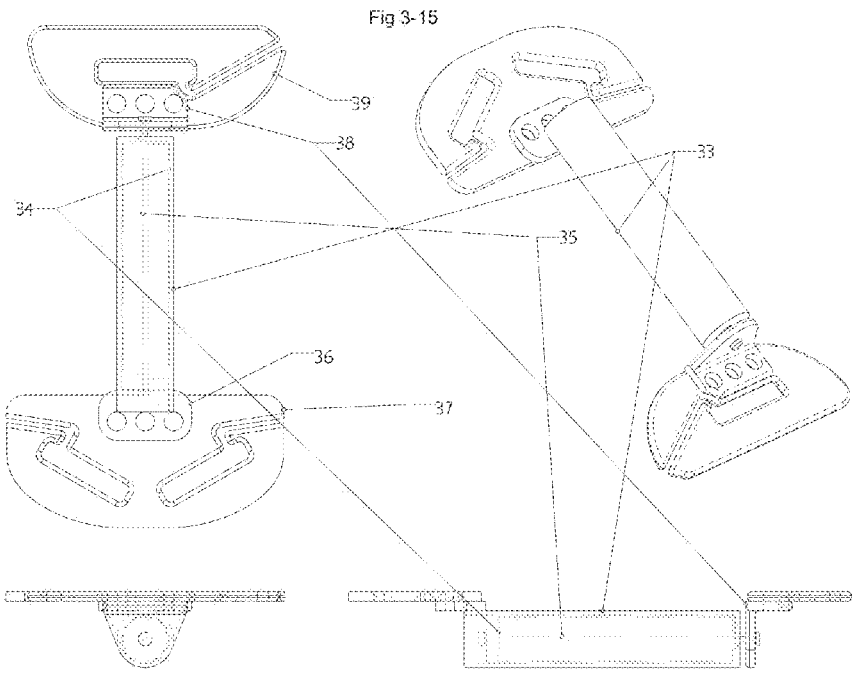
Figures 3, 4, 5, 6, 7, 8, 9, 10, 11, 12, 13, 14, 15, 16:
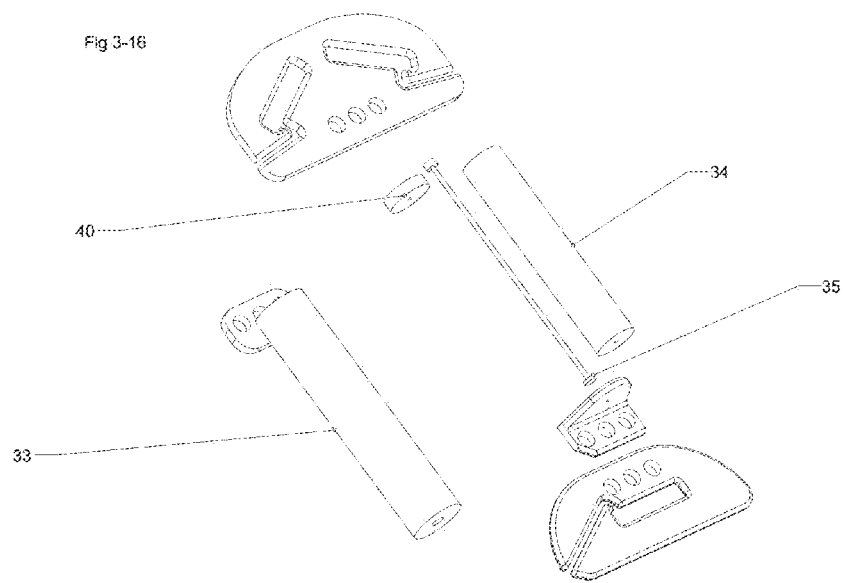
Figures 3, 4, 5, 6, 7, 8, 9, 10, 11, 12, 13, 14, 15, 16, 17:
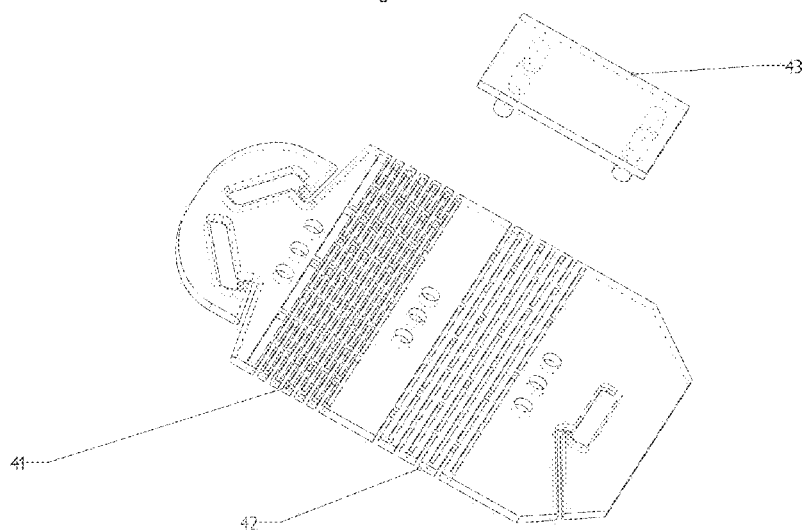
Figures 3, 4, 5, 6, 7, 8, 9, 10, 11, 12, 13, 14, 15, 16, 17, 18:
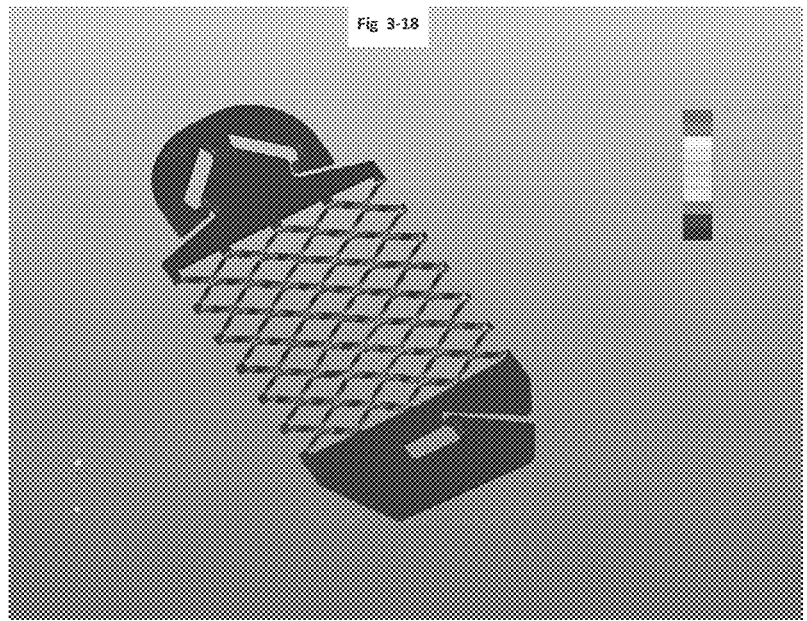
Figures 1, 4:
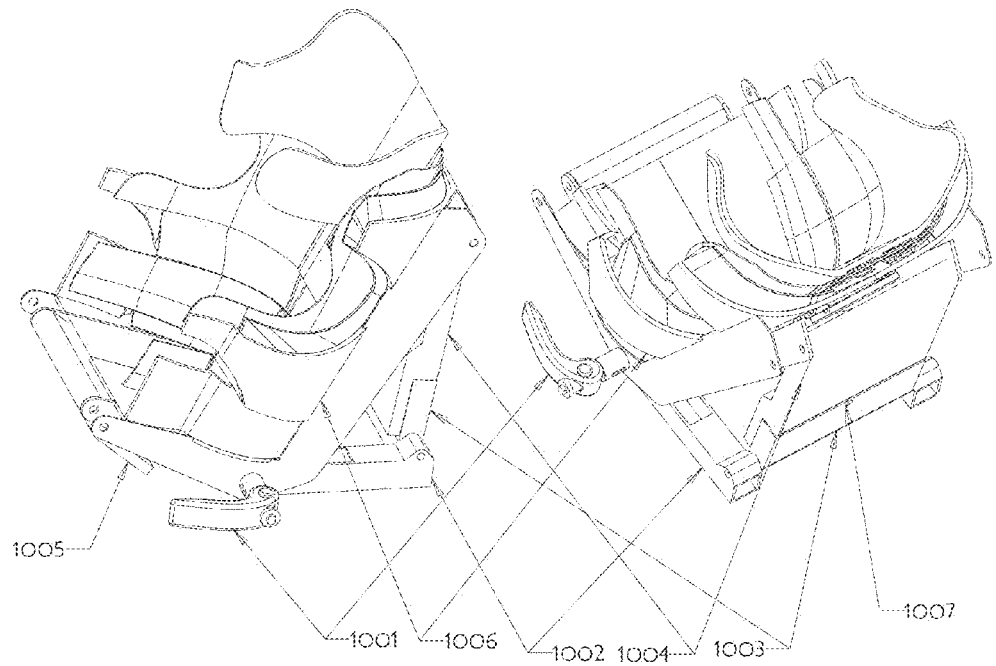
Figures 2, 4:
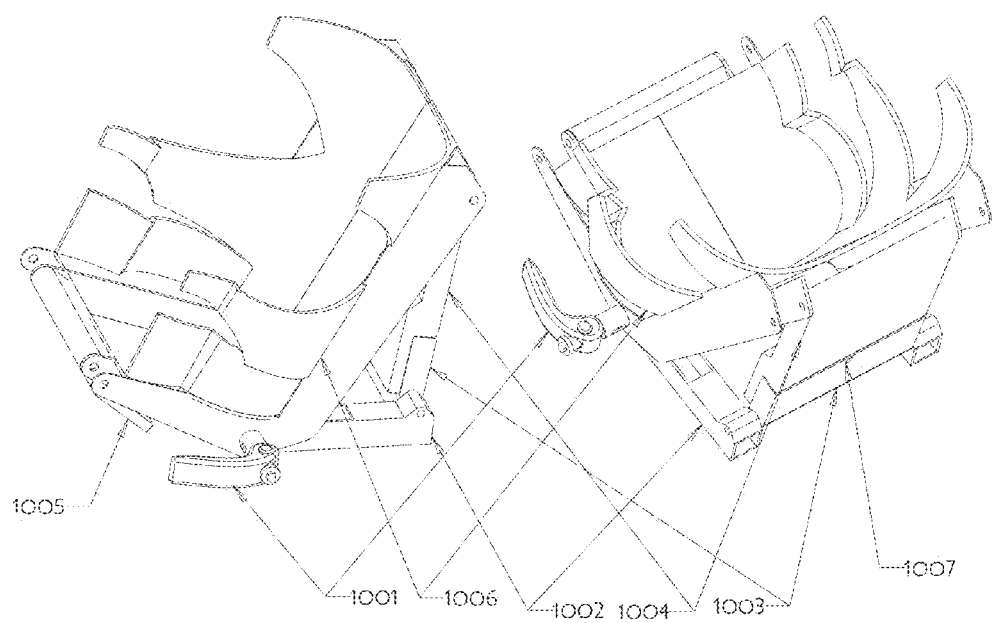
Figures 3, 4:
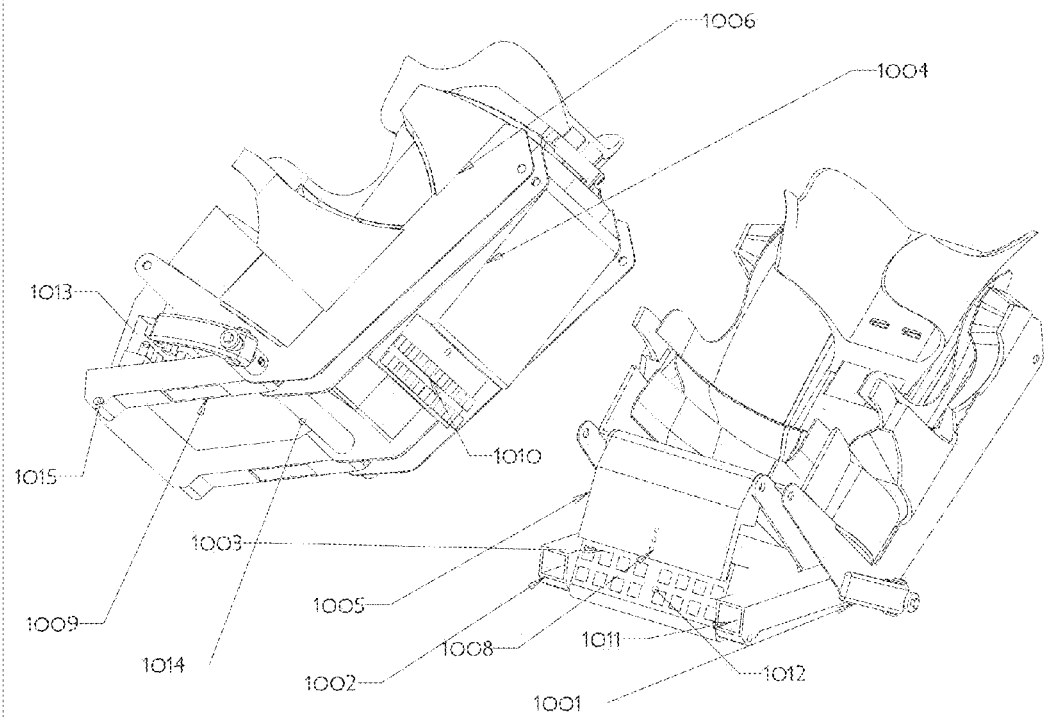
Figure 4:
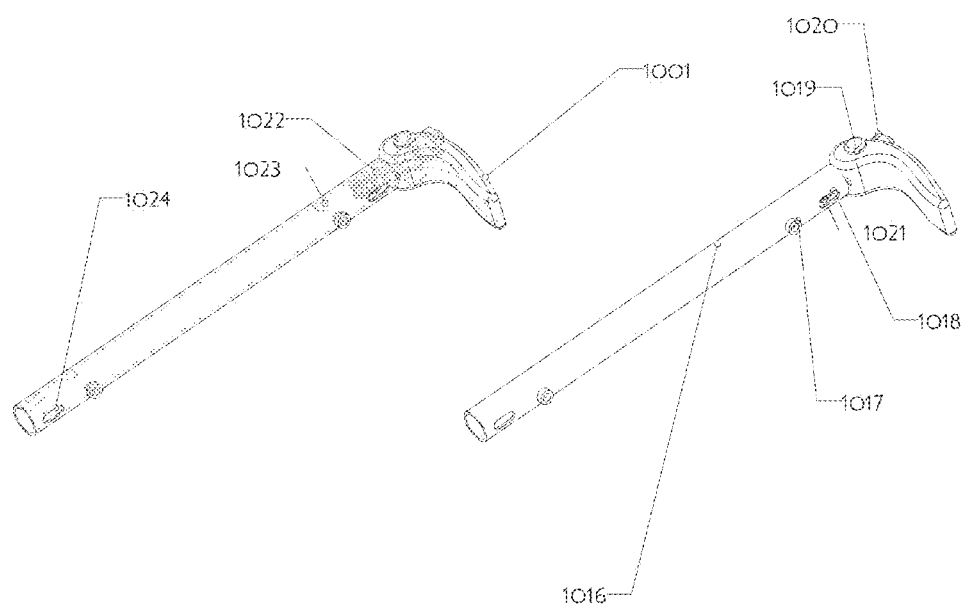
Figures 4, 5, 6:
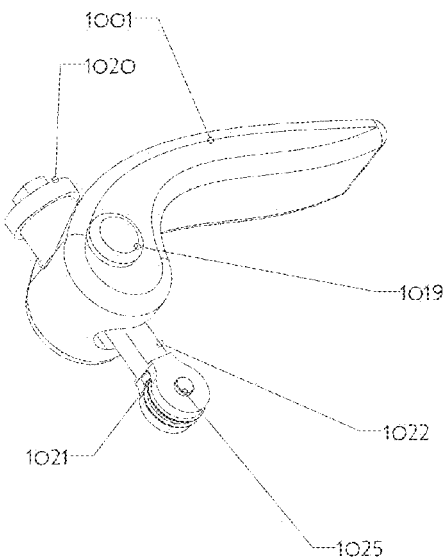
Figures 4, 5, 6:
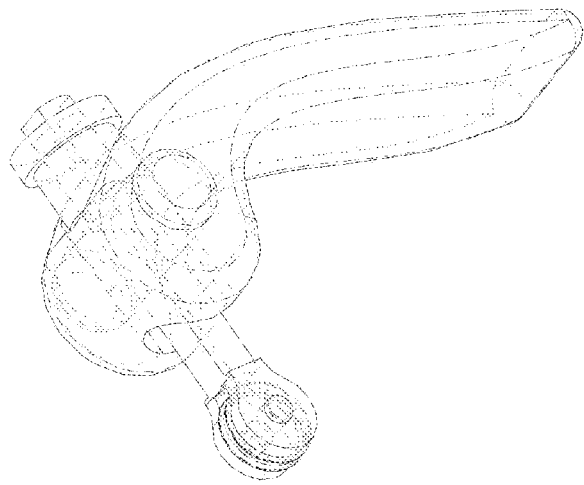
Figures 4, 5, 6, 7:
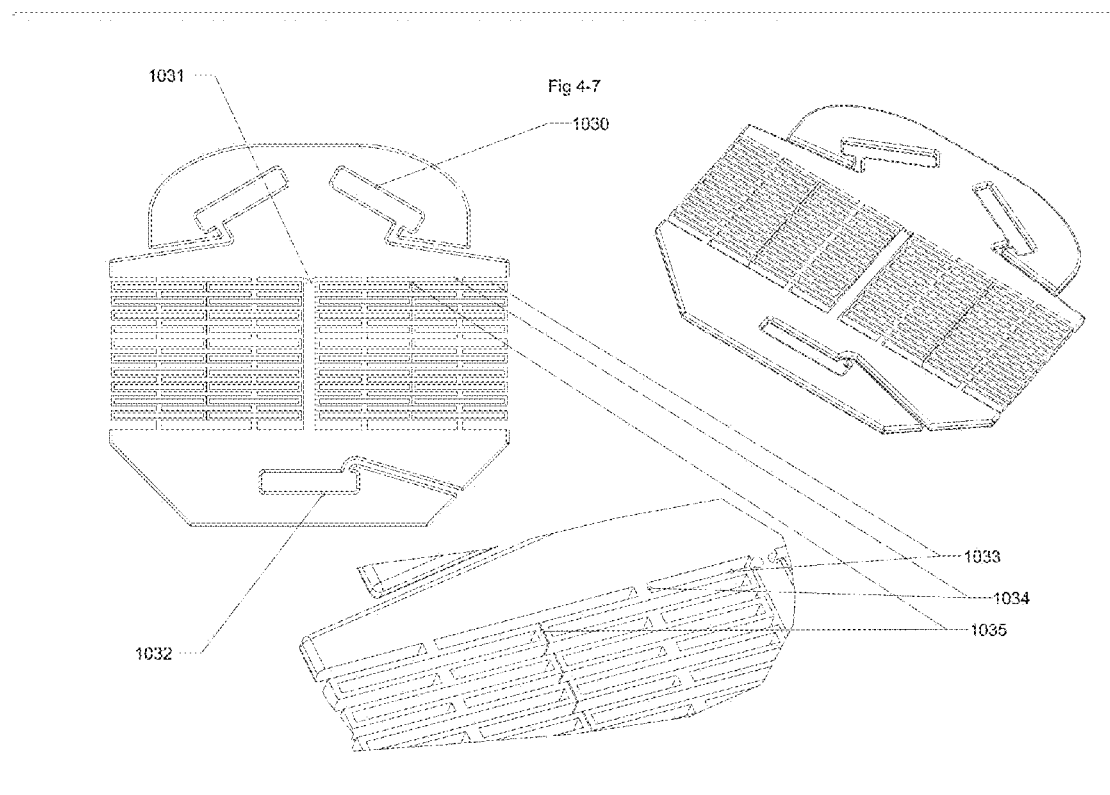
Figures 4, 5, 6, 7, 8:
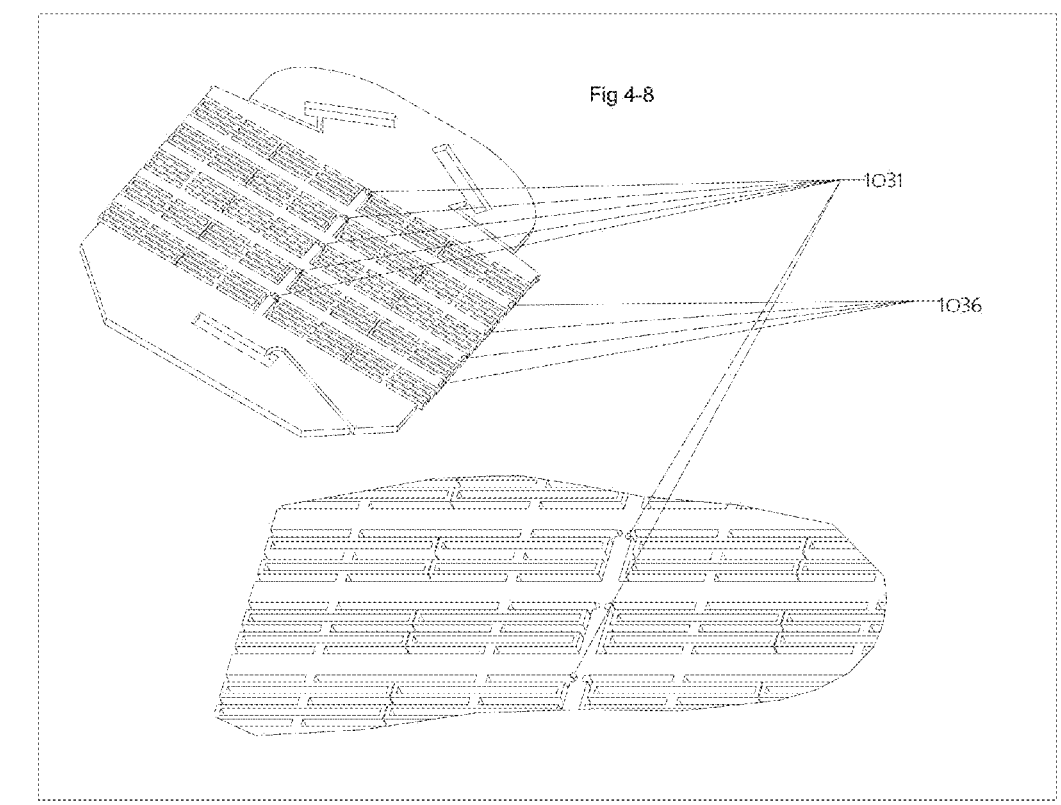
Figures 4, 5, 6, 7, 8, 8A:
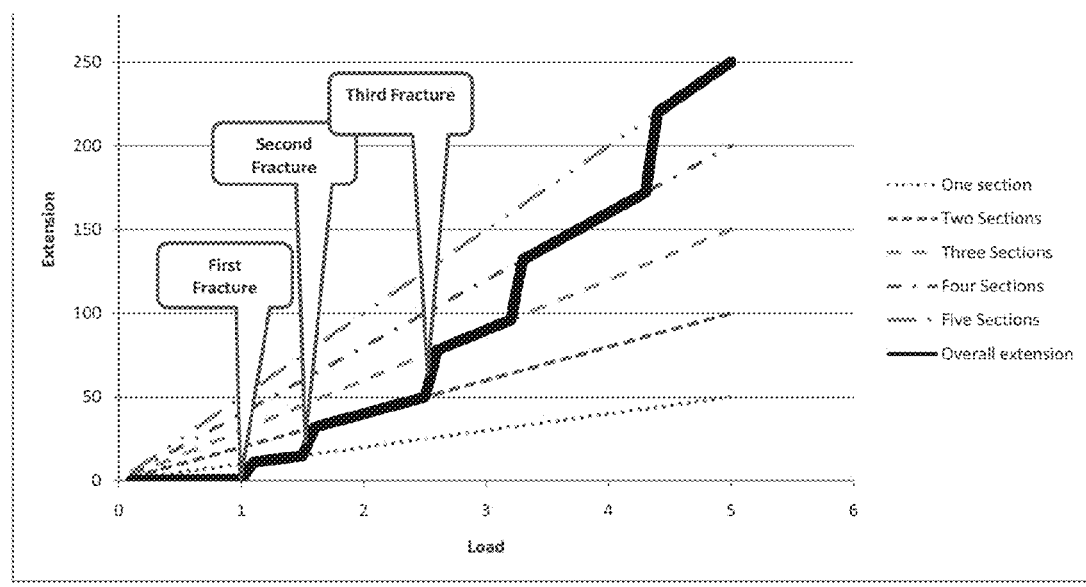
Figures 4, 5, 6, 7, 8, 8B:
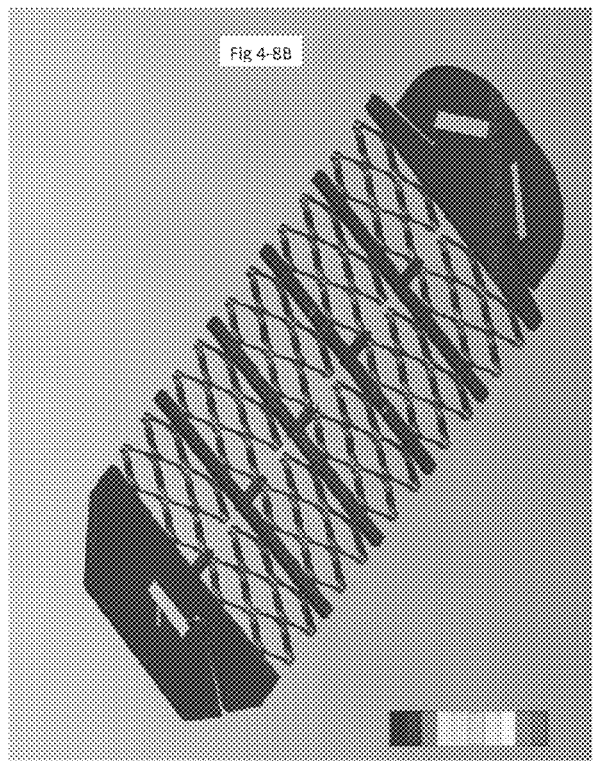
Figures 4, 5:
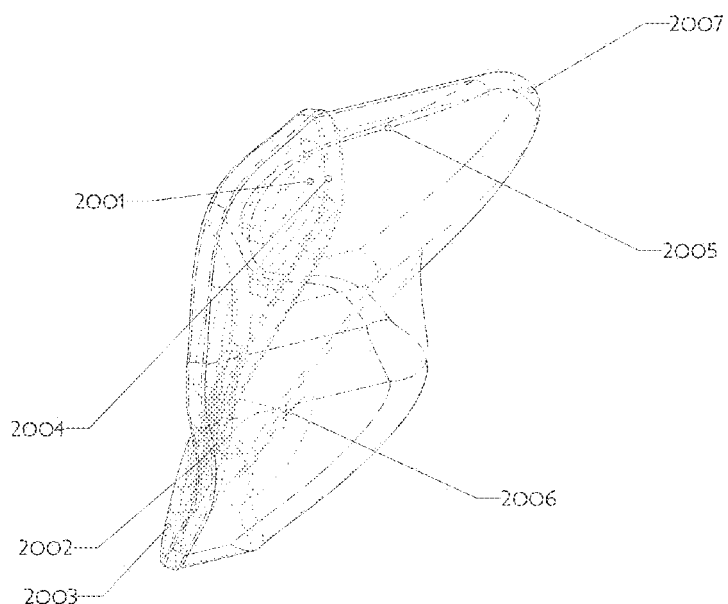
Figure 5:
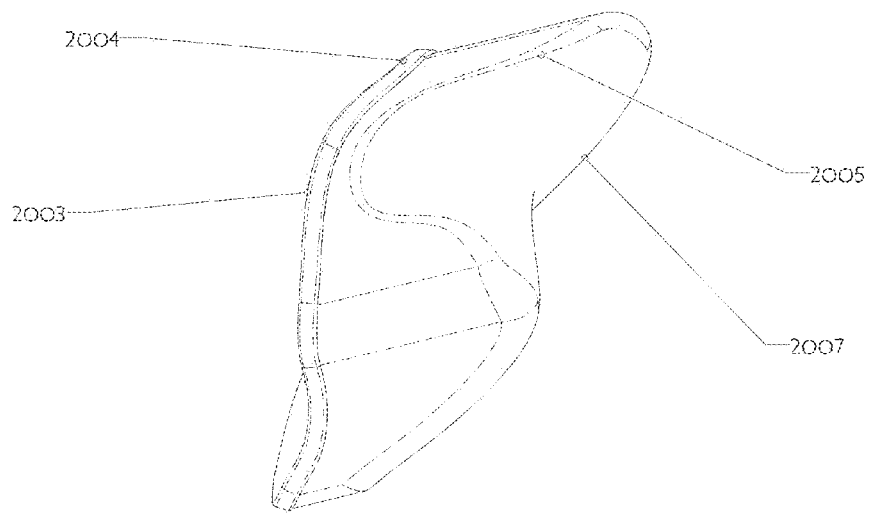
Figures 2, 6:
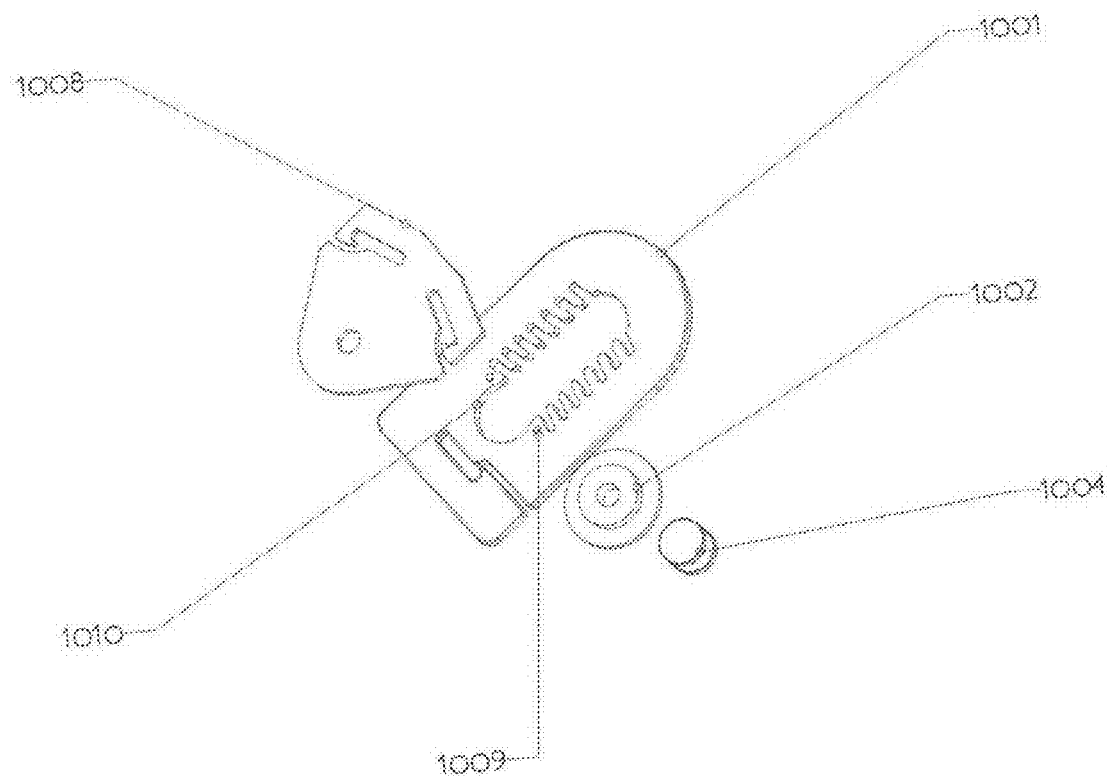
Figures 3, 6:
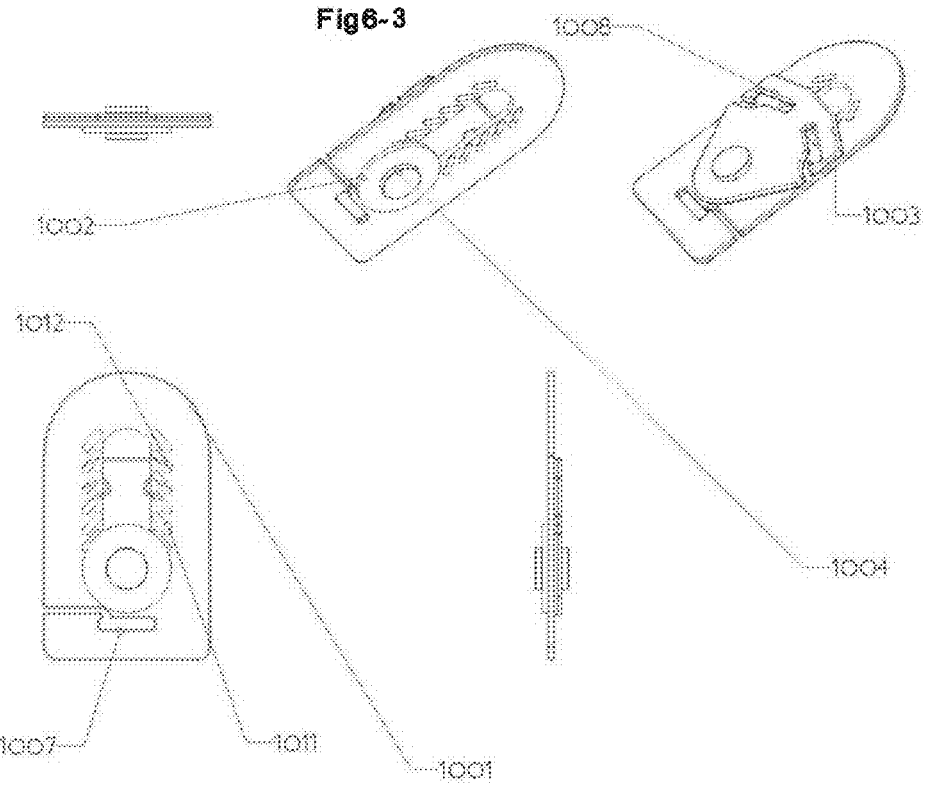
Figures 4, 6:
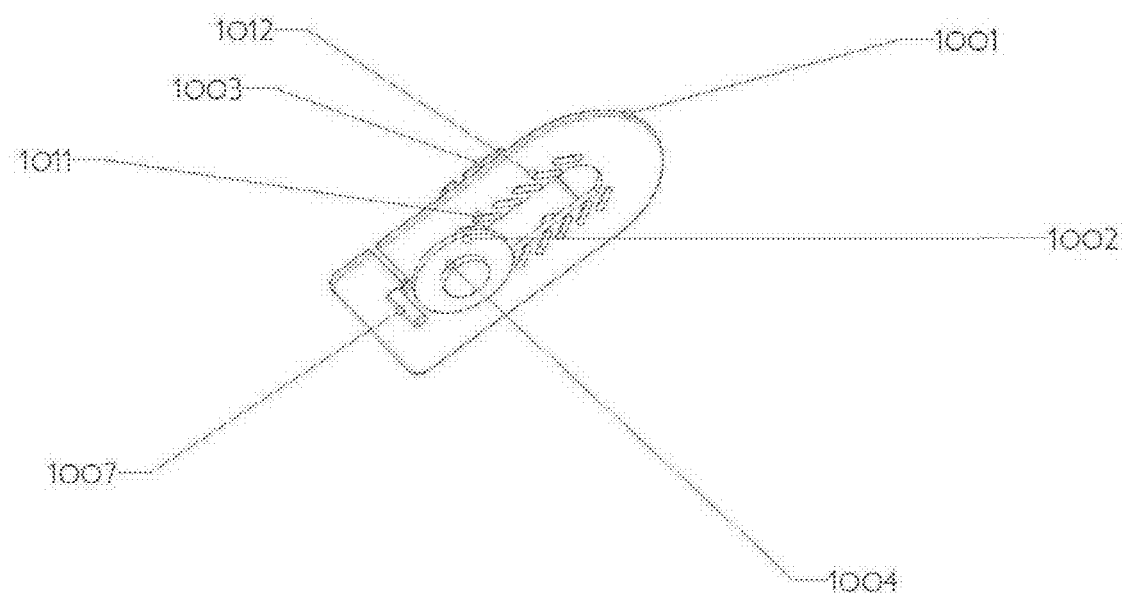
Figures 5, 6:
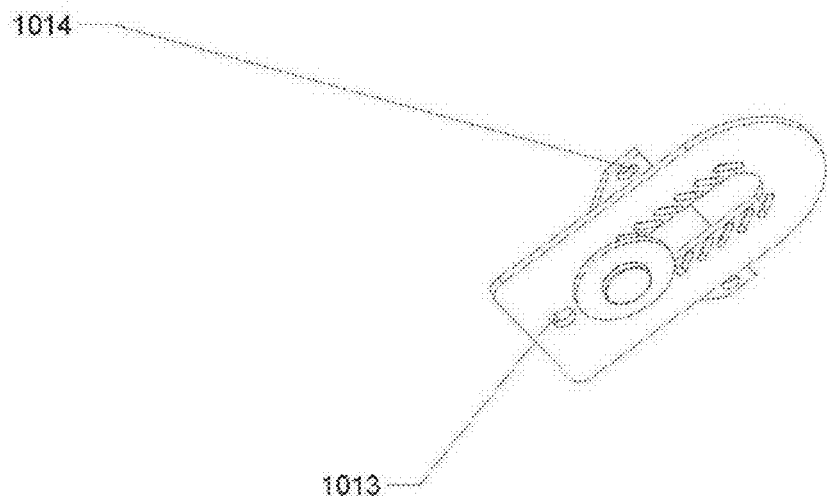
Figures 3, 7:
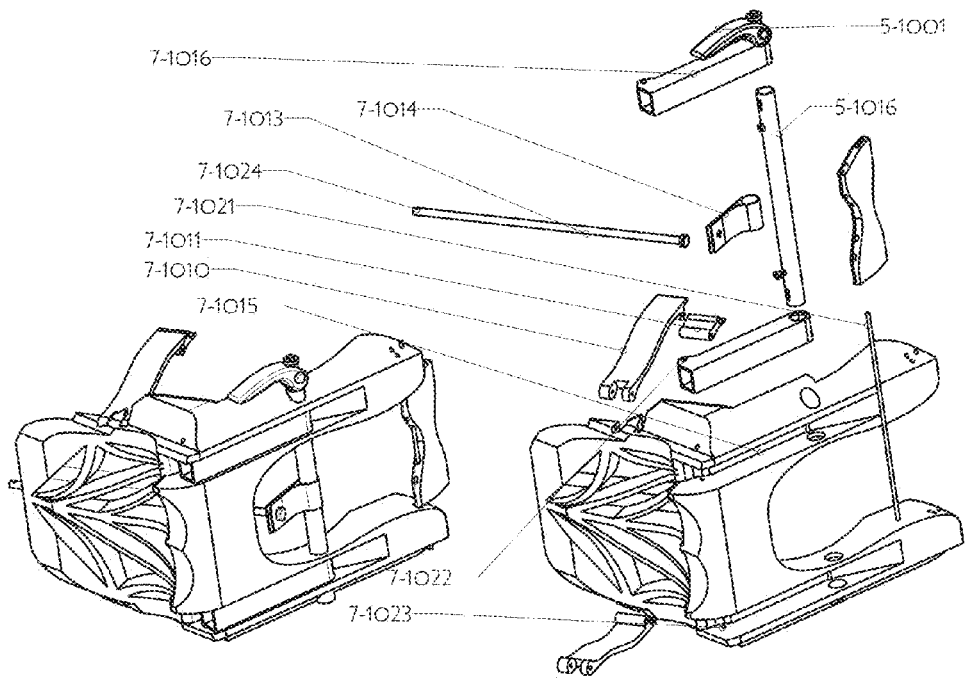
Figures 4, 7:
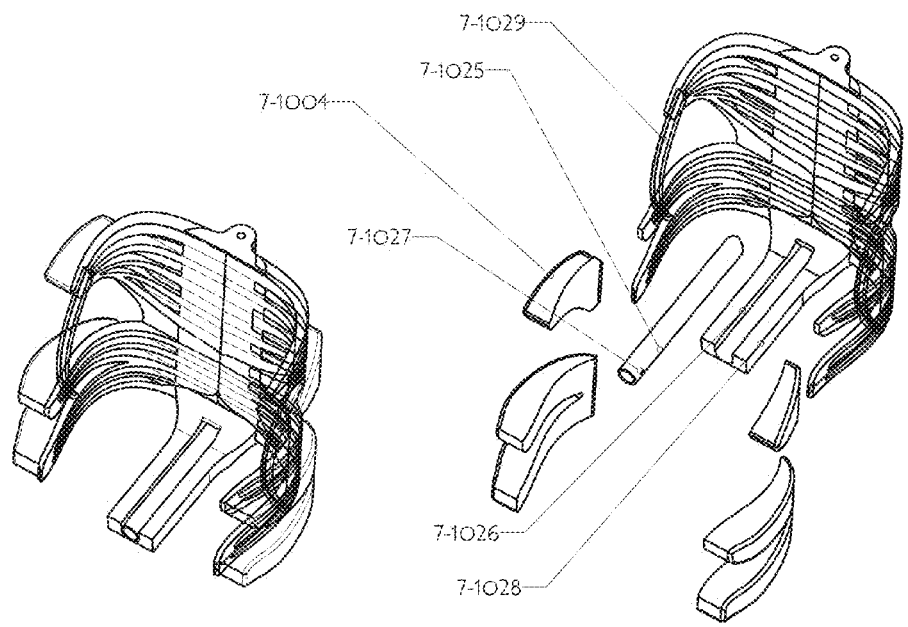
Figure 7:
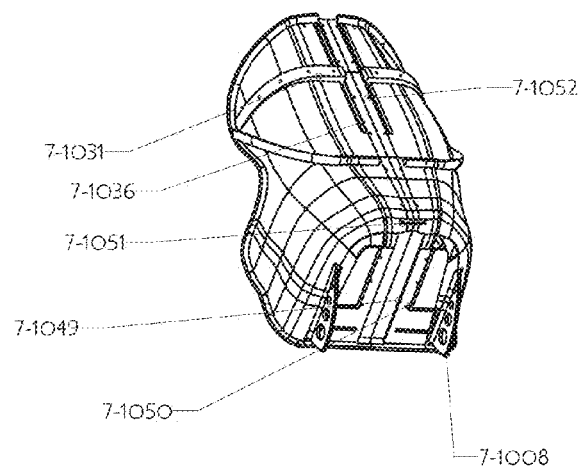
Figures 7, 8:
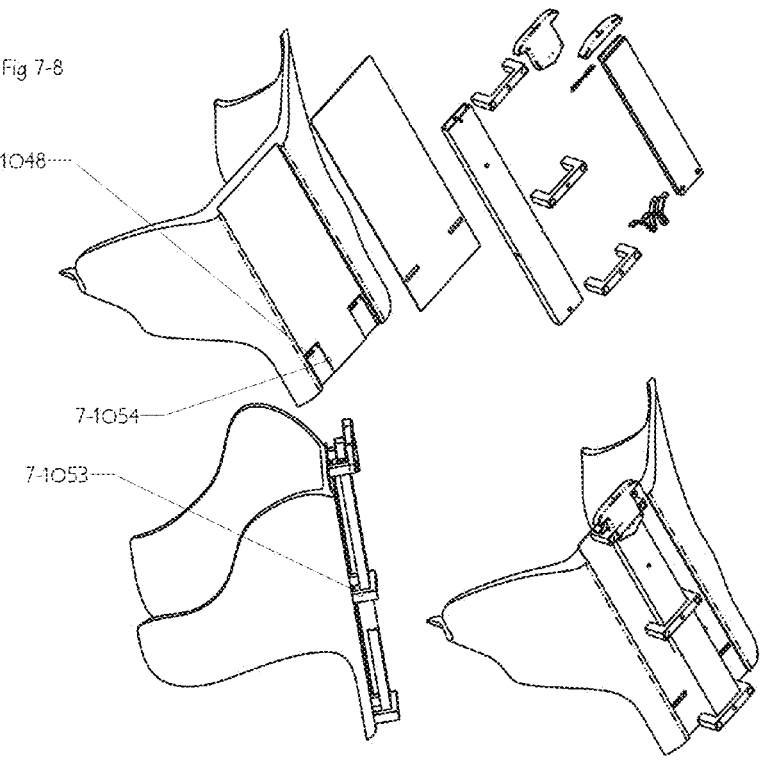
Figures 7, 8, 9, 10, 11:
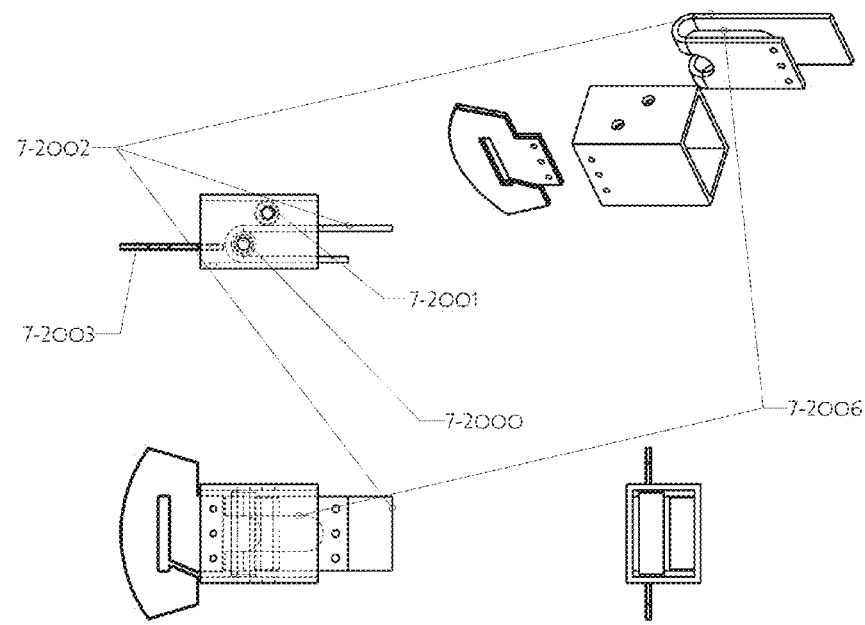
Figures 7, 8, 9, 10, 11, 12:
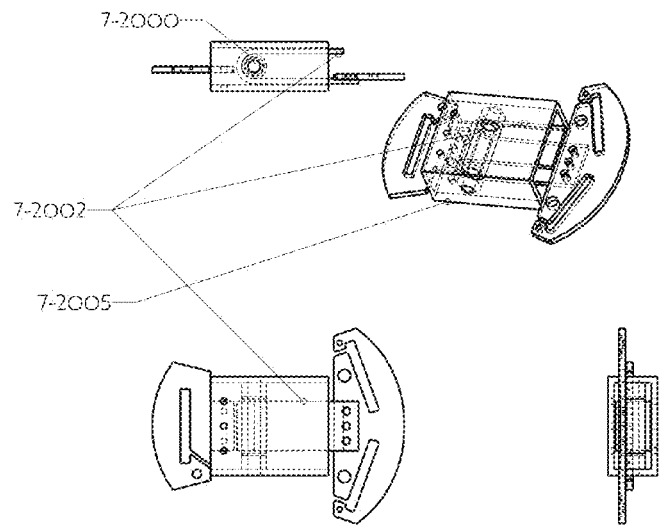

FIG. 3-17 shows yet another structure of the load extension device that here is again a load plate as in FIG. 9 but here has two (or more) sections for of extending structures.

FIG. 3-18 shows an extended position under tensile loading of a load extension device.

FIG. 3-19 shows another configuration for the load extension device.

FIG. 3-20 shows a configuration of a load extension device with a buckling element 44.

FIGS. 4-1, 4-2 and 4-3 show an embodiment of a child seat. FIGS. 4-1 and 4-2 show the seat in the front facing direction and FIG. 3 shows the seat in the rear facing position.

The Latch Tension Assembly 1014, is shown in FIG. 4-4.

FIGS. 4-5 and 4-6 show the latch tensioning lever and parts of the tensioning mechanism.

FIGS. 4-7 to 4-9 show new embodiments of Load Plates for the harness of the child seat.

FIGS. 4-7, 4-8 and 4-9 show three different embodiments. They all have a common feature of one or more fracture necks FIG. 4-8A illustrates load extension characteristics of some embodiments FIG. 4-8B show the extension of the Load plate in FIG. 4-8 under load.

FIG. 4-9 shows the same architecture as FIG. 4-8 except that it has a single "diamond"

FIGS. 5-1 to 5-6 Shows a chin support assembly for attachment to the harness of a child seat.

FIG. 5-6 shows a structure that allows the harness to slide out from the side of the slots.

FIGS. 6-1 and 6-2 shows the Load limiter with the finger architecture. It has fingers of two different sizes on either side along the length on the central slot (multiple sizes are possible for different load deflectection characteristics.

FIGS. 6-3 and 6-4 Show the load limiter using the slot configuration. Here the slot can be varies in size to increase or decrease the material thickness of the metal between to change the load characteristics. In the embodiment shown there are two sections of slot spacing and therefore material thickness for two levels of load deformation. (Multiple sections are possible with more such sections).

FIG. 6-5 shows a version that may be used for a Car Seat bet. One side will be bolted onto the vehicle and the other may be attached to a seat belt latch or the end of the seat belt at the lap end.

FIG. 7-1 shows two views of an embodiment of the Child Restraint System with sub assemblies shown in FIG. 7-2 to FIG. 7-9.

The embodiment shows several unique features including a reversible Lower Anchors and Tethers for Children support arrangement for front and rear facing deployment. Rotation for egress and ingress, side aircushions, a movable inner shell for impact injury reduction.

FIG. 7-2 shows the frame subassembly for the embodiment with latch tensioning assembly, that is reversible for rear and front facing seat deployment. Central axis for rotation of the seat, foot rest for front facing mode, that also is the support for the rear facing latch tensioning assembly.

FIG. 7-3 Shows an exploded view of the Lower Anchors and Tethers for Children tension assembly.

FIG. 7-4 Shows the side aircushions that may be partially prefilled with porous materials and/or vented to control the impact characteristics. It also shows a unique support structure for the bottom shock strip support including a torsion resisting tube.

FIG. 7-5 Shows the subassembly for the inner shell supporting the occupant including key elements of the main shock strip, the feet that are supported by the frame, and the headrest assembly.

FIG. 7-6 shows the reinforced section that can have a Cross support strip attached and reinforced regions for the support of side support elements on the outer shell or optional shock strips.

FIG. 7-7 shows the Cross support strip supporting ridge, the slot for staples to go through the innershell to attach to the headrest, support feet and harness threading features.

FIG. 7-8 shows the head rest assembly

FIG. 7-9 shows the Headrest adjustment mechanism assembly.

FIG. 7-10 to FIG. 7-14 show several embodiments for a load limited that may be used on either the harness (as shown) or for the tether (with end attachments modified)

DETAILED DESCRIPTION OF INVENTION

Airsleeper Embodiments

The embodiment of the AirSleeper shown may be deployed at an angle to the axis of the aircraft. The design takes advantage of the longer and shorter sides of each of the sleepers to help with the ergonomics of the sleepers. For example the longer side is used to support the stairs to the upper tier and thereby gets the stairs as far away from the lower tier occupant as follows. The embodiment also gets the leg space of upper tier occupant to be adjoining the sidewall of the lower tier occupant space thereby giving a wider space for egress and ingress of the lower tier occupant targeting the shorter side of that occupant's sleeper.

The airsleepers are designed to be modular and in some of the embodiments have a dovetail structure as shown for added strength, creating among them a stiff honey comb structure that will be resilient to crash loadings substantially axially to the aircraft.

Egress and ingress is facilitated with a handle that is recessing into the wall of the modular housing.

The upper tier in this embodiment is open and may have a support member of the monitor and the modular oxygen supply as shown for example in FIG. 1-6.

This embodiment may have static arm rests that are attached to the modular support structure. As shown in FIGS. 1-12, 1-13 and 1-14, the actuation by the pivotally supported linear actuator, pushes or pulls the pivot between the seat back and the seat bottom. The seat back is forced to move along an arc as it has a pivot to the fixed structure higher along its length. Therefore the seat bottom end moves in an arc. The front of the seat bottom maybe attached to the fixed structure with a sliding mechanisms that may be designed to give the seat bottom the preferred inclination to the seat back at different postures. therefore the slide guide or slot may be a curve to achieve this.

The leg rest in this embodiment retracts under the seat bottom. It may be actuated by a separate manual or electric actuator, or an extension the actuator driving the seat position, by using limit switches to activate latches that allow the head of the actuator to move alo0ng the seat bottom once it has paused the seat to a horizontal position and it ash been locked in that place following the action of limit switches.

The seat back has a novel support structure that is shaped to accommodate the bending stresses during a crash loading.

The orientation of the occupant will be facing slightly backwards at some angle and so the long side of the seat back will be the impact side and will therefore have the head of the occupant closer to this side that will benefit the occupant with regard to safety.

The embodiments do not show the foot frame or support elements that support the Air sleepers. These are the subject of prior applications.

The AirSleeper is an accommodation for passengers in aircraft that allows deployment as a tiered bed and in most embodiments a seat as well. The Air Sleeper may be implemented in a modular fashion and each passenger has a module that has a structure that locks to the adjoining similar AirSleeper structures and the support frame below, thereby creating a rigid honeycomb like structure to resist loading along the axis of the aircraft. Considering that the upper tier of AirSleeper modules are supported by the lower tier and locked thereto (directly or with load limiters), the loading on the lower AirSleepers need to accommodate a high moment due to crash load forces on the upper tier. Additional features for the lower tier Air Sleeper modules are presented herewith. The features shown in FIGS. 2-1, 2-2, 2-8 and 2-11, addresses some of the enhancements to further support the structure under such loading conditions. FIG. 2-1 shows the AirSleeper structural module with ledges or flanges (that may be retractable in some embodiments) such that the flanges on the rear side of the airsleeper with regard to the motion of the aircraft face upwards to support a downward force from the adjoining airsleeper support module and the flanges on the front side of each of the Air Sleeper modules face downwards to support an upward force from the adjoining AirSleeper module. These forces will be the result of each of the AirSleeper structure modules attempting to rotate about their supports below towards the front of the aircraft as a result of the crash load. Normally for separate seats this will result in a tensile load at the rear seat track support point and a compressive load at the front seat track support point. The invention however, equalizes these forces within the AirSleeper module structure and only the residual load is transferred to the seat tracks.

FIG. 2-11 shows latches that may be retracted for the same purpose. Notably retraction of such latches will enable the removal of one or more of the AirSleepers for maintenance or reconfiguration without removing the entire Bank of Air Sleepers in a locked row. The latches can use techniques for locking and retraction well disclosed in the background art.

FIG. 2-2 shows an enhancement for improving the structural rigidity of the AirSleeper during crash loadings by creating a shear plane with the feature that separates the leg area of the upper tier from the lower occupant space. This feature may be connected on its side and top to the lower tier AirSleeper structure to perform this function. The connection may be extended to the further side of the AirSleeper to increase such rigidity further. Moreover, this feature may be connected to the steps that enable egress and ingress for the occupant in the upper tier of the Air Sleeper, thereby further increasing the rigidity under crash loading conditions for each of the AirSleeper modules. Some embodiments may have a rear wall for the steps that can increase the shear plane further down to further increase the rigidity offered.

FIG. 2-8 Provides yet another features for addressing the crash loading conditions. The ledges shown on the rear of each foot frame, will provide upward forces on the adjoining foot frame and the ledges shown on the front of each foot frame provides a downward force on the adjoining foot frame, these forces thereby neutralizing each other in an array of such foot frames assembled end to end and as a result reducing the forces on the tracks to the residual force. The surface of the contact points of the foot frames to each other may have a compressible material thereby creating some force equalization between the foot frames to accommodate engineering inaccuracies.

Another feature shown in this figure is useful for AirSleeper structure modules that may be of different widths and therefore may require support points that accommodate varying spacing requirements. The support points are spaced to accommodate multiple standard widths of Air Sleeper. Many embodiments will use load limiters between the Foot frames and the AirSleeper modules.

Yet another feature in FIG. 2-8, is the elongated support points for latches to the seat tracks. Such elongated support points may house flexible or compressible material surrounding the eye that is attached to the support point. Such flexibility enabled with such an arrangement or any other load limiting arrangement well disclosed in the background art will allow for load equalization across the latch points in the event of a crash loading condition or in the event of flexing of the Air frame.

Child Restraint System Embodiments

An embodiment of an attachment means for the Latch/ISO-FIX for a Child Restraint System is shown in FIG. 2-3 to 2-6. The embodiment is pivoted on the Child Restraint System body structure, and is located in a recessed groove. The structure can also pivot about its own axis. The two axes of rotation allow the latch/ISO-FIX to be reversed for a rear and front facing seat. These figures show the different stages during the transition from a front facing to a rear facing seat position or vise versa. The support can be locked in either the front facing or rear facing position inside the cavity with one or the other of the locks shown. Considering that the Latch has a top and a bottom simply rotating the arm about a lateral horizontal axis will not work as the top will be at the bottom after the 180 degree rotation. Therefore the present invention shows the rotation about the axis of the arm as well to enable the Latch/ISO-FIX to be facing in the correct orientation in both the front and rear facing positions.

The sequence of FIGS. 2-3 to 2-6 show this transition. FIG. 2-7 shows an exploded view. As can be seen here, there are two axes of rotation. Considering that the arm in its two parts need to support a tensile load the pivot along the arm-1 required an end stop that engages a cavity in the Arm-2 to prevent extension. The engagement of these two arms at this point may also have a compression shock absorber element such as a tube of compressible material to reduce peak loadings.

The sequence of FIGS. 2-9, 2-9A and 2-10 show an embodiment of an assembly for a Child Restraint System that may be used to provide control for the lateral deflection of the rear part of the innershell supporting a child during side impact and/or forward deflection during a front impact. The assembly works as follows, 9-8 represents the body of the Child Restraint System or Child Seat, pivotally attached about a vertical axis to support housing 9-4 with pivots 9-2 which supports tube 9-1 that is flared (in some embodiments) 9-3. A Cable 9-5 is attached at its first end 9-8 to the support shell of the child that has one or more degrees of motion freedom at this support point under crash loading conditions in a plane substantially orthogonal to the axis of 9-2 (substantially horizontal plane). The cable passes through the tube 9-1 and then through a compressible shock absorbing element 9-7 that has spring and/or damper properties between its ends and is rigidly attached at its second end to the an end stop 9-6. 9-6 has a surface that can compress 9-7 upon retraction of the cable 9-5.

Upon tension of the cable in any direction in the plane of rotation of its end 9-8, the cable will compress the shock absorber element 9-7 and thereby extend out of the flared end of the tube at a controlled rate. Such tension on the cable can be due to the rotational motion of the support shell of the child about a near vertical axis towards the front of the seat thereby moving the rear of the seat sideways. With such motion the housing 9-4 will pivot about the axis 9-2, to face in the direction of the tension. In a second type of crash load conditions such as in front impact the cable end 9-8 will be tensioned in a substantially forward direction of the vehicle and with a support shell for the child having a substantially lateral and horizontal axis of rotation near the bottom of Child Restraint System, the seat will rotate and extend the cable thereby compressing the shock absorbing element. The Housing will remain in the forward facing position and the pivots 9-2 will ensure that the flared end points as near as possible with the pivotal motion, towards the direction of tension.

FIGS. 3-1 to 3-8 show embodiments of a mechanism for side impact protection for an occupant in a vehicle particularly for children in child seat.

FIG. 3-1 Shows a mechanism to use the lateral motion induced by the movement of a shoulder plate that engages the shoulder upon lateral impact or acceleration. This shoulder plate movement engages the mechanism to move the head rest. The movement of the shoulder plate can be a result of a compression of a shock pad on either side of the occupant that compresses to allow the articulation of the shoulder plate. This figure shows the headrest ion a high position for a taller child. The headrest vertical adjustment mechanism is not shown and will follow any of the well disclosed mechanisms in the background art.

FIG. 3-2 Shows the same arrangement as in FIG. 3-1 with the head rest in a low position.

FIG. 3-3 shows arrangement in FIG. 3-2 with Shock Pad removed, showing an embodiment of the shoulder plate and a hip plate.

FIG. 3-4 Shows the mechanism in FIGS. 3-1, 3-2 and 3-3 in the normal position. The shoulder and hip plates and the shock pads are removed for clarity. As may be seen the mechanism is symmetrical about the center plane of the headrest and seat. The mechanism is made of supports on the headrest 02 that has attached to it on its forward pivot the headrest pivot support link 03 that has another pivot on its rear end 05 that is pivoted to the headrest support which in turn is attached to a headrest vertical position adjusting mechanism for a variable height headrest or directly to the seat structure for a fixed height headrest. The pivot support links 03 are seen to be angled to enable the desired motion. Some embodiments will have the axes 04, 05 of the pivot support links 03 to be in the same direction as the back of the seat or parallel to the seat back and the two support links symmetrically placed on either side of the center plane. (Embodiment 1) Some embodiments may also have the axes 04, 05 tilted slightly back from the angle of the seat back. so that the mechanism faces at an upward angle relative the seat back rather than orthogonal to it. The pivots 04, 05 need to be angled in the support links 03 for this version of the embodiment (embodiment 2).

FIG. 3-5 Shows the position when the shoulder plate engagement of the notch on the Headrest pivot support link 08, pushes the link 03 towards the center and thereby reorients the headrest relative to the Headrest support and the seat. Notably This movement is due to a compression of the shock pad (or other device articulating the shoulder plate) on the right hand side of the seat due to a side impact on that side or other acceleration. The reaction force of the shoulder due to the inertial loading pushes the shoulder plate 09, to the right which in turn compresses the shock pad 12 on the right. Notably the movement of the shoulder plate on the right hand side pulls the shoulder plate on the left had side and through the engagement of the notch on the headrest Pivot support link 03 to the shoulder plate on the left had side, the Head rest pivot support link is pushed towards the center and the movement is enabled. Notably the movement is possible because of the connection between the left and right parts of the shoulder plate 13 as this carries the tensile force. Alternatively there will be no need for the connection section between the left and right sections of the shoulder plate, if the linkage between the headrest pivot support link and the adjoining side of the shoulder plate 08 can support tensile loadings as for example with a pivoted rod that engages the forward pivot 04 and attached to the adjoining shoulder plate.

This movement of the headrest will ensconce the head on the side of the impact.

FIG. 3-6 shows the movement for an impact from the left hand side which is exactly analogous to the FIG. 5 on the right side.

The above figures show embodiment 1 where the support links 03 are pivoted to move in a plane orthogonal to the seat back as the rear pivot 5 is parallel to the seat back. However, in embodiment 2, the support link rear (and front) pivots are inclined to the seat back and therefore the support links move in a plane at an upward sloping angle forward from the seat back. The entire mechanism has the exes of the pivots from the direction of the back rest of the seat to an angle with the upper end slightly behind the axis of the seat back and the lower end slightly in front of that axis. This embodiment can provide further benefit by enabling a tilting of the headrest such that the impact side of the head rest moves up to further aid supporting the head. Such an inclination will raise the headrest on the side of the impact as well as move it forward on that side, further benefiting the support function of the headrest if it has a low profile to aid vision of the child under normal operation conditions.

FIG. 3-7 shows an embodiment of the support shell 15 of the child seat. Its inner surface supports the shock pad. Alternatively the shock pad may extend to the side of the vehicle and get support from that surface for side impact. However the dynamics of these two cases will be significantly different. Other embodiments without hip and shoulder plates and only the shock pads may also have similar lateral support from a support shell as shown.

The figure also shows the support shell extending forwards of the shock pad as well. This is optional but can aid in enabling rotation of the occupant away from the impact. These forward sections of the hip and shoulder pads may be made to contact the shoulder plate and or the hip plate to slide on these and to provide lateral support for the occupant with compression of the shock pad. However, the forward ends of these plates may be firmly supported by support 15, and therefore induce rotation of the occupant during a side impact.

FIG. 3-8 shows an embodiment of the shock pads. As may be seen the compressible material is formed such that the cross sections are narrower towards the rear of the seat if rotation is desired for the occupant (away from the impact). Some embodiments will have the cross sections rise towards the contact surface with the occupant to have a continuous surface for contact. as shown in the figure.

FIGS. 3-9, 3-11 to 3-18 Show several embodiments of a device that may be used to reduce front impact acceleration of the head. This is an element that may be attached to the harness on one side and to the harness tightening webbing section on the other, and enable controlled extension of the harness system during front impact. These devices may be designed to simply replace the attachment plate between the left and right harness straps to the harness tightening strap.

FIG. 3-11 shows a device that can enable front impact protection using the same technologies. This will be by attachment to the top tether in a child seat, for front impact protection. The extension parameters will however be calibrated to different criteria for this application.

FIG. 3-9 shows an embodiment of the load plate made of a ductile material, with a section that may be extended with a tensile loading. The embodiment shown is designed to extend with a honey comb cross section profile as seen in FIG. 3-18. The thicknesses of the deforming or extending sections 21 and the attachment sections between these 20 are designed to have a cross section to have the desired extension rates with the loading. Several different such profiles are possible. Another possible structure for the extending section is shown in FIG. 3-19. Yet another embodiment is shown in FIG. 20 where there are bucking member 44 that will buckle at a predetermined compressive load and at the time of bucking and thereafter allow the structure to extend at a desired load extension characteristic. Some such load extension characteristics after bucking can allow the plate to extend rapidly until the section 20, 21 are deformed to be in equilibrium with the external load. This buckling load level can be used as a threshold of acceleration (and inertial load force) that is allowable and thereafter rapid extension is allowed to reduce the relative acceleration of the head relative to the seat in a front impact. The bucking member in this embodiment has a section that will support a compressive load until a critical load is reached. A staggered pair of limbs as in the embodiment shown will in many cases provide greater predictability in the bucking mode.

FIG. 3-10 shows a similar load plate adapted to attach to a tether support when used for front impact protection in the attachment of the seat to the vehicle.

FIG. 3-11 Shows the Load plate with multiple fracture elements that can withstand specific predetermined loads before breaking. The three fracture elements have three different breaking loads. The First to fracture will normally have a rigid connection to the load plate, the second to fracture will have a slot for securing the element to the load plate to allow movement before it is tensioned (in the interim the load plate is stretched) and finally the third has an even longer slot to allow more stretching of the load plate before it is tensioned and then breaks. This allows three separate stages of extension each defined by the break points of the three fracture members. Any number of such fracture members may be employed with similar attachment of several stages of stretching of the load plate. Between fractures the plate will extend based on the structure of the extending section which in the shown embodiment comprises sections 20 and 21.

After the final fracture element has broken, the load plate will extend based on its own elastic elements comprising 20 and 21.

FIG. 3-12 shows the same as FIG. 3-11 in exploded form.

FIG. 3-13 is a load plate with a single Fracture element. The Fracture element breaks at a predetermined load level. Therefore the extension until break is limited to what the Fracture element will extend. Thereafter the Load acts on the Load plate and stretches it and the extension will be based on the characteristics of the load plate including the elements 20 and 21. If the extension desired is only above a given load level this load level may be set to the fracture limit of the fracture element and the fracture element chosen in material and cross section to provide limited extension before fracture.

FIG. 3-14 shows an embodiment with a friction loading between the bars and the plates. The long slots allow sliding of the friction elements. For longer displacements and therefore longer slots the locations of the belt hooks may need to be adjusted so as not to be covered by the friction elements. the loading characteristics will be based on initially the static friction between the strips 32 and the top end of the plate. Other friction driven architectures will be multiple interleaved plates with alternate plates replacing each strip 32 shown and the alternate plates having slots on the same side and the remaining plates having slots on the other side whereby alternate plates will have slots in the rivet attachment to the bottom plate and the other remaining set of alternate plate have slots in the attachment to the upper part of the plate. This will enable sliding of one set of plates relative to the other and the friction loading characteristics will determine the extension.

FIGS. 3-15 and 3-16 show yet another embodiment of a load extension device. Here a compressible structure with predetermined properties of load vs. compression is used and is available in cylinders 34, this cylinder 34 has a cable or rod 35 passing through it and at one end is attached at its first end to a piston 40. This assembly is inserted into a housing cylinder 33 with a bracket 36 for fastening to the top plate 39. (the Cylinder 33 can also be directly fixed to the top plate 37. The second end of the cable or rod 35 is threaded through an aperture on the closed end of the cylinder 33 and attached to the support flange 38 which in turn is attached to the bottom plate 39. Upon tensile loading between the top plate 37 and the bottom plate 39, the cable/rod 35 goes into tension and pulls the piston 40 to compress the cylinder 34 and thereby allows the separation of the plates 37 and 39 at the predetermined rate desired on loading. Notably the cylinder 34 may be replaced with fluid and suitable vents provided to allow escape of the fluid and thereby control extension of the device on loading.

FIG. 3-17 shows yet another structure of the load extension device that here is again a load plate as in FIG. 9 but here has two (or more) sections for of extending structures 41, 42 with different properties. A plate 43 is inserted in one of two positions to straddle the first or the second extending structures and thereby prevent extension. This may be used for different weights of children in a Child Restraint System. As the mass increases and the inertial load increases the courser structure can be employed.

Notably the spacing of the holes must allow the same plate 43 to be inserted in one or the other position. The plate may not be needed to protect the course section from expanding as the finer section will extend even if such protection for the course section is not provided. With 3 or more extension sections the finest section will not need the plate 43 but the others will.

FIGS. 4-1, 4-2 and 4-3 show an embodiment of a child seat. FIGS. 4-1 and 4-2 show the seat in the front facing direction and FIG. 3 shows the seat in the rear facing position. The seat comprises a shell 1006 or surface that supports the child directly or indirectly through other mechanisms. In this embodiment the shell is directly attached to the supporting mechanisms comprising latches. Alternative embodiments may have the shell attached to a frame structure with arrangements for movement between the shell and the frame for egress and ingress. In the embodiment shown, the shell is attached to the latch arrangement with a Latch carrier 1002 that is pivotally attached at the bottom of the shell. The position of the pivot is arranged such that the end of the latch carrier is at the required position for both front facing and rear facing positions when pivoted forward and backwards. Other related embodiments may have the pivot movable such that the position of the latch ends may be moved to exactly position the latch ends correctly. Moreover, many embodiments of this seat including the embodiment shown have a shear plate between the two side tubes of the latch carrier (carrying the two latches) to support lateral loadings without distortion. The latches (not shown) sit inside the two side tubing housings of the latch carrier. Apertures on the housing tubing (not shown) allow access to the latch mechanism for operation. The latches are attached to a piece of cable at either of its ends (alternatively two separate cables can be employed but will not need the pulley 1021) The cables enter the Latch tension assembly through the nipples 1017. The Latch carrier has a large aperture suitable placed on each of the tubing housings for the latches to allow each of the latches while the cable is made slack to be taken out twisted by 180 degrees and reinserted (the cable takes the 180 degree twist). This will allow the latch to be oriented upright in both the front facing and rear facing positions of the latch carrier. While some embodiments may have an arrangement to rigidly support the latch carrier in the forward facing position and one or more rear facing positions of the seat, This embodiment has in addition has the latch carrier also pivotally attached to a latch carrier brace 1003. This Brace attaches to the Top Brace 1004 in the front facing position of the seat and to one of several position on the Front Brace 1005 when the seat is in the Rear facing position. Pairs of sockets and plugs are arranged to engage the Latch carrier Brace to mate with one or both of the Top Brace and the front Brace. The mating arrangement for the front brace may have multiple positions to change the angle of the seat in the rear facing position. One or more "Thumb" screws in holes 1007 attaches to mating nuts on the Front and Top braces. The Front Brace may require multiple nuts for each screw for the multiple attachment positions.

Each of the Latch carrier Brace 1003, Front 1005 and Top 1004 Braces may have shear planes to minimize distortions during lateral loadings.

The top and Front braces are pivoted to the shell 1006 (or the support frame which is attached to the shell in other embodiments).

When the seat is in the front facing position, the Front Brace 1005 is folded in about its pivot but in many such embodiments will have an end stop to provide vertical support for the seat (ie touching the car seat in front of the pivot of the Latch carrier.) In still other embodiments the Front Brace 1005 may swing forward in the front facing position of the seat and be limited by an end stop to provide support for the seat at a point further forward on the seat. Such an arrangement may also have a bolt on support that reached the floor board in front of the seat (not shown) for further support.

When the seat is in the rear facing position the Top Brace is folded about its pivot either up towards the seat back and locked in that position to prevent obstruction the inclined seat, or in other embodiments is folded outwards to either directly or with a bolt on leg support the child seat on the front of the car seat or with a longer leg to support the child seat on the floor boards in front of the car seat. The Top Brace in such an arrangement may have a lock arrangement near its pivot to keep the leg to the floor in a suitable orientation and position. Such a leg may have arrangements for shorter and longer lengths to suit different cars.

The Latch Tension Assembly 1014, is shown in FIG. 4-4. The cables (not shown) from the latches enter the Assembly through the nipples 1017 on each side and go over the pulley 1021. A typical assembly approach will be to attach the cable to one latch. Thread it through the pulley and then attach it on the other latch. the Assembly 1014 has access slots for the pulley 1018 and 1024 (for alternative attachment side) for access for the cables 1023 opposite the nipples. At one of the two ends of the housing tube—the Latch Pivot Tension Tube 1016 sits a tensioning cam assembly also shown in FIGS. 4-5 and 4-6, that comprises a pulley 1021 attached with a pin 1025 to a Cam Tension Bar 1022 which enters a slot in the Cam Pin 1019 and is threaded to accept the Thumb nut 1020. The Cam Pin 1019 pivots the Latch tension lever 1001.

The Thumb nut may be tightened to increase the tension of the cable by pulling the pulley 1021 by raising the Cam Tension Bar 1022. Final tensioning can be achieved by turning the Latch Tension Lever.

Notably some embodiments can have the Tensioning assembly moved from one end of the Latch Pivot Tension Tube to the other. One approach for this would be to unscrew the Cam Tension Bar 1022 completely out of the nut 1020, push it through the tube 1016 and attach it to the lever 1001, the Cam Pin 1019 and the Nut at the other end. The Aperture 1024 will help positioning the pulley and cable in the final stages of the reassembly.

FIGS. 4-7 to 4-9 show new embodiments of Load Plates for the harness of the child seat. Such a plate will be attached to the two sides of the child seat harness and on the other side to the tensioning webbing behind the seat. Other embodiments may have such elements anywhere along the length of the harness to control the peak tension loading. These Load Plates can also be used for controlling peak tension loading on any occupant support seat belt or other restraint mechanism such as in a car seat or airplane seat for adults.

FIGS. 4-7, 4-8 and 4-9 show three different embodiments. They all have a common feature of one or more fracture necks 1031 that break at a predetermined load. At the time of breakage, a related extension or distortion section allows controlled extension of the plate.

FIG. 4-7 has a single fracture neck 1031 and has several deforming sections 1033 and related Link Sections 1034. Such multiple arrays of deforming and link sections allow greater deformation upon fracture of 1031. What is also disclosed in FIGS. 4-7, 4-8 and 4-9 are lateral separation between the parallel arrangements of distortion and link members. A single link member attached to the Harness loop side attached to an array of deforming and link members to correspond to a single link member attached to the section that has the tension webbing support hook 1032. This allows the deformation of the elements pull "inwards" the sides without restriction as shown in FIG. 4-8B. This separation of the different parallel arrays is shown at 1035. FIGS. 4-7 and 4-8 show the case where are there are multiple fracture necks and corresponding deforming 1033 and link 1034 sections. The cross sections of 1033 and 1034 and other connected sections may be calibrated to distort to the desired extent when the corresponding neck 1031 breaks. The cross section of the neck may also be calibrated to a desired force for fracture.

Each of the sections corresponding to a fracture neck 1031 has a section support 1036. The fracture force of the necks 1031 may be set to the limit allowed for the tension in the harness (which derives from the acceleration of the head and upper body and its inertial loading). To accommodate a spiky force loading the neck fracture forces may be set near each other near the desired peak loading of the harness or seat belt, with suitable extension of the corresponding extension sections such that each spike breaks one or more of the necks and limits extension between spikes. This will conserve the available forward projection of the head and upper body for the spikes in loading.

FIG. 4-8A illustrates this situation. The graph shows multiple identical deforming sections and corresponding links for each of the fracture necks. The straight lines show the theoretical extension of the one or more of such suctions under load. With each successive fracture of the neck the actual extension follows the heavy line from no sections to a single section to two sections and more depending on the number of fracture necks and sections. The Fig shows 5 sections.

FIG. 4-8B show the extension of the Load plate in 8 under load.

FIG. 4-9 shows the same architecture as FIG. 4-8 except that a smaller deformation is desired and so a single "diamond" of deformation elements lie between the section supports 1036, unlike in FIG. 8 where there are two "diamonds". Other embodiments may have more such diamonds. Still others may have the diamonds attached laterally ie without the separation 1035 to limit deformation.

FIGS. 5-1 to 5-6 Shows a chin support assembly for attachment to the harness of a child seat. It has a dual role of support for the chin of the child for resting and during a front impact providing controlled support while compressing to reduce the peak acceleration of the head during such front impacts. One situation where chin rest can have a significant effect during a front impact is when following the impact and the support provided by the harness to the torso, the head projects forward and down till the chin impacts the chest. The Chin rest will prevent or minimize such contact and will crush in a predetermined controlled manner to gradually bring the chin to rest relative to the chest of the child thereby reducing the sudden impact condition that may cause a high peak acceleration condition.

The chin rest may be contoured to have a inclined surface 2005 towards the sides sot that the child can rest the chin and part of the cheek on the chin rest.

The chin rest can be supported by a modified chest clip— called a chest plate 2003/2004, the left 2004 and the right 2003 that can be secured together using many approaches disclosed in the background art for chest clips. the Chin rest 2007 may be secure to either the left 2004 or the right 2003 chest plate using attachment means well disclosed in the background art. Notably access to a latch mechanism 2006 if required will be necessary on the chin rest in many embodiments. The chest plate extends downwards in many embodiments to ensure that the reactive force on the chest is distributed over a larger area and that the distance between the support on the harness and support area is adequate to provide a counteracting moment to the force of the chin on the top of the chin rest during front impact.

Some embodiments of the chest plate can have a structure that allows the harness to slide out from the side of the slots FIG. 5-6. This is particularly useful in jurisdictions where chest clips may not be allowed to ensure that the child can be removed from the seat without delay after a car crash. Notably such an embodiment can have a single piece chest plate with the harness threaded through the slots or use the conventional architecture with the left and right side chest plate and have the harness threaded through permanently but easily removed in a crash without recourse to the latch mechanism between the left and right side of the chest plate.

The material of the chin rest may be made of crushable or compressible foam material or have a spring damper combination to provide the resistance.

If foam is used the compression characteristics may be designed to accommodate multiple head masses impacting for different aged children. Larger masses will require greater distances for deceleration while crushing the foam. If such distances are not available for the larger mass heads, foam layers with progressively increasing density can be used to decelerate the head. The softest foam typically on the top will compress for the smaller children's heads. Heavier heads will easily compress the top layer without much impedance but will decelerate at suitable rates with the denser foams below.

Moreover, multiple chinrests may be available for mounting on the chest plate, for different aged children and for different car and child seat types to accommodate different crash profiles.

Still other embodiments may have foam inserts that can go into apertures in the chin rest to increase the resistive force of the chin rest for larger heads.

More generally, cores of foam either cylindrical or any other cross section may be inserted into foam based reaction materials as in the above invention to change the reaction characteristics. This could be used in side impact foam based reaction materials where cylindrical or other cross section apertures are provided for later installation of the foam cores as the child grows and a greater mass will need to be accommodated during impact conditions such as in side impact.

The Load Limiter of this invention consists of a Load Plate 1001 that has a recess 1010 with a fitted bolt or rivet 1004 through it. Other attachments to the bolt or rivet exert a force in the direction of the central slot with either fingers or slots on either side. The material of the load plate deforms around these fingers 1005 or slots 1011 first and then as the bolt or rivet progresses along the central slot it encounters the second set of fingers 1006 or slots 1012 that have a greater cross section of material and therefore require a greater load to deform and allow progress of the bolt/rivet further. Some embodiments may have a single section of fingers or slots, others may have a plurality of such sections with fingers or slots. The design of the length and width of the fingers or slots and in the case of the slots the vicinity of the slot to central slot are instrumental in determining the load that will deform them to allow the progression of the bolt/rivet 1001 through the central slot. In some situations an aperture 1009 is useful to begin the deformation by weakening the section immediately next to the recess 1010.

The Bolt/Rivet is attached to the load that needs to be limited. Some embodiments have a second plate "T" Bar that has the load attached in the harness of a Child Seat in a vehicle. Others use a plate that can be attached to a bolt support. Still others may have the Bolt/Rivet 1004 directly attached to the load element.

The surface of the bolt/rivet 1004 should be hard enough and have a low enough coefficient of friction to deform and slide through the central slot. In some embodiments the 1004 is narrower and there is a washer 1002 that fits the bolt/rivet and on its outer surface fits the recess 1010. The surface of the washer may be specially for hardness and/or low friction.

A second Washer that has a wide outer diameter is often useful in some embodiments to keep the bolt/rivet and the first washer flush with the load plate.

In still other embodiment a single washer element with two internal diameters as shown in the figures may be used instead of two separate washers.

Embodiments shown in the figures have a hook for the harness tensioning webbing on the load plate and two hooks on the "T" Bar for the harness straps. An embodiment for a Tether (used on the back of a Child restraint) could have single hooks or loops or buckles for suitable attachment.

The load limiter in this invention can be calibrated to the distance required for movement for each load level and the slots or fingers designed to provide sections long enough for these distances.

FIG. 7-1 shows two views of an embodiment of the Child Restraint System with sub assemblies shown in FIG. 7-2 to FIG. 7-9.

The embodiment shows several unique features including a reversible Lower Anchors and Tethers for Children support arrangement for front and rear facing deployment. Rotation for egress and ingress, side aircushions, a movable inner shell for impact injury reduction.

FIG. 7-2 shows the frame subassembly for the embodiment with latch tensioning assembly, that is reversible for rear and front facing seat deployment. Central axis for rotation of the seat, foot rest for front facing mode, that also is the support for the rear facing latch tensioning assembly.

FIG. 7-3 Shows an exploded view of the Lower Anchors and Tethers for Children tension assembly.

FIG. 7-4 Shows the side aircushions that may be partially prefilled with porous materials and/or vented to control the impact characteristics. It also shows a unique support structure for the bottom shock strip support including a torsion resisting tube.

FIG. 7-5 Shows the subassembly for the inner shell supporting the occupant including key elements of the main shock strip, the feet that are supported by the frame, and the headrest assembly.

FIG. 7-6 shows the reinforced section that can have a Cross support strip attached and reinforced regions for the support of side support elements on the outer shell or optional shock strips.

FIG. 7-7 shows the Cross support strip supporting ridge, the slot for staples to go through the innershell to attach to the headrest, support feet and harness threading features.

FIG. 7-8 shows the head rest assembly

FIG. 7-9 shows the Headrest adjustment mechanism assembly.

FIG. 7-10 to FIG. 7-14 show several embodiments for a load limited that may be used on either the harness (as shown) or for the tether (with end attachments modified)

The embodiment of the Child Restraint System shown in FIG. 7-1 with sub assemblies in FIGS. 7-2 to 7-9 has many new features.

Some of these features are as follows:
1. Lower Anchors and Tethers for Children/ISOFIX tensioning mechanism for forward and rear facing deployment including optional foot rest for front facing deployment.

This feature has a pivoted mechanism that is robustly attached to the seat structure, that may swing forward for the rear facing seat and be locked in position with the holes 7-1018 on front brace with 7-1022 on Latch carrier with a engaging rod, for one or more inclinations with a Front brace 7-1005 having connection holes for different positions 7-1018. (FIG. 4-3 shows an analogous position for rear facing seat.) FIG. 7-2 shows the Front brace/footrest 7-1005 which becomes a foot rest in many embodiments for the front facing deployment with several positions enabled with the location of a pin through many holes 7-1020 on the body of the seat. The same mechanism can be swung back to lock into the frame (directly or indirectly) 7-1022 to 7-1023 with a securing rod, to provide a Lower Anchors and Tethers for Children/ISOFIX for the front facing seat.

The Latch/ISOFIX support mechanism comprises a latch tensioning mechanism that can be used to tension the latches in a single operation, and a housing for the latches the details of which are disclosed in FIG. 4-1 to FIG. 4-6 and the disclosure above.

The embodiment shows in FIG. 7-3 the (optional) connection 7-1014 between the Latch/ISOFIX support and the central pivot rod 7-1013 which is attached to the tether, thereby creating a rigid structure that is attached to the vehicle with the latches and the top tether. This will allow lighter construction of the rest of the seat as the load is borne by these elements.

2. Clasp mechanism and lock for egress ingress rotation of the seat.

The clasp and lock as shown in FIG. 7-2 are used to lock the seat in the operating position and release the seat for egress and ingress. The lock 7-1011 has its pivoting axis such that compressive load on the 7-1010 and the lock 7-1011 will tend to push the lock towards the lock position rather than the release position. The Clasp mechanism is also designed to fracture at a critical load when side impact forces rise above a threshold to allow the seat to rotate away from the impact.

3. Main shock strip attachment to accommodate high torsional load for transfer directly to the support points of the Lower Anchors and Tethers for Children and the tether. Inner shell support with feet for vertical support. The present embodiment of the Child Restraint System has the main shock strip (that supports much of the load of the seat during normal operation and during impact loading) supported by a central arm 7-1028 which is attached to the Main shock strip 7-1034. Moreover, in some embodiments there is in addition a cavity 7-1026 supporting a tube and a torsion brace tube 7-1025. The Torsion Brace tube has at its two ends apertures to attach with rod to the shock strip 7-1027 and in the rear to attach to the central Pivot Rod 7-1013.

4. Rear support for Main shock strip. The Main shock strip may have a support at the bottom rear to prevent the compression of the shock strip under intense loading in a front impact or to accommodate heavier occupants.

5. Side impact aircushion. These side impact outside aircushions 7-1004 are attached to the outer shell/frame 7-1003. These may be partially filled with porous materials and vented.

6. Head Rest assembly including support for harness within the architecture for a moving inner shell for impact protection for either or both of side and front impact. The headrest assembly for the Child Restraint System may include the support for the harness as well and thereby allow the adjustment of height to be for both the headrest and the harness. The Child Restraint System embodiment shown has a dynamic inner shell and therefore cannot have the conventional architecture for the adjustment of the headrest height. Such adjustment mechanisms need to be mounted on the (dynamic) inner shell. The architecture shown illustrates the (optional) Brace section 7-1035 that Is attached to the Main shock strip 7-1034. The Brace section provides a sliding surface for the adjuster tube 7-1044 and also has notches that will capture the ends of the Latch pins 7-1060. (the Brace section may be excluded if the inner shell 7-1002 has the section molded for sliding and recesses for the latch pins). Both the Brace Section and the Main Shock strip are secured to the inner shell 7-1002. The Adjuster tube contains the adjuster latch mechanism. It is also attached to the staples 7-1038. The staple legs go through slots on the back of the inner shell 7-1036 to reach the headrest 7-1032 and the Brace Plate 7-1033 to which they are secured. This assembly will allow the adjuster tube along with the staples and the head rest ad brace plate to move together as the adjuster tube slides in the Brace section. The position of the adjuster tube and thereby the headrest and brace plate will be determined by which slot in the Brace section is used for the ends of the pins protruding from the Latch pins 7-1060. The headrest has a slot for the harness 7-1048 and a recessed section below it for the rear section of the harness after threading through the holes. In addition a lateral bar may be positioned just under the harness apertures 7-1048 and recessed into the headrest structure and extending right across the headrest structure and secured to the brace plate behind for further support of the harness under load conditions in impact.

Under front impact conditions the harness will pull forward and the force will be transferred from the headrest 7-1032 (and the lateral bar if installed) to the brace plate and the staples through to the adjuster tube 7-1044 which will be wedged into the brace section. Some embodiments may even have an angled cross section so that the adjuster tube is designed to wedge securely into the section of the Brace section thereby minimizing further movement of the headrest relative to the Brace section. The Brace section is attached to the Main shock strip at the bottom and to the (optional) bungee sling 7-1037 which are both connected to the Outer Shell/frame and therefore moderates movement.

Notably in the absence of the Brace section the connections are made to the body of the innershell as the adjuster tube will slide in a recess on the innershell directly.

7. Side impact support:

Side impact support for the inner shell is provided with reinforces section that sits on the raised section 7-1031 that traverses the brace section and the adjuster tube by going over it. It I secured to the inner shell and will support the inner shell on the sides by bracing it. A tensile load will result on the strip which can be better with stood with connection over the center of the inner shell to the far side of the innershell. This cross support strip contacts either the outer shell/frame directly or indirectly with spring shock strip sections.

A second pair of (optional) side contacts may be made between the innershell and the outer shell frame FIG. 7-4 shows the outer shell frame with two lower prongs on each side that will support these forces.

Finally during side impact the inner shell will tend to tilt at the top towards the impact as the support forces are largely at the lower end of the shell. This movement is minimized with the support legs 7-1008 that sit on the frame assembly 7-1007. The frame surface is contoured to allow sliding of the legs as the outer shell/frame pivots for egress and ingress.

8. Harness topology and support. The harness is threaded through the headrest slots and down on the inner side of the innershell to the slot at the bottom rear of the innershell 7-1051 into a recess that lies below the main shock strip. It then emerges at the front of the innershell where a conventional harness adjuster may be mounted for ease of access. Notably under impact conditions the tension in the harness will need to be supported by the bottom of the inner shell material (harness lies below it after passing through the slot). This section of the innershell bottom may be reinforces with a plate that is attached to the same fasteners as the main shock strip.

9. The Head rest adjuster mechanism that lies in the adjuster tube has a pair of adjuster plates 7-1039 that straddle the latch 7-1040/7-1041 (there may be multiple latches along the length of the adjuster plate with corresponding recesses on the Brace section and apertures on the adjuster tube). The Latch(es) are spring loaded and will be the normal position 7-1040. Pins are inserted between the adjuster plates through aperture 7-1055. These pins lie below the latch arms. The lower end of the Latch(es) is attached to the adjuster tube with one or more central pins 7-1056. The latch pins on the ends go through holes on the adjuster tube and protrude into the recesses on the Brace frame and thereby lock the adjuster tube in a position on the brace frame preventing sliding on the brace frame. When the adjuster plates are raised the pins attached to the adjuster plates through the apertures 7-1055. This pushes the arms of the Latch inwards and retracts the pins at the ends into the adjuster tube thereby allowing the adjuster tube to slide inside the brace section. Pulling up the adjuster plates is facilitated with the handle 7-1042 attached thereto. For ease of operation a second handle 7-1045 is attached to the adjuster tube. A spring 7-1043 may be interposed between the adjuster plates and the adjuster tube.

Load Limiters that May be Used with the Harness and Tether in Child Restraint System.

FIG. 7-10 to FIG. 7-14 show several embodiments for a load limited that may be used on either the harness (as shown) or for the tether (with end attachments modified)

This class of load limiters are designed to have controllable force displacement characteristics by bending strips of material. The width and thickness of the strips at different points along their length of displacement will determine the force at that point of displacement. The principal application in the Child Restraint System is to have constant forces over a given displacement which may be achieved with a constant cross section for the strip for that length. However, it may be desired to have multiple "plateau"s of constant force to cater for different loads on the Child Restraint System. This can be done with multiple cross sections along the length of the strip.

For example in FIG. 7-11 we have a cut out on the strip that changes the cross section for part of the length. When this section is bent it will show a lower force whereas when the full section is bent it will have a larger constant force.

One issue that needs to be overcome for a lower initial force plateau and a higher force plateau later, is the problem that the smaller cross section needs to pull the wider cross section through the process of bending. If the differences in cross section are large the narrow section will begin to extend substantially ion preference to bending the wider cross section. The solution in FIG. 7-14 addresses this problem by having two separate strips. This embodiment will be described later.

The embodiments shown bent the strip over a roller (although a low friction rod may be used) the angle over which it is bent may be varied for example FIG. 7-12 vs 7-13. Also the strip may be supported on the side before bending by friction on a wedge (as in FIG. 7-13) or a retaining structure (as in FIG. 7-12) or with a secondary roller (FIG. 7-10, 7-11, 7-14).

In the load limiter embodiments shown the deformable strip 7-2002 is bent over a main roller 7-2000. One of the attachment points for the harness or the tether is to the end of the strip 7-2002. The roller is pivotally attached to the housing or body 7-2005 which attached to the second attachment point. Notably the first and second attachment points can be the attachment points to the harness tensioning webbing section and the two harness sections that go to the front of the child seat.

FIG. 7-10 show the embodiment with two rollers 7-2000 and 7-2001 for bending the strip as the upper hook 7-2004 pulls the strip out of the body 7-2005 which is attached to the Lower hook 7-2003.

FIG. 7-11 shows a version with a cut out on the strip that will reduce the force between the attachment points as the reduced section 7-2006 of the strip is bent around the main roller. The force will rise when the full section reaches the main roller. Any of the embodiments shown can have this reduced section feature. Moreover the reduced section feature can have a variable section to have a varying force.

FIG. 7-12 Shows an embodiment that uses only one roller and has a low friction contact with the body for the strip 7-2002. FIG. 7-13 shows an embodiment that has a reduced angle of distortion of the strip. It uses a wedge 7-2009 to deform the strip over the roller although a secondary roller can be used with its contact surface in the same location as the wedge.

FIG. 7-14 uses two strips for two "plateaus of force. The First deformable strip 7-2002A has a slot in it 7-2007 which engages a pin attached to a hole 7-2008 on the second strip. When there is tension applied between the upper and lower hooks, the first strip bends over the roller as the pin slides through the slot 7-2007. When the pin 7-2008 reaches the end of the slot the second strip is also pulled along and therefore its cross section is also bent and therefore the force rises to the second plateau.

CONCLUSIONS, RAMIFICATIONS & SCOPE

It will become apparent that the present invention presented, provides a new paradigm for implementing key safety features comfort and convenience features for occupants in vehicles.

The invention claimed is:

1. In a vehicle Child Restraint System a mechanism for protection of an occupant in an impact, comprising a support shell for the occupant pivotally attached about a substantially vertical pivot axis to a support frame attached to the vehicle, wherein the support shell is retained in a normal position by a combination of a lock and brace arm, on each side of said shell, wherein in each combination the lock and brace arm are pivotally attached to each other such that compressive forces on said lock and brace arm reinforce a locked engagement of the support shell with respect to the support frame and said lock and brace arm are adapted to fracture at a predetermined lateral load on the support shell to allow the shell to reorient with respect to the support frame.

2. In a Child Restraint System a mechanism for protection of an occupant in an impact comprising: a seatshell; a support structure; and a central main deformable shock strip, wherein the seatshell is supported on the support structure by the central main deformable shock strip, such that deformation of the central main deformable shock strip enables reorientation of the seat shell with respect to the support structure under both front and lateral impact; said central main deformable shock strip is u-shaped and comprises a first leg, a second leg vertically spaced from said first leg and a connecting section joining said first leg and said second leg; wherein free ends of said first leg and said second leg are oriented towards a back of said seatshell; and wherein said first leg is attached to said seat shell and said second leg is attached to said support structure; wherein under front impact loading said first leg reorients towards or away from said second leg and wherein under lateral impact loading said connecting section twists enabling side to side reorientation of said first leg relative to said second leg.

3. In a Child Restraint System a mechanism for protection of the occupant in an impact as in claim 2 wherein the central arm comprises a torsion resisting tube to resist torsion of the central main deformable shock strip during lateral impact loading, wherein the torsion resisting tube is attached at its front end to the central main deformable shock strip and at its rear end to the support structure of the Child Restraint System.

4. In a Child Restraint System a mechanism for protection of the occupant in an impact as in claim 3, wherein the central arm is attached to a outer shell/frame which is pivotally attached to the support frame of the Child Restraint System with a central axle, and wherein the attachment of the rear end of the torsion resistant tube is to the central axle.

5. In a Child Restraint System a mechanism for protection of the occupant in an impact as in claim 2, the seat shell supporting the occupant, wherein a head rest and harness support are attached to said dynamic innershell with a adjustment mechanism for raising and lowering the headrest and harness support, further comprising a routing of the harness on an inside of a back of the seat shell from the adjustable head rest and harness support, and below a bottom of the seat shell in a slot above the central main deformable shock strip to a harness adjustment lock at a front bottom of the seat shell.

6. In a Child Restraint System a mechanism for protection of the occupant in an impact as in claim 2, wherein the support structure comprises an outershell pivoted to a frame and wherein the seat shell is supported by the central main deformable shock strip attached to the outer shell, to enable rotation of the outershell for egress and ingress relative to the frame attached to a vehicle, and a pair of legs on the seat shell supported by a sliding surface on the frame to support the seat shell under lateral impact conditions.

* * * * *